United States Patent
Greenberg et al.

(10) Patent No.: US 9,285,977 B1
(45) Date of Patent: Mar. 15, 2016

(54) CARD BASED PACKAGE FOR DISTRIBUTING ELECTRONIC MEDIA AND SERVICES

(71) Applicant: Wrap Media, LLC, Larkspur, CA (US)

(72) Inventors: Eric H. Greenberg, Ross, CA (US); Ian McFarland, San Francisco, CA (US); John M. Garris, San Francisco, CA (US); Mark E. Rolston, Austin, TX (US); Jared L. Ficklin, Austin, TX (US); Matthew J. Santone, Austin, TX (US); Jon Stevens, San Francisco, CA (US)

(73) Assignee: Wrap Media, LLC, San Francisco, CA (US)

( * ) Notice: Subject to any disclaimer, the term of this patent is extended or adjusted under 35 U.S.C. 154(b) by 0 days.

(21) Appl. No.: 14/678,316

(22) Filed: Apr. 3, 2015

Related U.S. Application Data

(63) Continuation of application No. 14/669,395, filed on Mar. 26, 2015.

(60) Provisional application No. 62/062,056, filed on Oct. 9, 2014, provisional application No. 62/062,061, filed on Oct. 9, 2014, provisional application No. 62/084,171, filed on Nov. 25, 2014, provisional application No. 62/091,866, filed on Dec. 15, 2014, provisional application No. 62/114,675, filed on Feb. 11, 2015, provisional application No. 62/133,574, filed on Mar. 16, 2015.

(51) Int. Cl.
*G06F 17/00* (2006.01)
*G06F 3/0485* (2013.01)
*G06F 3/0484* (2013.01)
*G06F 3/0481* (2013.01)

(52) U.S. Cl.
CPC .......... *G06F 3/0485* (2013.01); *G06F 3/04817* (2013.01); *G06F 3/04842* (2013.01)

(58) Field of Classification Search
CPC .............................. G06Q 30/02; G06F 3/0482
USPC .......................... 715/243, 200, 235, 234, 204
See application file for complete search history.

(56) References Cited

U.S. PATENT DOCUMENTS 6,321,244 B1 11/2001 Liu et al.
2005/0022116 A1 1/2005 Bowman et al.
(Continued)

OTHER PUBLICATIONS

U.S. Appl. No. 14/669,395, filed Mar. 26, 2015.
(Continued)

*Primary Examiner* — Manglesh M Patel
(74) *Attorney, Agent, or Firm* — Beyer Law Group LLP

(57) ABSTRACT

A variety of data structures, components, runtime viewers and methods are described for defining, delivering and rendering wrapped packages of cards in a manner that is particularly well suited, but not limited to, display on mobile devices. Each card may selectively include media content, and a palette of application functionality and/or supporting e-commerce related services. The cards of the wrap packages are ideally threaded together into one or more linear sequences, and authored to convey a book-like narrative that unfolds as the cards are sequentially browsed. In addition, the wrap packages are portable objects that are readily distributed, similar to other electronic messages, through e-mail, messaging, social-media, or via a variety of other electronic communication platforms. As a result, wrap packages are consumable, sharable and savable objects.

30 Claims, 43 Drawing Sheets

(56) References Cited

U.S. PATENT DOCUMENTS

| | | | |
|---|---|---|---|
| 2007/0028166 A1* | 2/2007 | Hundhausen | G06F 17/212 715/205 |
| 2007/0208704 A1 | 9/2007 | Ives | |
| 2007/0232399 A1 | 10/2007 | Kathman et al. | |
| 2008/0077852 A1 | 3/2008 | Fleishman et al. | |
| 2009/0119615 A1 | 5/2009 | Huang | |
| 2010/0070876 A1 | 3/2010 | Jain et al. | |
| 2011/0214075 A1 | 9/2011 | Vongphouthone et al. | |
| 2012/0278704 A1 | 11/2012 | Ying et al. | |
| 2013/0021377 A1 | 1/2013 | Doll | |
| 2013/0024757 A1 | 1/2013 | Doll et al. | |
| 2013/0061160 A1 | 3/2013 | Tseng | |
| 2013/0097186 A1 | 4/2013 | Van Hoff | |
| 2013/0099447 A1* | 4/2013 | Patton | A63F 1/02 273/293 |
| 2013/0111395 A1 | 5/2013 | Ying et al. | |
| 2013/0151959 A1 | 6/2013 | Flynn, III et al. | |
| 2013/0219255 A1 | 8/2013 | Van Hoff et al. | |
| 2013/0254063 A1* | 9/2013 | Stone | G06Q 30/0603 705/26.5 |
| 2013/0254705 A1 | 9/2013 | Mooring et al. | |
| 2014/0074624 A1 | 3/2014 | Ying et al. | |
| 2014/0074863 A1 | 3/2014 | Walkingshaw et al. | |
| 2014/0074934 A1 | 3/2014 | Van Hoff et al. | |
| 2014/0075275 A1 | 3/2014 | Aleksandrovsky et al. | |
| 2014/0075289 A1 | 3/2014 | Brant | |
| 2014/0075339 A1 | 3/2014 | Weskamp et al. | |
| 2014/0089789 A1* | 3/2014 | Schowtka | G06F 17/212 715/243 |
| 2014/0096014 A1 | 4/2014 | Johnson et al. | |
| 2014/0173417 A1 | 6/2014 | He | |
| 2014/0198127 A1 | 7/2014 | Ying | |
| 2014/0210843 A1* | 7/2014 | VanCuren, Jr. | G06T 11/001 345/589 |
| 2014/0245128 A9 | 8/2014 | Brant | |
| 2014/0320535 A1 | 10/2014 | Ying | |
| 2014/0351268 A1 | 11/2014 | Weskamp et al. | |
| 2015/0100587 A1 | 4/2015 | Walkingshaw et al. | |

OTHER PUBLICATIONS

U.S. Appl. No. 14/678,330, filed Apr. 3, 2015.
U.S. Appl. No. 14/678,337, filed Apr. 3, 2015.
U.S. Appl. No. 14/678,308, filed Apr. 3, 2015.
Sarah Sluis, "Harper's Bazaar Pursues Shoppable Ads With Streamwize", http://adexchanger.com/publishers/harpers-bazaar-pursues-shoppable-ads-with-streamwize/, Jul. 24, 2014, downloaded on May 22, 2015.
Paul Adams, "The End of Apps as We Know Them", https://blog.intercom.io/the-end-of-apps-as-we-know-them/, published around Nov. 2014, downloaded on May 22, 2015.
Paul Adams, "Why Cards are the Future of the Web", https://blog.intercom.io/why-cards-are-the-future-of-the-web/, published around Sep. 2013, downloaded on May 22, 2015.
Allison Schiff, "Sharethrough Brings Its Version of Twitter Cards to the Masses", http://adexchanger.com/native-advertising-2/sharethrough-brings-its-version-of-twitter-cards-to-the-masses/, Dec. 17, 2014, downloaded on May 26, 2015.
Sarah Perez, "Storytelling App Steller Becomes More of a Social Network", http://techcrunch.com/2014/08/21/storytelling-app-steller-becomes-more-of-a-social-network/, Aug. 21, 2014, downloaded on May 26, 2015.
Kaylene Hong, "Steller is a Beautiful Visual Storytelling App, Similar to Storehouse, but for Your iPhone Instead", http://thenextweb.com/apps/2014/03/13/steller-is-a-beautiful-visual-storytelling-app-similar-to-storehouse-but-for-your-iphone-instead/, Mar. 13, 2014, downloaded on May 27, 2015.
Jayanth Prathipati, "Why Do All Mobile Roads Lead Back to the Palm Pre?", http://thetechblock.com/mobile-roads-lead-back-palm-pre/, published on Jun. 11, 2014, downloaded on May 27, 2015.
Pictela, "Introduction to Pictela", http://www.pictela.com/docs/getting-started/introduction-to-pictela, from Wayback Machine indicating Wayback retrieval date of Mar. 18, 2015, downloaded on Jun. 5, 2015. (Pictela_Intro).
Pictela, https://web.archive.org/web/20130908132533/http://www.pictela.com/formats, from Wayback Machine indicating Wayback retrieval date of Sep. 8, 2013, downloaded on Jun. 5, 2015. (Pictela_Formats).
Twitter, https://web.archive.org/web/20150324121730/https://dev.twitter.com/cards/getting-started, from Wayback Machine indicating Wayback retrieval date of Mar. 24, 2015, downloaded on Jun. 5, 2015. (Twitter_Getting_Started).
Twitter, https://web.archive.org/web/20140929154946/https://dev.twitter.com/cards/overview, from Wayback Machine indicating Wayback retrieval date of Sep. 29, 2014, downloaded on Jun. 5, 2015. (Twitter_Overview).
Max Bulger, "Why Cards?", http://blog.trywildcard.com/post/93983166893/why-cards, published on Aug. 6, 2014, downloaded on May 26, 2015.
Streamwize, http://www.streamwize.com, downloaded on May 22, 2015. (Streamwize).
Streamwize, https://web.archive.org/web/20141222085204/http://www.streamwize.com/#introduction, from Wayback Machine indicating Wayback retrieval date of Dec. 22, 2014, downloaded on Jun. 5, 2015. (Streamwize V2).
Steller, "Everyone has a story to tell. Tell yours with photos, videos and texts", https://steller.co, from Wayback Machine indicating Wayback retrieval date of Apr. 5, 2014, downloaded on Jun. 5, 2015.
Max Bulger, "Introducing the Wildcard iOS SDK", http://blog.trywildcard.com/, Feb. 23, 2015, downloaded on May 26, 2015.
Wildcard, http://www.trywildcard.com/, from Wayback Machine indicating Wayback retrieval date of Feb. 8, 2014, downloaded on Jun. 5, 2015. (WC_homepage).
Wildcard, https://web.archive.org/web/20141115090135/http://www.trywildcard.com/docs/intro, from Wayback Machine indicating Wayback retrieval date of Nov. 15, 2014, downloaded on Jun. 5, 2015. (intro V1).
Wildcard, https://web.archive.org/web/20150321155952/http://www.trywildcard.com/docs/intro, from Wayback Machine indicating Wayback retrieval date of Mar. 21, 2015, downloaded on Jun. 5, 2015. (intro V2).
Wildcard, https://web.archive.org/web/20141115171158/http://www.trywildcard.com/docs/overview, from Wayback Machine indicating Wayback retrieval date of Nov. 15, 2014, downloaded on Jun. 5, 2015. (arch Overview V1).
Wildcard, https://web.archive.org/web/20150321162417/http://www.trywildcard.com/docs/ overview, from Wayback Machine indicating Wayback retrieval date of Mar. 21, 2015, downloaded on Jun. 5, 2015. (arch overview V2).
Wildcard, https://web.archive.org/web/20150520042344/http://www.trywildcard.com/docs/overview/, from Wayback Machine indicating Wayback retrieval date of May 20, 2015, downloaded on Jun. 5, 2015. (arch overview V3).
Wildcard, https://web.archive.org/web/20141115090625/http://www.trywildcard.com/docs/sdk/quickstart_sdk, from Wayback Machine indicating Wayback retrieval date of Nov. 15, 2014, downloaded on Jun. 5, 2015. (SDK_QS_V1).
Wildcard, https://web.archive.org/web/20150321172000/http://www.trywildcard.com/docs/sdk/quickstart_sdk, from Wayback Machine indicating Wayback retrieval date of Mar. 21, 2015, downloaded on Jun. 5, 2015. (SDK_QS_V2).
Wildcard, https ://web.archive.org/web/20141115090143/http://www.trywildcard.com/docs/sdk/java_sdk, from Wayback Machine indicating Wayback retrieval date of Nov. 15, 2014, downloaded on Jun. 5, 2015. (WC_Java_V1).
Wildcard, https://web.archive.org/web/20150321184716/http://www.trywildcard.com/docs/sdk/java_sdk, from Wayback Machine indicating Wayback retrieval date of Mar. 21, 2015, downloaded on Jun. 5, 2015. (WC_Java_V2).
Wildcard, https://web.archive.org/web/20141115090150/http://www.trywildcard.com/docs/sdk/ruby_sdk, from Wayback Machine indicating Wayback retrieval date of Nov. 15, 2014, downloaded on Jun. 5, 2015. (WC_Ruby_V2).
Wildcard, https ://web.archive.org/web/20150321180400/http://www.trywildcard.com/docs/sdk/ruby_sdk, from Wayback Machine indicating Wayback retrieval date of Mar. 21, 2015, downloaded on Jun. 5, 2015. (WC_Ruby).

(56) References Cited

OTHER PUBLICATIONS

Wildcard, https://web.archive.org/web/20141115090647/http://www.trywildcard.com/partners, from Wayback Machine indicating Wayback retrieval date of Nov. 15, 2014, downloaded on Jun. 5, 2015. (WC_Partners_V1).

Wildcard, https://web.archive.org/web/20150315070647/http://www.trywildcard.com/partners, from Wayback Machine indicating Wayback retrieval date of Mar. 15, 2015, downloaded on Jun. 5, 2015. (WC_Partners_V2).

Wildcard, https://web.archive.org/web/20141126020058/http://www.trywildcard.com/docs/faq/, from Wayback Machine indicating Wayback retrieval date of Nov. 26, 2014, downloaded on Jun. 5, 2015. (FAQ_V1).

Wildcard, https://web.archive.org/web/20150512091432/http://www.trywildcard.com/docs/ios-sdk/tutorials, from Wayback Machine indicating Wayback retrieval date of May 12, 2015, downloaded on Jun. 5, 2015. (WC_IOS_Tutorials_V1).

Wildcard, https ://web.archive.org/web/20150512091432/http://www.trywildcard.com/docs/ios-sdk/tutorials, from Wayback Machine indicating Wayback retrieval date of May 12, 2015, downloaded on Jun. 5, 2015. (WC_IOS_Sample_Projects_V1).

Wildcard, https://web.archive.org/web/20141115171308/http://www.trywildcard.com/docs/schema, from Wayback Machine indicating Wayback retrieval date of Nov. 15, 2014, downloaded on Jun. 5, 2015. (WC_Card_Schema_V1).

Wildcard, https://web.archive.org/web/20150518060819/http://www.trywildcard.com/docs/schema, from Wayback Machine indicating Wayback retrieval date of May 18, 2015, downloaded on Jun. 5, 2015. (WC_Card_Schema_V2).

Wildcard, http://www.trywildcard.com/docs/faq#shopify, not available on Wayback Machine, downloaded on Jun. 5, 2015. (WC_FAQ_V2).

U.S. Office Action dated Jul. 31, 2015 from U.S. Appl. No. 14/678,330.

Friendly Bit, "Rendering a Web Page—Step by Step", published on Jan. 11, 2010.

Hegaret et al., "What is the Document Object Model", published on Nov. 7, 2003.

GitHub, "Reading & Writing JSON", published on Oct. 6, 2013.

U.S. Office Action dated Aug. 13, 2015 from U.S. Appl. No. 14/678,337.

U.S. Office Action dated Aug. 14, 2015 from U.S. Appl. No. 14/678,308.

U.S. Final Office Action dated Dec. 1, 2015 from U.S. Appl. No. 14/678,330.

Jacqueline Thomas, A Serious Look at Card Based Design, [retrieved on Nov. 17, 2015].Retrieved from the internet: http://webdesignledger.com/card-based-design.Jun. 12, 2014.

* cited by examiner

```
<!DOCTYPE html>
<html>
    <head>
        <meta charset="utf-8" />
        <meta name="viewport" content="width=device-width,
initial-scale=1, maximum-scale=1, user-scalable=no, minimal-ui" />

<title>Wrap</title>                 1403

<link href="//fonts.googleapis.com/
css?family=Open+Sans:300,400,600,700" rel="stylesheet" type="text/
css" />                                                                  1405
              <link href="/main.css?1421357063794" rel="stylesheet" /
>                                                                        1407
              <link rel="icon" type="image/png" href="/images/wrap-
favicon-transparent.png" />
        <base href="/" />
    </head>
    <body id="body">
        <div class="ng-view wrap-container"></div>     1409

<script src="/main.js?1421357063794"></script>    1402
    </body>
</html>
```

*FIG. 13*

CARD BASED PACKAGE FOR DISTRIBUTING ELECTRONIC MEDIA AND SERVICES

CROSS REFERENCE TO RELATED APPLICATIONS

This application is a Continuation of U.S. patent application Ser. No. 14/669,395, filed Mar. 26, 2015. This application also claims the benefit of U.S. Provisional Patent Application Nos. 62/062,056 and 62/062,061, both filed Oct. 9, 2014 and entitled "WRAPPED PACKAGES OF CARDS FOR CONVEYING A NARRATIVE WITH MEDIA CONTENT, PROVIDING APPLICATION FUNCTIONALITY AND ENGAGING USERS IN E-COMMERCE". This application further claims priority of U.S. Provisional Patent Application Nos. 62/084,171, filed Nov. 25, 2014; 62/091,866, filed Dec. 15, 2014; 62/114,675, filed Feb. 11, 2015, and 62/133,574 filed Mar. 16, 2015, each entitled "CARD BASED PACKAGE FOR DISTRIBUTING ELECTRONIC MEDIA AND SERVICES". Each of these priority applications is incorporated herein by reference.

BACKGROUND

This invention relates to distributing media content over communication networks, and more particularly, to a system and method for delivering wrapped packages of cards, each card selectively including (i) media content, (ii) application functionality and/or (iii) e-commerce related services. The cards of the wrap packages are ideally authored in one or more linear sequences so that a book-like narrative unfolds, not only through the cards themselves, but also by the transition between the cards, as they are sequentially browsed. In addition, the wrap packages are portable objects that may exist within a social feed or within a custom application. Wrap packages are also readily distributed, similar to electronic messages, through e-mail, messaging, social-media, or via a variety of other electronic communication platforms. As a result, wrap packages are consumable, shamble and savable objects. As the cards are browsed in the one or more linear sequences during consumption, the user experiences the unfolding of the authored narrative, including the defined media content interwoven with the complementary application functionality and/or e-commerce related services. As a result, the entire user experience including any application functionality and/or e-commerce related services is substantially contained within the context of the wrap package itself, typically (but not necessarily) without the need to navigate to other sites.

Media content developers have a variety of authoring tools, document formats and content delivery schemes that can be used to create and present media content to users over networks, such as the Internet. The content may be presented to users through a variety of mechanisms, including via websites, through the use of a mobile application (i.e., a mobile app) and downloadable documents such as PDF files, PowerPoint presentations, etc. Each of these delivery mechanisms, however, has limitations, particularly within a mobile computing environment.

PDF files, while relatively simple to author, have a number of limitations. The content of PDF files is static. Once created and delivered to a user over a network, there is no way for the viewer to interact, through the PDF file, with the distributor. For example, retailers commonly create PDF versions of product catalogs, which are distributed via a web page or email. When the PDF file is opened, however, the document is limited to only viewing. The viewer is unable to interact through the PDF file with the retailer, for instance, to ask questions about a particular item or to make a purchase. Also since PDFs are not dynamic documents, they need to be delivered to a consuming device as a single binary block. As a result PDFs, especially if they are graphic intensive, are typically large files, which may be difficult to distribute, especially over wireless networks to mobile devices. Furthermore, most PDF files are created for viewing on desktop computers, which have relatively large display screens. As a result, the viewing of these PDF files on a mobile device, such as a mobile phone with a relatively small viewing screen, often provides a poor user experience.

Websites typically include one or more web pages that are accessed and viewable through a browser. Web pages are typically written in HTML5, CSS and JavaScript and include information such as text, colors, backgrounds, and often links to images and other types of media, to be included in the final view of the web page when displayed through the browser. Layout, typographic and color-scheme information is typically defined by a style sheet language (CSS), which can either be embedded in the HTML or can be provided by a separate file, which is referenced from within the HTML. When the URL of a web page is accessed, the hosting web server will access and serve the appropriate files during a session with the requesting device. The browser, running on the requesting device, will then present to the user the media content in the format dictated by the HTML, as authored by the web page designer. In addition, web pages often include embedded hyperlinks. When selected, typically with a pointing device such as a mouse, stylus or a finger, the hyperlink will navigate to a new web page or media.

There are a number of advantages and disadvantages of using web sites for presenting media content to users. Web sites are typically "destinations", meaning a potential viewer is usually required to navigate to the web site to consume its content and functionality. Web sites are thus generally not considered as portable objects that can be readily delivered to consumers and other viewers, similar to messages. In addition, web sites are typically optimized for desktop computing, providing a rich opportunity for user interaction. With mobile devices, however, particularly mobile phones or wearable computing devices such as smart watches, small display screens and limited input/output capabilities, often results in a poor user experience. When viewing a web site through a screen on a mobile phone for example, it is often very difficult to read text and view images. It is also very difficult to input data and navigate from one web page to another. As a result, the user experience of accessing and viewing web sites on mobile computing devices is often frustrating, resulting in a poor user experience. In addition, the authoring of highly interactive, content-driven, web sites designed to create a positive user experience often requires a high degree of software expertise and sophistication. As a result, the creation of web sites designed for Internet commerce, for instance, is often very expensive and beyond the financial means of many small businesses and organizations.

More recently with the proliferation of "smart" mobile phones and tablets, mobile applications (often referred to as "apps") have become exceedingly popular. Mobile apps are typically "stand alone" or monolithic software programs, designed to perform a specific task or function, and intended to run on smart phones, tablet computers and other mobile devices. An extremely wide variety of apps are now commonplace, such as productively tools like email, calendars, etc., gaming, GPS services such as Google Maps, text and/or voice messaging, live communication such as Skype, online banking, etc., to name just a few. With their growing popularity, to a significant degree, apps have replaced web sites as the preferred method for content providers to create and distribute media content to mobile computing device users.

Apps also have many advantages and disadvantages. On the positive side, apps often provide a content rich, rewarding, user experience. A well-designed app allows users to sequence through a number of views, presenting content to users in an orderly fashion. On the negative side, apps are typically "stand alone" software applications that do not easily interact with other software applications. As result, the functionality of apps is often limited, typically only capable of performing the specific task(s) that they were designed to perform, and working only with the specific endpoints contemplated at the time they were developed. As a result, it is often difficult, although not impossible, to create the necessary integration functionality for a user to purchase a product and/or service through the app. Also, the design and authoring of apps is typically very complex and requires a very high level of design engineering expertise to create apps that are professional-looking and appealing. In addition, apps typically are not cross-platform. App developers usually have to create and distribute multiple versions of the same app for the iOS/Apple, Android/Google and the Microsoft platforms for example. As a result, the development and maintenance costs associated with creating and distributing an app is complex and very expensive. Finally, apps typically have to be distributed through an application aggregator, such as the Apple App Store or Google Play. Apps, therefore, typically cannot be directly downloaded from the author/creator to users or consumers.

Recent advances in iOS 8 and Android, with multiple APIs, are making it easier for multiple apps to communicate with one another. It is now possible, for example, to integrate iTune purchases as in-app purchase or to purchase a physical product using an app like Shopify outside of the Apple environment and not bound by Apple purchase policies. In addition, tools are now available, such as Sencha and PhoneGap, to create a web-based multi-platform native app using HTML/CSS/JS (JavaScript) and embed them into a web view container inside of a native app package.

However, even with these recent advances, it is still very difficult for content providers to create a package of media content and functionality that conveys a compelling narrative, is portable and designed to provide a similar user experience on multiple devices, including mostly mobile devices, and is self-contained, meaning the recipient typically does not need to navigate to other sites to reap all the desired benefits and/or advantages contemplated by the distributor of the media.

SUMMARY

A variety of data structures, components, runtime viewers and methods are described for defining, delivering and rendering wrapped packages of cards in a manner that is particularly well suited, but not limited to, display on mobile devices. Each card may selectively include media content, and a palette of application functionality and/or supporting e-commerce related services. The cards of the wrap packages are ideally threaded together into one or more linear sequences, and authored to convey a book-like narrative that unfolds as the cards are sequentially browsed. In addition, the wrap packages are portable objects that are readily distributed, similar to other electronic messages, through e-mail, messaging, social-media, or via a variety of other electronic communication platforms. As a result, wrap packages are consumable, sharable and savable objects. As the cards are browsed in the one or more linear sequences during consumption, the user experiences the unfolding of the authored narrative, including the palette of complementary services and functionality interwoven with the defined media content.

In a non-exclusive embodiment, the data structure of a wrap package is defined in terms of a wrap descriptor, which defines the structure, layout and content of a set of cards of the wrap suitable for display on a display device (e.g. a computer display) separate from their presentation. In some embodiments, the wrap descriptor may also include a plurality of card descriptors, each card descriptor arranged to define the content, structure, layout and/or presentation of an associated card respectively. The wrap descriptor may have an associated unique identifier that can used to access the wrap and may take the form of a data object, such as a JSON (JavaScript Object Notation) data object. A unique card identifier is also preferably associated with each of the cards which helps facilitate reuse of the same card in different wraps.

In various other non-exclusive embodiments, each card preferably has one or more components and the associated card descriptor has a layout that defines the presentation of the associated card and the associated components. The components defined in the card descriptor typically have associated content intended for display when the associated card is rendered and may optionally include one or more subcomponents. The layout may include a unique layout identifier and/or a layout definition. The descriptor may be used to associate various behaviors, styles and/or other attributes with specific cards/components/sub-components, etc. Within the descriptor structure, specific component and/or card behaviors may be declared rather than embedded in the card itself. Triggers may also optionally be included within a card to trigger an action in response to an event that occurs while the associated card is displayed. Virtually any type of computer detectable event can be used as a trigger, as for example: a user input that selects a selected component while the associated card is displayed; a system generated event; a change of state within the wrap when the wrap is displayed; etc.

In another aspect, a runtime viewer is used to render a runtime instance of a wrap. In some embodiments, a wrap descriptor is returned to the runtime viewer in response to a request for a particular wrap. In such embodiments, the runtime viewer is arranged to render a wrap instance based on the wrap descriptor and preferably includes, or has the ability to obtain, the definitions of any behaviors declared in the wrap descriptor.

The use of the above-described descriptor(s) and architecture(s) to define and render wraps makes the wraps highly portable and can help free the author of a wrap from the need to understand the idiosyncrasies of the various computing platforms that the wrap may be rendered on. At the same time, the ability to easily impart interesting behaviors, styles and other attributes to cards and card components in a modular way can simplify the creation of media rich content in a visually compelling manner while facilitating the integration of a wide variety of different behaviors, services and/or functionalities with the card content in a format that is very well suited for presentation on mobile devices and a wide variety of other computing platforms and content consumption devices.

Wrap packages thus allow businesses and other organizations to simply and cheaply create, distribute, and manage storytelling mobile web user experiences, app like functionality, all delivered directly to consumers in the form of a wrap package. Where businesses used to have to build destinations (websites) or use monolithic systems (apps), they can now provide consumers, particularly mobile device users, with a user experience that delivers the content they want combined with a complementary palette of functions and/or e-commerce related services. Wrap packages thus solves a number of current problem with the mobile web. Unlike web sites, wrap packages are easy to consume on mobile devices and offer the opportunity to create compelling narratives and user experiences. In addition, the ability to incorporate app-like functionality into wraps provides a multi-function app-like experience, without having to be in an app, download an app, or open several apps.

BRIEF DESCRIPTION OF THE DRAWINGS

The invention and the advantages thereof, may best be understood by reference to the following description taken in conjunction with the accompanying drawings in which:

FIG. 13 illustrates the contents of a representative shim suitable for use in the method of FIG. 11.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1:
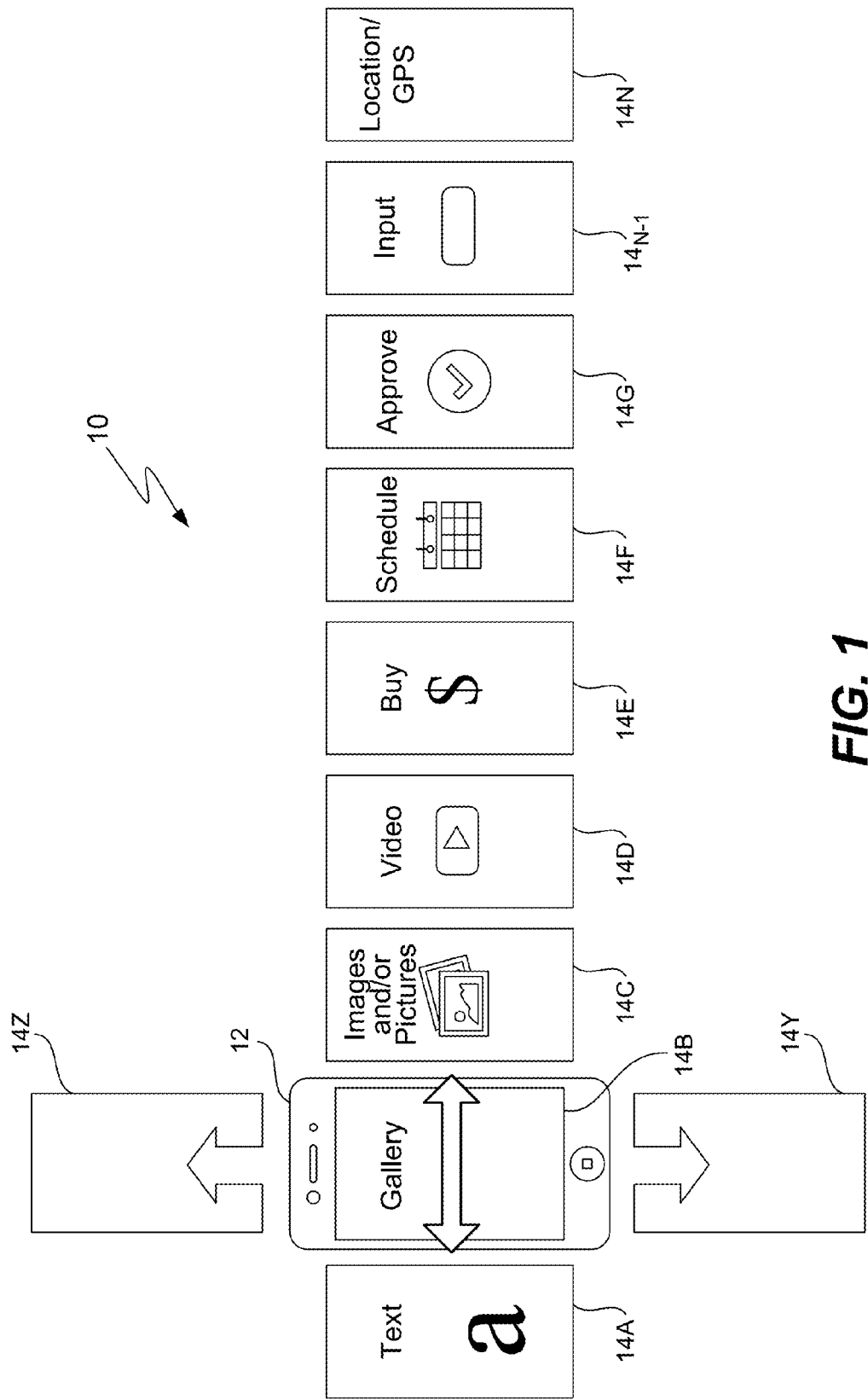
FIG. 1 is a diagram illustrating a wrap package layout that includes a plurality of cards threaded together so as to be viewable in linear arrays in accordance with the principles of the present invention.

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

The present invention is directed to the mechanisms that support the distribution of media content, and a corresponding palette of application functionality and/or e-commerce related services, in the form of wrapped packages of cards (interchangeably referred to herein as a "wrap", "package" or "wrap package").

In a non-exclusive embodiment, wrap packages are a mobile-first marketing and commerce platform that ideally provides a beautiful world of storytelling in bite-size moments that get and hold attention. In other embodiments, wrap packages can be used and distributed to other platforms, such a desktop computers or Smart TVs for example. Wrap packages, although highly suitable for mobile, are not limited only to mobile devices.

Wrap packages takes content combined with mobile app and website functionality and makes them into an elegant card-based narrative that is delivered in the browser as a sharable and savable message. Wrap packages thus provides an app-like user experience that is delivered as a live, interactive message from a cloud-based platform, using for example, the Software as a Service (SaaS) model.

The uniqueness of wrap packages creates opportunities for business and other organizations alike to innovate and improve marketing efforts, customer support, and user experiences in ways previously not possible, because an enabling interface and platform did not exist. Wrap packages can thus potentially define the next generation interactive web paradigm, particularly for mobile, although for desktop and other types of devices as well.

By authoring wrap packages, businesses and other organizations can simply and cheaply create, distribute, and manage storytelling mobile web user experiences, app like functionality, all in the context of wrap packages delivered directly to consumers. Where businesses used to have to build destinations (websites) or use monolithic systems (apps), they can now provide consumers, particularly mobile device users, with a user experience that delivers the content they want combined with a complementary palette of functions and/or e-commerce related services.

Wrap packages are also platform and device independent. Wraps do not have to be written for any specific platform, such as iOS or Android, or for any specific device or class of devices (e.g. smart phones, tablets, desktops, etc.). On the contrary, a wrap package need be authored once and it will run on almost any device, regardless of the operating system or the type. This ubiquity, along with the ability to easily distribute wrap packages similar to messages, is a powerful construct that potentially can make the use of wrap packages near universal.

Wrap packages thus solves a number of current problem with the mobile web. Unlike web sites, wrap packages are easy to consume on mobile devices and offer the opportunity to create compelling narratives and user experiences. In addition, the ability to incorporate app-like functionality into wraps provides a multi-function app-like experience, without having to be in an app, download an app, or open several apps.

A wrap is a portable container of multimedia content, such as text, images, photos, audio, video and the like, and interactive services designed for ease of delivery, exchange, and consumption. It is comprised of a collection of cards, which, from an end-user/consumer perspective, are atomic units of the aforementioned multimedia content and interactive services.

The cards in a wrap have an explicit sequence so that, when taken as a whole, they are ideal for, but not necessarily limited to, creating a narrative story as the cards are browsed in the defined sequence. The multimedia content and/or interactive services contained by any given card can be determined entirely in advance or as late as the moment the wrap is consumed by the end-user.

Cards have a visual representation intended to evoke similarities to their physical counterparts. They have a fixed portrait aspect ratio that makes them ideally suited to current mobile computing devices as well as easy to scale up to and arrange to fit other display form factors, such as provided on laptop and desktop computers as well as smart TVs. The physical card metaphor can also extend to the interactive behavior of cards in a wrap, as the user can use gestures that evoke the "flipping" of cards in a deck or bound booklet to navigate between them.

Cards, however, however can differ from their physical counter-parts in ways that provide for unique presentations of content or the aforementioned interactive services. For example, a gallery card provides the ability to present an expanded amount of content in a vertically stacked orientation such that the overall length (i.e., the number of cards in a horizontal sequence) of the wrap is not affected by the amount of content in the wrap. This aids in navigation since the user can flip to the previous or next card regardless of their current position in the gallery.

The app-like functionality and interactive features implemented within cards include, but are not limited to, for example the ability to open hyperlinks to additional content on the web, such as maps or a shopping cart, which can be presented in a modal overlay called a cul-de-sac. The cul-de-sac allows for interaction with a traditional flow of web content without losing a viewer's position within the wrap. When the interaction is complete, the cul-de-sac is dismissed, returning the viewer to the original card in which the cul-de-sac was initiated. Other services may use input from the user or a remote source to dynamically generate the content on a card. These are just a few illustrative examples of the app-like functionality and interactivity that can be built into the cards of wrap packages.

The wrap package data structure definition, or schema, contains a unique identifier and descriptive metadata for the wrap and contains a card package for each card in the wrap. Similar to the wrap package, the card package is an abstract, platform-independent data structure representing the contents of a card, which is a composition of components representing internal atomic units of content such as text or an image or other nested containers of components. Components may also represent content that is dynamically generated at the time of consumption, for example, by fetching content from the Internet or by processing input from the user.

Cards are thus like containers for holding and distributing media content, such as text, images, photos, audio, video and the like. In addition, cards may also contain or hold executable objects that provide or enable real-time features, such as application functionality (i.e., the ability to schedule appointments, engage in online chats or conversations) and support e-commerce related services (i.e., the ability to purchase goods and/or services). Such media content and executable objects are sometimes referred to herein as card "assets." Cards are also consumable anywhere, meaning they have the ability to be resolved and displayed on just about any type of device (mobile phones, laptops, tablets, wearable computing devices such as smart watches, desktop computers, smart TVs, etc.), regardless of the platform (e.g., iOS, Android, Microsoft, etc.). In addition, cards are a navigation metaphor. Each card can be authored to group related information that can be easily consumed within a user interface experience by swipe (or other simple gesture) navigation from card-to-card. Wrap packages thus represent a holistic, book like, narrative approach to presenting information and providing application and/or e-commerce related services to users and consumers, particularly those using mobile devices, such as smart phones and tablet computers.

In addition, each card in a wrap has defined content that is displayed in a predefined layout. In general, the cards in a wrap have the same size and aspect ratio. The aspect ratio is preferably device independent and is preferably maintained regardless of device orientation and/or display window size.

Referring to FIG. 1, a diagram of a non-exclusive embodiment of a wrap package 10 viewable on a computing device 12 is illustrated. The wrap package 10 includes a plurality of cards 14 that are threaded together so as to enable browsing by swiping in one or more linear sequences. Any of the cards 14 may optionally include various types of media, such as text, images or photos, audio, video, a live or streaming feed of media, 3-D objects, or content from other wrap packages (not illustrated). Any of the cards 14 may also optionally provide application functionality, such as the ability to receive input data or display dynamically generated data, a calendar for scheduling or booking appointments or making reservations for goods and/or services, location/GPS, etc. In addition, any of the cards 14 may optionally provide or support e-commerce services, such as the ability to browse products in a catalog, communicate with an online sales representative, and/or purchase product(s).

By way of example, in the schematically illustrated wrap package 10, card $14_A$ includes text, card $14_B$ presents a gallery, card $14_C$ includes images or pictures, card $14_D$ includes a video, card $14_E$ includes e-commerce related service(s), card $14_F$ includes a calendar function for scheduling appointments and/or booking reservations, card $14_G$ includes a user approval function, $14_{n-1}$ includes a data entry function, card $14_N$ includes location or GPS services, etc.

On computing devices with touch sensitive screens, the cards 14 of wrap packages 10 can be navigated linearly by swiping or by using other suitable interfaces, such as a stylus or pen. In devices without a touch sensitive screen, alternative user interfaces are provided to facilitate transition (e.g., flipping) from one card to the next. In the context of the present application, the terms "swipe-browsing" or "swiping" is intended to mean the navigation from one card to an adjacent next card. With devices with touch sensitive screens, swipe browsing is typically implemented by the sliding of a finger or other input device across the display. With devices without touch-sensitive screens, other navigation tools such as a mouse, keyboard or remote control, can be used for swipe browsing. When a swipe is performed, the content of the next card in the sequence is displayed. For example, by swiping either right to left or vice versa, the next card, depending on the swipe direction, in the horizontal sequence is displayed. Similarly, by swiping up and/or down, the next card in either the up or down sequence is displayed. Thus, the user experience when consuming a wrap package is the wrap package itself (as opposed to a remote web site for example), viewable via a swipe-able interface.

Additionally, some cards may also include one or more embedded link(s) that, when selected, enable navigation to either a non-adjacent card not in linear sequence or to another wrap package, a web page or some other location entirely outside of the wrap package.

It should be noted that the particular layout of cards 14 in the wrap package 10 illustrated in FIG. 1 is merely illustrative. Both the number of rows and/or columns, and the number of sequential cards 14 within any given row or column, may vary widely as appropriate to deliver the desired user experience, narrative, content, functionality and services of the wrap package 10.

With gallery cards, such as card $14_B$ of FIG. 1, swiping allows for the scrolling through of the contents of a card 14, which are typically too voluminous to be displayed within the size of a fixed screen display, such as that provided on a mobile phone. In an illustrative example, a particular wrap package 10 may include a plurality of cards organized in a horizontal sequence. By swiping right to left or vice versa, the next card 14 or the previous card 14 in the horizontal sequence is displayed. In the vertical direction, however, one or more selected cards $14_B$ may be configured in the gallery format, allowing the viewer to scroll up or down by swiping through media content of the gallery. In an illustrative but non-exclusive example, a wrap package 10 authored and distributed by a car rental business may include a horizontal sequence of cards 10, each dedicated to a category of information pertinent to a traveler (i.e., cards dedicated to local hotels, restaurants, local tourist attractions respectively). By swiping up or down for a given card, relevant material within each category is displayed in a gallery format. For instance by swiping up or down the hotel card (not illustrated), a gallery of a number of local hotels is displayed. In variations of the gallery card format, the behavior invoked by an up or down swipe may differ. For example, swiping up or down my result in a continuous "rolling" of the content of the gallery card. In other embodiments, an up or down swipe may result in a "snap" action with the next item of content appearing after the snap, for example, as illustrated as cards 14Y and 14Z in FIG. 1.

The wrap package 10 is identified, as described in more detail below, through the use of a unique identifier (wrap ID 42) assigned to the package 10. By way of example, the wrap ID 42 may take the form of a Uniform Resource Identifier (URL). As such, the wrap ID may thus be provided as a link, which can readily be used to effectively send or retrieve the wrap package. That is, the wrap package may effectively be "sent" to a potential viewer as a link using any of the wide variety of mechanism that can currently—or in the future—be used to send a link or convey the URL. By way of example, this may include e-mail messages, text messages, SMS messages, via a Twitter tweet, as a post on social media such as Facebook, etc., discussion forums, walls or the like, as a link embedded in a document, an image, or a web page or any other media type, in a blog or microblog (e.g. Tumblr), or any other messaging or electronic content distribution mechanism or communication platform currently known or developed in the future.

Wrap packages are therefore significantly different and more powerful than web sites. For example with wrap packages, they can be consumed "on the spot" where it is located (i.e., when delivered to a mobile device for example). In contrast with the selection of a banner ad appearing within a web site, where the viewer is taken to a new web page that is not (a) necessarily designed for mobile devices and (b) is self navigating, making it very difficult for a narrative to be conveyed. As a result, the user experience, particularly on mobile devices, may be very poor. Hence, the friction of providing a compelling user experience with wrap packages is far less than with web site.

The cards 14 of a wrap 10 can be displayed on the screen of virtually any type of computing device. It should be appreciated that the card metaphor is particularly well suited for use on mobile devices such as smart phones, tablet computers, etc., which makes the format particularly powerful for authors interested in developing content tailored for mobile devices. By delivering wrap packages 10 to mobile devices, users and potential customers can be won over at their point of intimacy, where they spend their time and consciousness. Wrap packages thus allow authors, merchants and other content providers to create compelling narratives and provide ongoing application functionality and/or e-commerce support directly delivered anytime and anywhere to users, transforming their mobile devices into a powerful business tool that enhances mobile engagement and relationships. As a result, higher customer satisfaction, better brand engagement, and a higher conversion (i.e., click-through rates) and repeat e-commerce related activity compared to other forms of after sale promotions and merchandising will likely result.

Figure 2:
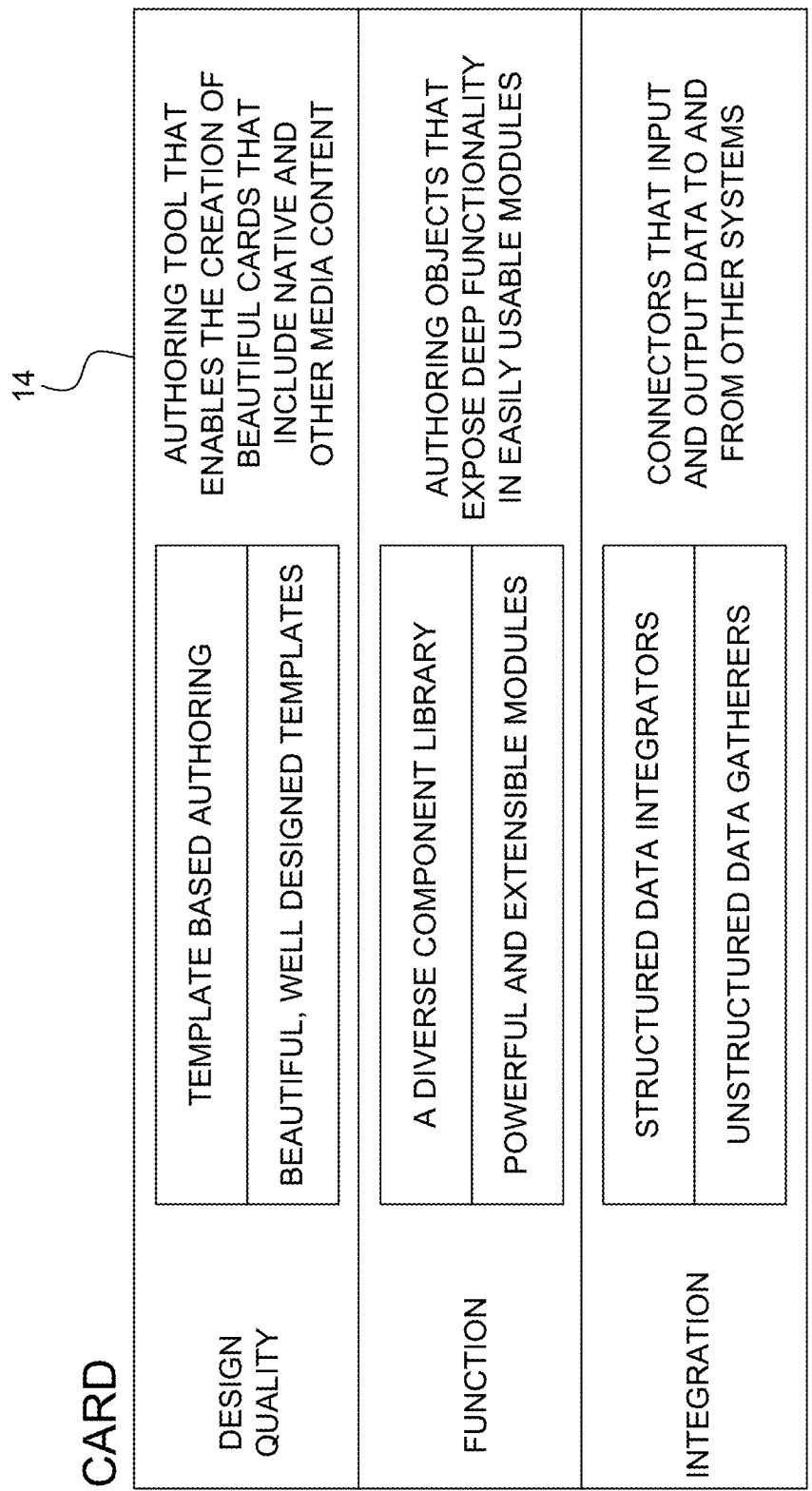
FIG. 2 is a diagram depicting the design, functionality and data integration capabilities of a representative card in a digital companion wrap package according to the principles of the present invention.

Referring to FIG. 2, a diagram depicting the design, functionality and data integration capabilities of a representative card 14 in a wrap package 10 is shown.

By using card templates, authoring tools and media collaboration tools, beautiful, content-rich, cards 14 may be created either by automation or by individuals with even minimal design skills and experience. As such, the author, either a person or an automated process, has the ability to easily create beautiful content-rich cards 14 that can selectively include text, images, photos, and other media similar to PDF files, but optionally, with the added benefit of additional application functionality and/or e-commerce related services, either embedded in the same card 14, or other cards 14, in the wrap package 10. In the automated authoring embodiments, the content of a card 14 can be populated by a data processing system that automatically uploads predefined content into various defined fields of a card template.

By authoring (i) the horizontal and/or vertical sequence order for swipe-browsing the cards 14, (ii) the media content in each card 14, (iii) application functionality and/or (iv) the e-commerce services for each card 14, it is possible to author wrap packages 10 that are content-rich, highly interactive, and that define a palette of services, functions and experiences related to the wrap package 10, all within the context of a story book-like narrative that unfolds as the cards 14 are browsed in their sequence order(s).

In addition, the use of component libraries and the authoring tools allow for the authoring of cards 14 with a diverse, easy to use, reusable, set of component modules that provide a wide variety of application functions and e-commerce services. Such application functions include, but are not limited to, for example, calendar functions, scheduling of an appointment functions, reserving or booking goods and/or services, such as a car rental, hotel room, or table at a restaurant, map or GPS related functions, support for online conversations, streaming live video or other media feeds, etc. In addition, e-commerce related services include displaying product and/or service offerings, displaying user account information, engaging a sales representative in an online chat session, and enabling the purchase of goods and/or services, etc. These card services or "plugins" are all part of an ecosystem supported by a Wrap run-time engine viewer (described in more detail below), which allows the various plug-in services to all communicate and inter-operate together. For example, a calendar plugin could be configured to communicate with a reservation booking database plugin, which could communicate with a chat plugin. The communication among the various plug-in services is accomplished through a common set of APIs. As a result, the interactivity, functionality and usefulness of wrap packages 10 are significantly enhanced by such an ecosystem of connected plug-in services.

Finally, the integration capabilities of cards 14 enable the bi-directional flow of data from users browsing a wrap package 10 to other cards 14 in the same wrap package 10, to another wrap package 10, or a remote data processing system. For example, a card 14 can be integrated with the back end software system for a large online retailer, which will automatically populate the content of a card 14 with product images, user account information, prior purchase information, and a host of other user-related information. Alternatively, a card 14 can be used to capture data input from a user and provide it to a retailer's back end e-commerce software system. For example, a card 14 may display a one-click "Buy Now" function for a displayed item. When the Buy Now function is selected, previously saved user account information is automatically delivered to the back end software system of the online merchant, which then processes the information to complete the transaction.

The data entered by the user and/or the data presented via a card 14 of a wrap package 10 may thus be integrated with the back-end database, cloud computing services, web sites, etc., regardless if managed by an author and/or distributor of the wrap package or by a third party. The data processing for the purchase of goods and/or services, appointments, and/or other application functionality and e-commerce related services may, therefore, be performed either within the wrap packages 10 itself or integrated with a remote data processing resource.

The data integration capabilities of cards 14 can also be shared among other cards 14 in the same wrap package 10, with other wrap packages, with web sites, or just about any other data processing system.

Figure 3:
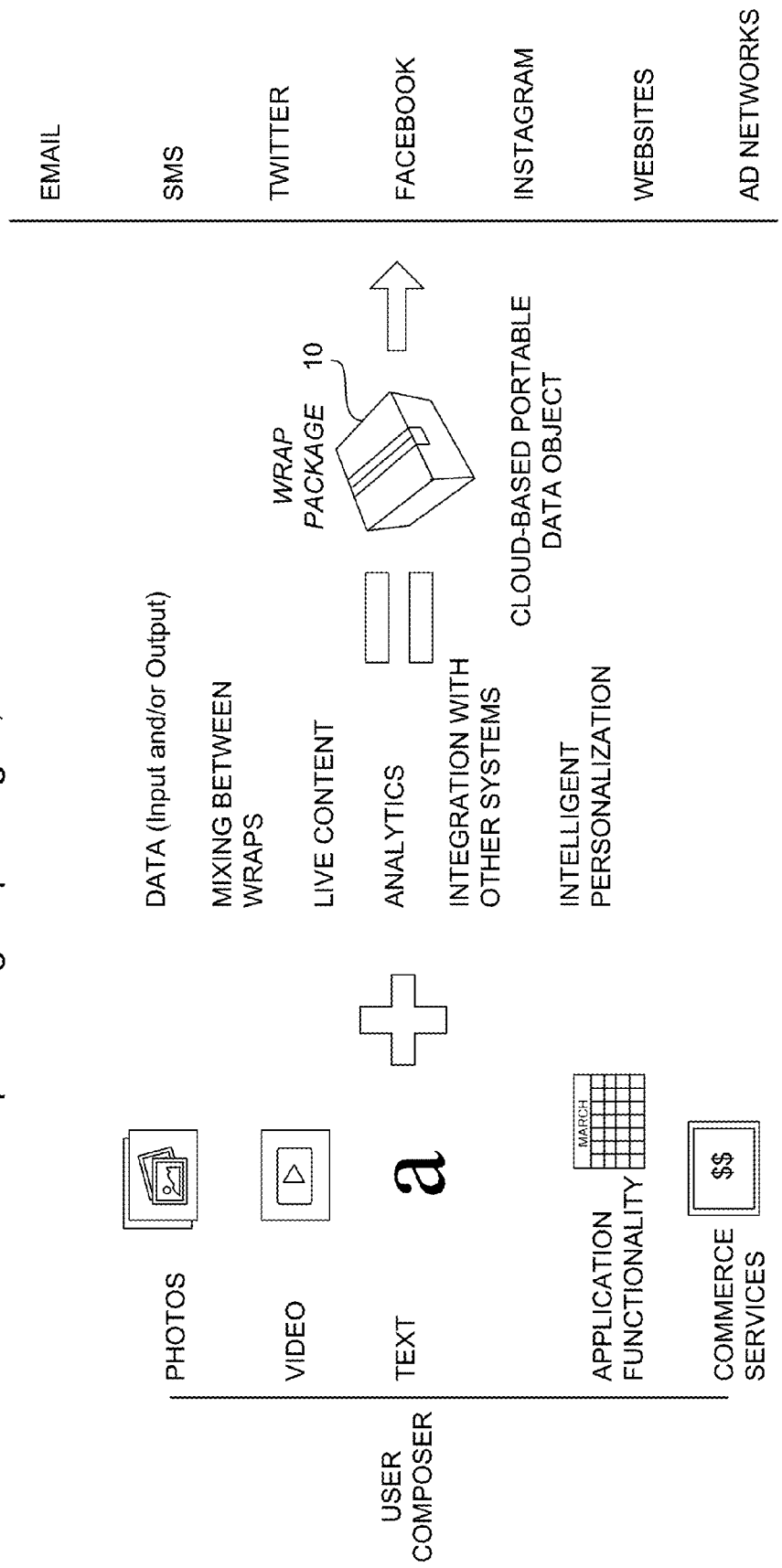
FIG. 3 is a diagram illustrating the media content and distribution model for distributing digital companion wrap packages in accordance with the principles of the present invention.

Referring to FIG. 3, a diagram summarizing the content and distribution model for wrap packages 10 is shown. As illustrated in the left most column, the content that may be included in the various cards 14 of a wrap package 10 may include photos and/or images, audio, video, text, 3-D objects, various types of streaming media (e.g., audio, video, audio-visual, data, biometric information, tickers, sensor outputs, etc.), other data types, application functionality and/or e-commerce services. This content may further be combined with content mixed from other wrap packages 10 as well as live or streaming content. The cards 14 of the wrap package 10 may be further modified based on analytics, intelligent personalization based on the demographics of targeted users or viewers, as well as the integration of either data input or data output to/from with other cards 14, other wrap packages 10, or remote data processing systems and processes, as explained above.

All of the above are then combined during the authoring process into a group of digital objects, defined herein as the wrap package 10. In non-exclusive embodiments where URLs are used as identifiers (i.e., wrap ID 42), the wrap packages are "light-weight", meaning content of the wrap package 10 is delivered over a network to a user only when the wrap ID 42 for the wrap package 10 and/or each card 14 is identified. As a result, the media content, application functionality, and/or e-commerce related services is delivered only when needed. Also, by authoring the cards 14 using a widely supported language such as HTML, the cards 14 of wrap packages 10 can be written once and are viewable on a display associated with almost any computing device running a browser. Accordingly, unlike applications, multiple version of a wrap package 10 need not be authored for multiple platforms.

The wrap package 10 is thus essentially a cloud based portable object that may be readily distributed in a number of ways. In non-exclusive examples, wrap packages 10 may be distributed by email, SMS messaging, ad networks, Twitter, merchant/retailer web sites, photo and/or video sharing web sites that support messaging, social networking web site such as Facebook, through the down-loading of applications from aggregators such as the Apple App Store or Google Play, or just about any means for electronically distributing data over a network, currently known or developed in the future.

Authoring and Distribution of Wrap Packages

Figure 4:
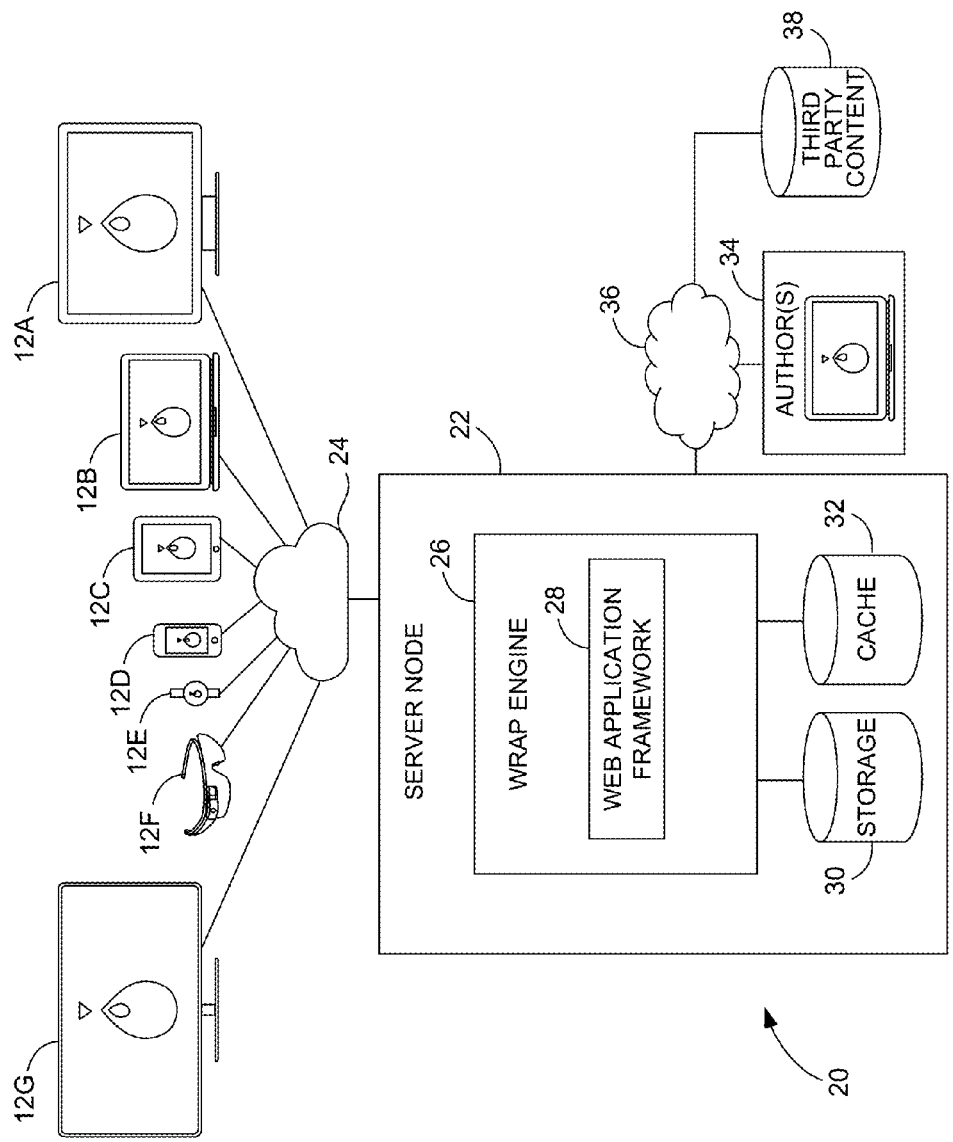
FIG. 4 is a block diagram of a representative system for authoring, storing, distributing and consuming wrap packages in accordance with the principles of the present invention.

Referring to FIG. 4, a block diagram of a non-exclusive system for authoring, storing, distributing and consuming wrap packages 10 is illustrated. The system 20 includes a server node 22, a plurality of computing devices 12, including but not limited to a desktop computer 12A, a laptop computer 12B, a tablet computer 12C, a mobile "smart" phone 12D, a wearable computing device, such as a smart watch 12E or smart glasses 12F and "smart" TVs 12G. The server node 22 and the computing devices 12A-12G communicate with one another over a network 24. In various embodiments, the network 24 may be the Internet, an intranet, a wired or wireless network, a Wi-Fi network, a cellular network, other types of communication network, or any combination thereof.

The server node 22 includes a "wrap" engine 26, which defines a web application framework 28, a storage device 30 and cache 32, each for storing wrap packages 10 and other data. The server node 22 also may include a suite of tools, such as an authoring tool, an analytic engine tool, a media collaboration tool and a data transformation tool, for authoring wrap packages 10.

The web application framework 28 is a software platform designed to support the manual and/or automated authoring of wrap packages 10. The framework 28 is designed to alleviate the overhead associated with common activities performed during the authoring of many wrap packages 10. For example, the framework 28 may include one or more libraries to help with the authoring of common tasks, and modularizes and promotes the reuse of code designed to perform specific tasks, such as implementing application functionality and/or supporting e-commerce. In various embodiments, the web application framework 28 may be implemented using, but is not limited to, Ruby, Rails, JavaScript, Angular-JS, and/or any other language or framework currently known or developed and used in the future.

In a non-exclusive embodiment, the web application framework 28 of the wrap engine 26 also performs content management as a way of organizing, categorizing, and structuring the media and other content resources such as text, images, documents, audio files, video files and modularized software code so that the content of wrap packages 10 can be stored, published, reused and edited with ease and flexibility. The content management function is also used to collect, manage, and publish content, storing it either as components or whole documents, while maintaining dynamic links between the components and/or cards 14 of a wrap package 10.

In yet another non-exclusive embodiment, the web application framework 28 of the wrap engine 26 is structured around multiple tiers, including but not limited to a client tier, an application tier and a database tier. The client tier refers to the browser enabled communication devices 12 that execute and display cards 14 of wrap packages 10, as well as web pages written in HTML or another mark-up language. The database tier, which is maintained in storage 30, contains the one or more libraries of user and/or platform provided media content, software components, modules, etc. used for the authoring of wrap packages 10. The application tier contains the software that runs on the server node 22 and that retrieves and serves the appropriate wrap package 10 from storage 30 and/or cache 32 when requested by a computing device 12.

Since wrap packages 10 are essentially data objects, they can be both cached and delivered over a Content Delivery Network Interconnection (CDN), both of which can be effectively used to deliver wrap packages 10 with minimal delay. For example, commonly requested wrap packages 10 may be cached in the cache 32, which provides faster access and delivery times than storage 30. Also other caching techniques, such as pre-caching, may be used with popular wrap packages 10, to speed up delivery times. Since the amount of storage in the cache is typically limited, cached wrap packages 10 and other data may be periodically replaced by any known replacement algorithm, such as first-in, first-out or least recently used for example.

During the composing of a wrap package 10, one or more author(s) 34 may access the server node 22 over a network 36, which may be different or the same as network 24. The author(s) 36 interact with the wrap engine 26, including the web application framework 28, and the above-mentioned suite of tools for the creation, editing, optimization and storing of wrap packages 10. In yet other embodiments, the one or more author(s) 34 can also access third party content 38 for inclusion into a wrap package 10. As previously noted, wrap packages 10 can be authored manually by one or more individuals or electronically in an automated process.

For more details on the authoring of cards 14 of wrap packages, see U.S. provisional applications 62/062,056 and 62/062,061, both entitled "Wrapped Packages of Cards for Conveying a Narrative With Media Content, Providing Application Functionality, and Engaging Users in E-commerce", both filed Oct. 9, 2014, and both incorporated by reference herein for all purposes.

Once the authoring of a wrap package 10 is complete, it is maintained in storage 30 and possibly cached in cache 32. In response to receiving an identifier, the wrap engine 26 fetches the corresponding wrap package 10 from storage 30 or the cache 32 and serves it to the requesting computing device 12 for consumption in a format customized for the viewing device.

It should be noted that the authoring and distribution diagram of FIG. 4 is merely representative and should not be construed as limiting. For example, multiple server nodes 22 for the authoring and/or distribution of wrap packages 10 may be provided at the same or different locations. In addition, multiple instantiations of a given wrap package can 10 be stored at multiple server nodes 22, typically located at different geographic locations. With this arrangement, the server node 22 that is most capable of quickly delivering a requested wrap package 10, sometimes referred to as the "publication server", is the node 22 that will deliver the wrap package to the requesting device 12.

The Wrap Package

Figure 5A:
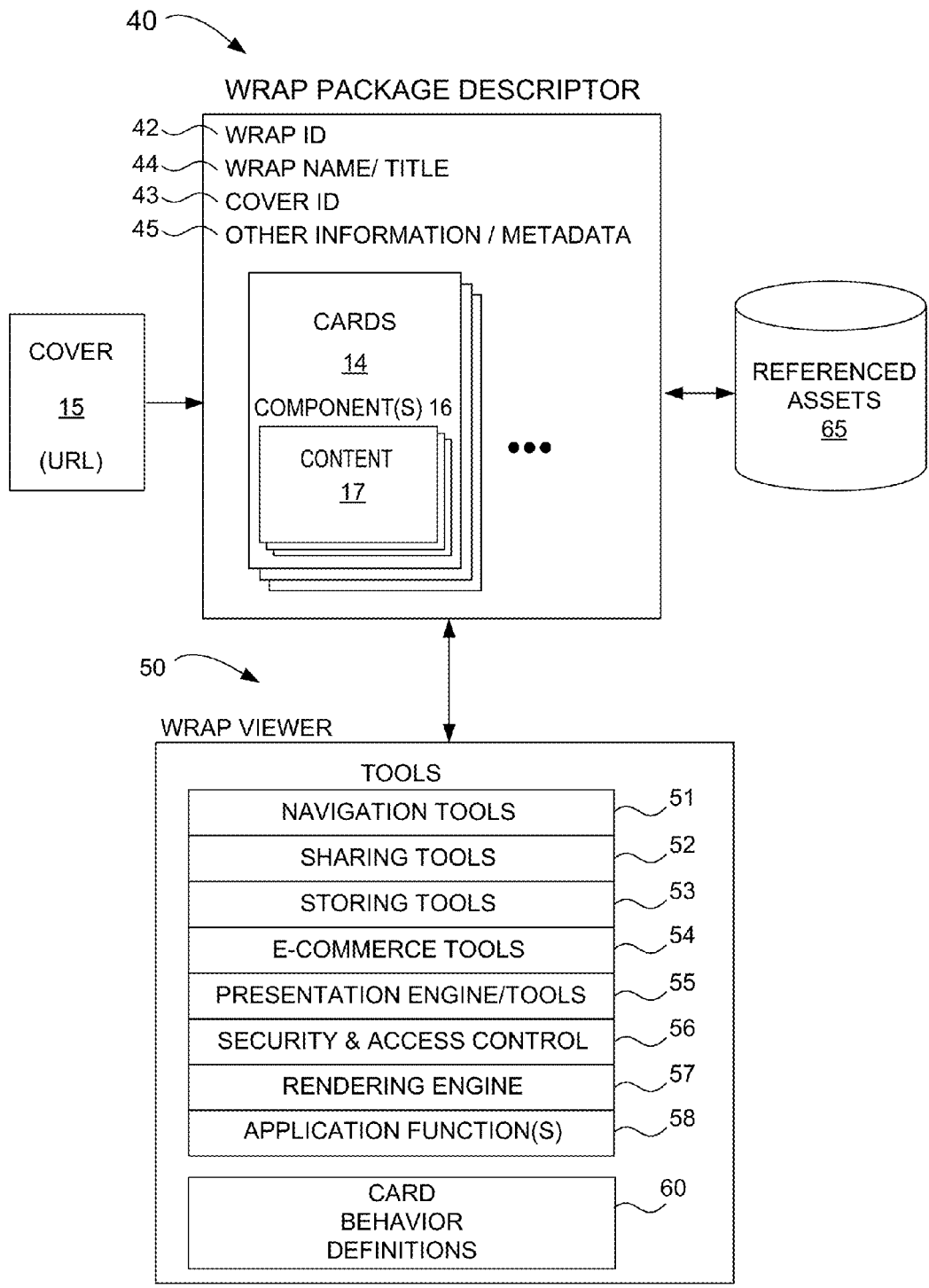
FIG. 5A diagrammatically illustrates selected components associated with defining and rendering a representative wrap package.

As diagrammatically illustrated in FIG. 5A, a wrap package 10 includes a set of one or more cards 14. Each card 14 may contain one or more components 16 that serve as containers for content objects 17. The content objects 17, together with the behaviors associated with the cards and components 16, define the content and functionality of the cards. The content objects 17 may be simple or complex. Simple content objects 17 include standard web-based content types such as text, images, video clips, etc. More complex content objects 17 may include objects having more complicated structures and/or behaviors, as will be described in more detail below.

The structure of the wrap 10, including the structure, layout and components 16 of each of its cards 14 is preferably defined by a wrap descriptor 40. The actual structure of the descriptor 40 may vary widely and a few different suitable descriptor structures are described in more detail below with respect to FIGS. 6-6D. Some content objects 17, such as text, may be directly included (in-line) in the component 16. Other content objects 17, such as images or video clips, may be included by reference, e.g., through simple URL references, or in-line through an encoding method such as MIME (Multi-Purpose Internet Mail Extensions). Complex content objects 17 may be specified in-line or by reference and may (a) contain other components 16 or content objects 17 and/or (b) specify abstract behaviors.

Referenced content objects 17 stored outside of the wrap descriptor 40 are sometimes referred to herein as assets 65. The referenced assets 65 may take the form of almost any type of content that can be included in the wrap package. This can include text, photos, images, 3-D objects, audio, video, and other media content or streams and/or a variety of executable objects, services and/or other functionality. Sometimes an asset may take the form of a stream and the wrap descriptor 40 is arranged to identify the source of the stream (i.e., the feed). By way of example, the stream could be a live audio or video stream, a data feed such as a stock ticker, sensor outputs, biometric information, etc.

In certain circumstances, some or all of the assets 65 associated with a wrap 10 may be stored and accessible from a dedicated wrap server. However, that is not a requirement. Rather, an asset can be retrieved from any location that would be accessible by the consuming device (e.g., through the Internet, an intranet or private network or any other reliable means), and there is no need for the various assets 65 to be located in a single asset store, although that may be desirable in many circumstances.

The wrap package 10 has an associated identifier, the wrap ID 42, that uniquely identifies the wrap 10. The wrap ID is preferably a globally unique identifier (GUID). In some embodiments, the wrap ID 42 takes the form of a URL, or any other identifier that can be converted to, or extracted from, a URL, which facilitates access to the wrap 10 over the Internet using conventional mechanisms. An example of a conversion of the wrap ID to a URL might be adding a domain as a prefix to the wrap ID to form a URL (e.g., www.wrap.com/wrap/<wrapID>).

FIG. 5A also diagrammatically illustrates selected components associated with defining and rendering a representative wrap package 10. The illustrated components may optionally include one or more covers 15, a wrap descriptor 40, a wrap runtime viewer 50 and various referenced external assets 65. As previously noted, the wrap descriptor 40 defines the structure, layout and components 16 of each of the cards 14 within the wrap package 10. The wrap descriptor 40 typically includes the wrap ID 42 and a set, deck or array of card definitions or card descriptors 46, each defining the structure of an associated card (as described with respect to FIG. 6 for example). The wrap descriptor 40 may also include other information of interest such as a wrap name/title 44 and optionally one or more cover identifier(s) 43 and/or other information or metadata 45 about the wrap package 10.

To facilitate rendering the wrap package 10 on various different devices, the wrap is preferably stored in a data format that separates the data from the presentation. At the time of this writing, JavaScript Object Notation (JSON) is a popular, light-weight, data-interchange format that can be used to describe the wrap package 10. Thus, by way of example, the definition of the wrap package 10 may be stored as a JSON data object at the server(s) 22. That is, the descriptor 40 may take the form of a JSON object. In other embodiments, a BSON (Binary JSON) data object may be used. Although the use of JSON or BSON data objects is described, it should be appreciated that in other embodiments, the wrap package 10 may be stored in a variety of other suitable formats, whether now existing or later developed.

The optional cover 15 of the wrap package 10 is typically a graphic object that contains an embedded hyperlink to the wrap (e.g., the URL used as wrap ID 42) and can be placed in any suitable type of electronic media to represent the wrap package 10. Thus, a wrap 10 may be accessed by clicking on or otherwise selecting the cover 15 or by clicking on, or otherwise selecting any other type of link containing the wrap ID 42. As such, in order to "distribute" a wrap package 10, either the cover 15 or a link can be distributed to potential viewers of the wrap package 10 using any available tool. For example, the wrap package 10 may be distributed by: (i) placing the cover 15 or a link on a webpage, in an ad or in any other location that can be accessed by a potential viewer via a browser; (ii) by posting the cover 15 or a link on a blog, a microblog, a forum, a wall etc. or any social media distribution mechanism such as Facebook, Twitter, etc.; (iii) by including the cover 15 or a link in a message such as e-mail, SMS message, a Twitter Tweet, text messages, etc.; or (iv) using any other available distribution mechanism or platform, either known now or developed in the future. Therefore, in many circumstances, it is desirable to create a cover 15 that is attractive and entices viewers to access the associated wrap package 15. In some instances, the cover 15 may take the form of an image from the wrap package 10 itself (e.g., the first card), however, that is not a requirement.

The wrap package 10 is configured to be rendered on a consuming device 12 in conjunction with a wrap runtime viewer 50, which is also sometimes referred to as the wrap run-time engine or simply the viewer. The runtime viewer 50 provides a set of tools and functionalities that are helpful for viewing and/or interacting with the wrap. In some circumstances, the viewer 50 will take the form of a dedicated, platform specific, wrap viewer application (e.g., an applet or app in the context of a mobile device), a plug-in (e.g. a browser plug-in) or other mechanism installed on the viewing device that provides the necessary functionality. In other circumstances the wrap viewer functionality may be incorporated into other types of applications. However, limiting the rendering of wraps to devices which have preinstalled wrap viewing applications/functionality would greatly reduce their portability since users are not always motivated to install such applications unless or until they see a compelling need. Therefore, as will be explained in more detail below, the delivery of a wrap packages 10 may optionally be accompanied by a run-time viewer 50 that includes a set of associated tools and functionalities suitable for use by a conventional browser to generate and/or render the runtime instance of the wrap based on the wrap descriptor 40 and to facilitate user interaction with the wrap package 10. These tools and functionality can be thought of, and are often referred to herein as a wrap toolset that is part of the wrap runtime viewer 50. By providing the wrap construction, viewing and interaction toolset in a browser executable form together with the wrap descriptor 40, the wrap package 10 can be consumed on a wide variety of different devices and operating system platforms (e.g., iOS, Android, Microsoft, etc.) without requiring the users to download and install a device and/or platform specific viewer application. This is a powerful construct for enhancing the portability and viral distribution of wrap packages among a myriad of devices and operating system platforms In the embodiment illustrated in FIG. 5A, the viewer toolset provided with the wrap viewer 50 includes navigational tools 51, sharing tools 52, storing tool 53, various e-commerce tools 54, presentation engine/tools 55, security and access control tools 56, a rendering engine 57, and application functionality tools 58. Of course, it should be appreciated that not all of these tools are required in all implementations and that in other implementations, a variety of other tools and functionalities may be provided as well. The navigational tools 51 facilitate navigation within the wrap package 10. The sharing tools 52 provide mechanisms by which a consumer of the wrap 10 may share the wrap with others, e.g., by e-mail, by SMS message, via a social media post, etc. Storing tool 53 allows a user to persistently store the wrap and/or when applicable, the wrap state, either locally or remotely. The e-commerce tools 54 may include a variety of functionalities that can help facilitate a variety of e-commerce tasks including purchasing, making reservations, etc. Application functionality tools 58 enable "app-like" functionality within the wrap package 10, such as conducting online chats, GPS functionality, etc. Presentation engine 55 controls the presentation. In some embodiments, the presentation engine 55 may be arranged to present the wrap on the consuming device at a scale and in an aspect ratio that is at least somewhat optimized for the device.

Security and access control tools 56 provide security and access control functionality, which might include encryption functionality and user authentication services. For example, in some circumstances, the publisher of a wrap may want to limit the circulation of the wrap to specific users or groups of users. A few, nonexclusive examples of such circumstances include when the wrap is created for use as: (i) an active receipt for a purchase as described in U.S. Provisional Application Nos. 62/062,056 and 62/075,172 (both incorporated by reference herein for all purposes) and (ii) a ticket for an event as described in U.S. Provisional Application No. 62/079,500; (also incorporated by referenced herein for all purposes) (iii) an item customized for a customer such as a travel itinerary; (iv) an employee manual as described in U.S. Provisional Application No. 62/114,731 (also incorporated by reference herein for all purposes); etc. Encryption services may be desirable to protect confidential information. Of course, there are a very wide variety of other circumstances where security and/or access control/permission functionality may be desired.

With certain embodiments, the viewer 50 may optionally also include a rendering engine 57 arranged to create and/or render a runtime instance of the wrap on a consuming device 12 based on the descriptor 40. In such embodiments, the rendering engine is arrange to dynamically generate the HTML (or other markup language) use by a browser or other viewing mechanism on the device 12 to render the wrap at runtime. In some implementations, the rendering engine 57 is arranged to create an object graph based on the descriptor 40 and a document object model (DOM) based on the object graph. The browser or other suitable app or application may then use the DOM to render the wrap package 10.

Figure 5B:
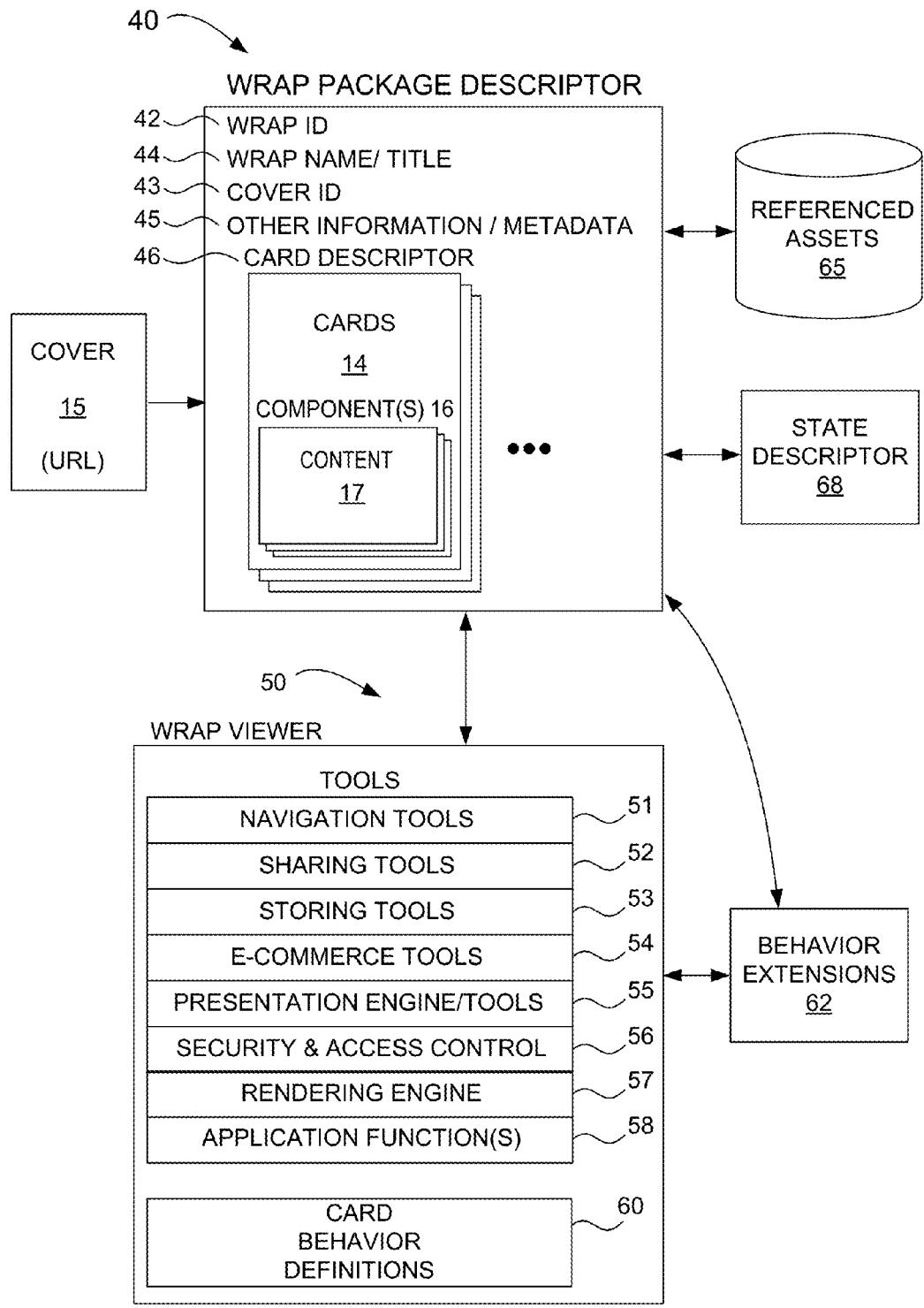
FIG. 5B diagrammatically illustrates selected components associated with defining and rendering a representative wrap package in accordance with another embodiment that utilizes state descriptors and/or behavior extensions.

With yet other embodiments, the viewer 50 may also optionally have any number of card behaviors definitions 60. As will be described in more detail below, different cards can be designed to exhibit a wide variety of different behaviors. In order to simplify the card, and card template creation processes, various desired behaviors can be defined separately from the cards themselves. The behaviors are known to or accessible by the wrap viewer 50 (e.g., desired behaviors may be defined through behavior definitions 60 or may be accessible as behavior extensions 62 as seen in FIG. 5B). Thus, the descriptor for any particular card or component may simply declare the desired behavior and the viewer 50 will know how to impart such behavior to the wrap/card/component and/or how to obtain an extension that imparts such behavior.

In FIG. 5A, the behavior definitions and the various tools are illustrated as separate items to facilitate their description. However, in practice, some of the illustrated tools are simply sets of associated behaviors, and therefore, the illustrated distinction between the behaviors and such tools is/are largely for emphasis.

As discussed above, the wrap package 10 may be rendered on a wide variety of different devices 12A through 12G. These devices may have a wide variety of different screen sizes, capabilities, and viewing mechanisms. When a particular device 12 requests a wrap package 10, a determination is effectively made as to whether a suitable wrap runtime viewer is already present on the requesting device. If not, a browser compatible runtime viewer 50 is provided in addition to the wrap or wrap descriptor 40. The browser compatible run-time viewer may be written in any format that is appropriate for execution by a browser. By way of example, JavaScript (JS) is a dynamic programming language that is currently popular and supported by most general purpose browsers and many other rendering mechanisms. Thus, JavaScript works well for the browser compatible viewer since the same wrap viewer can be used for a wide variety of different browsers. However, it should be apparent that in other embodiments, the wrap viewer 50 may be implemented using a wide variety of other now existing or future developed frameworks and/or languages. For example, the DOM rendering may be replaced with a React framework or another suitable framework currently known or developed in the future. When the wrap viewer is incorporated into a native application, it will sometimes be desirable to write the viewer (or portions of the viewer) in a format that executes more efficiently or is otherwise preferred for execution on the underlying operating system, etc.

Figure 7A:
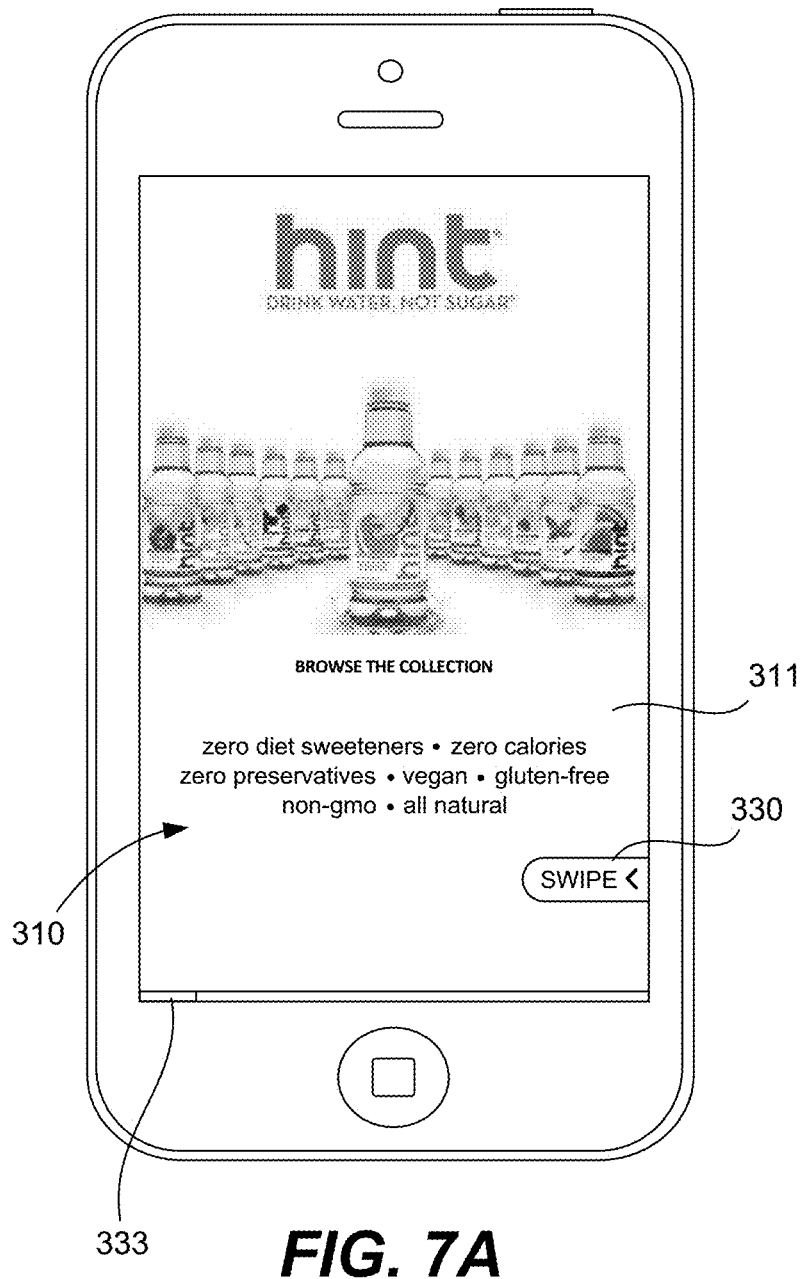
FIGS. 7A-7M are a series of cards of an exemplary wrap package in accordance with the principles of the present invention.
Figure 7B:
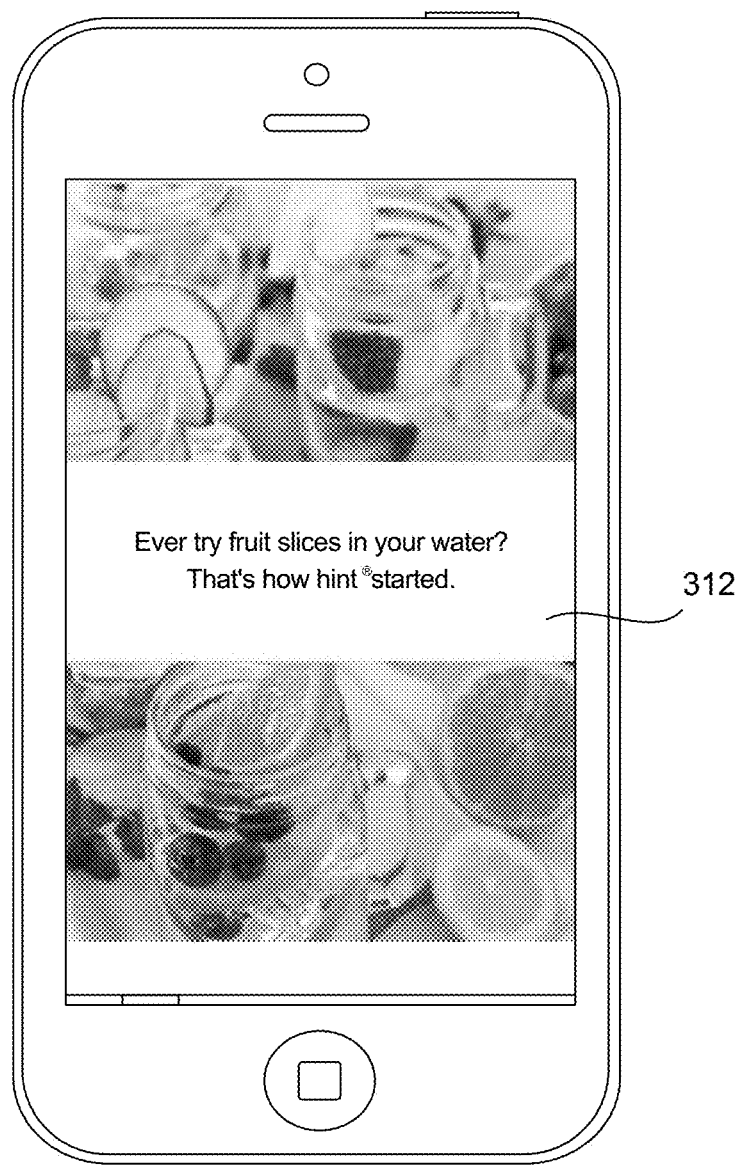
Figure 7C:
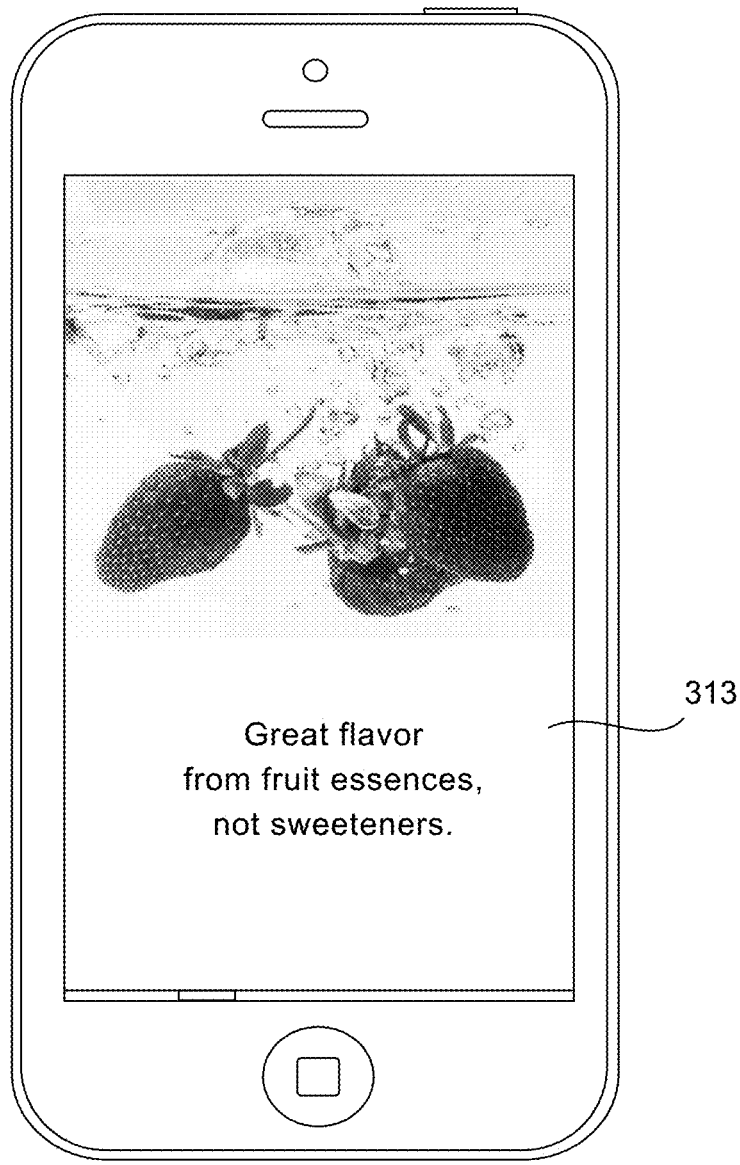
Figure 7D:
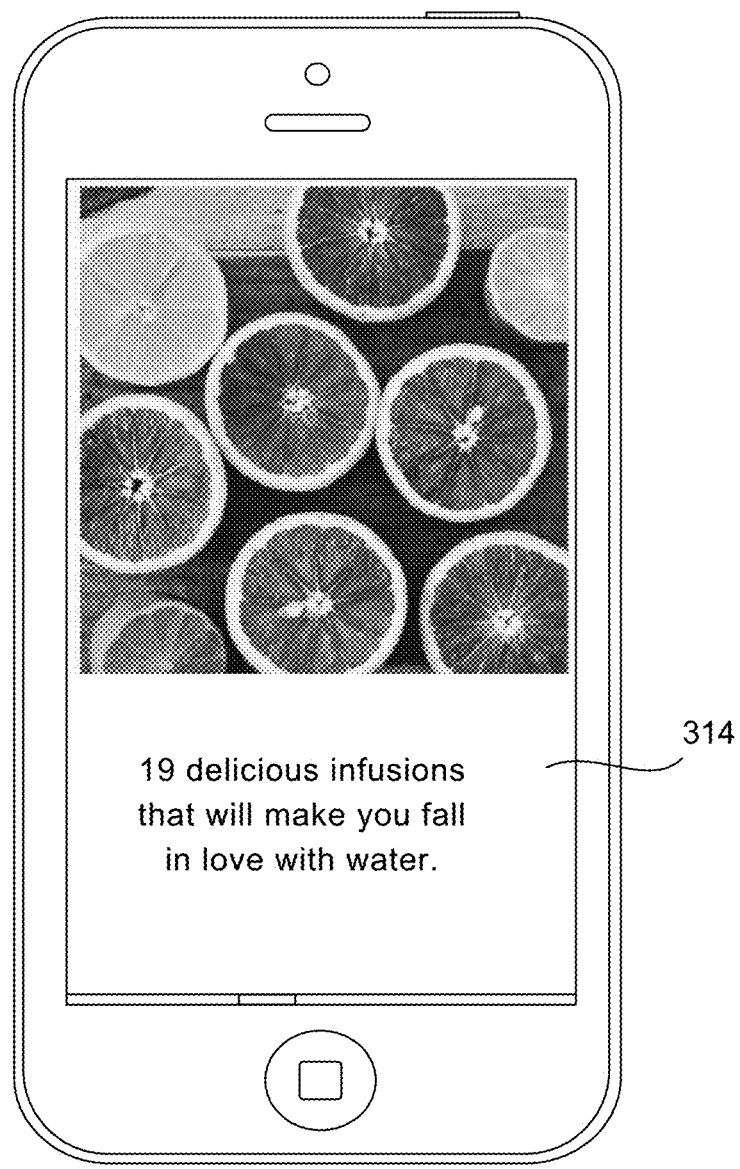
Figure 7E:
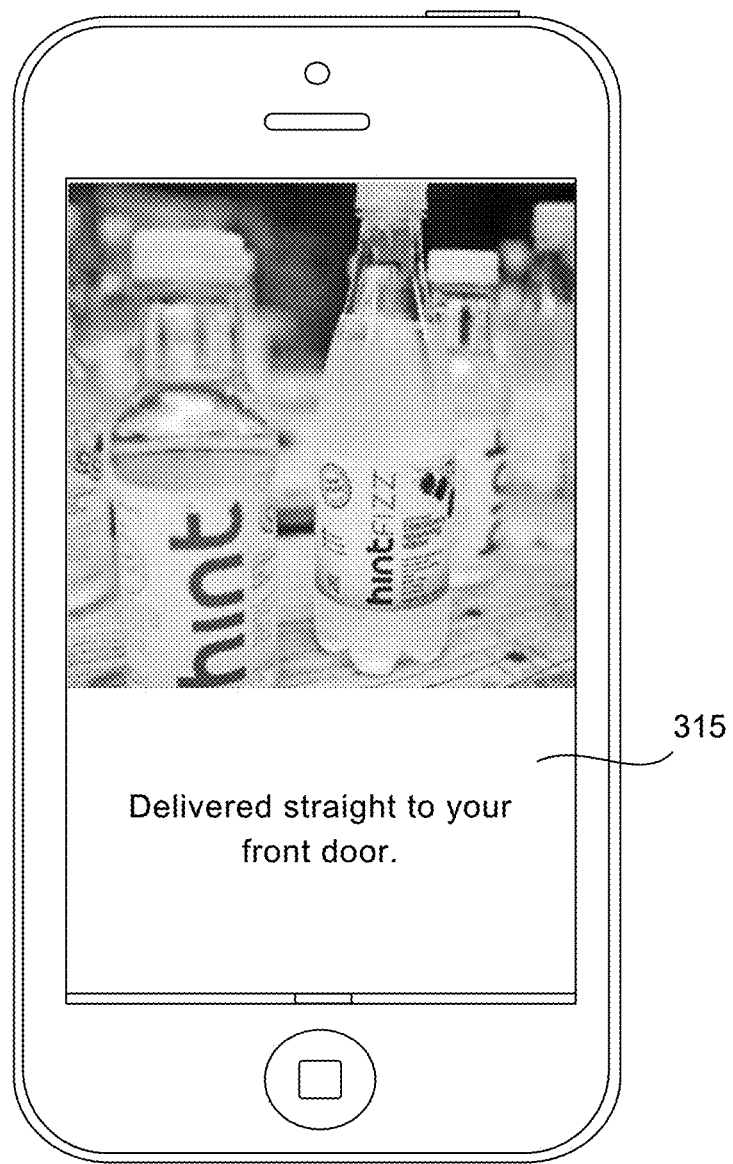

A specific wrap is illustrated in FIGS. 7A-7M. The illustrated wrap 310 is an informational wrap about a particular product line—Hint® water. The wrap includes a deck of nine cards—i.e., cards 311-319. Card 311 is the first card. Cards 312-315 are informational cards that describe the Hint® water flavored products as illustrated in FIGS. 7B-7E respectively. Card 316 is a gallery card that shows a number of different available flavored water non-carbonated products as illustrated FIGS. 7F-7H respectively. Card 317 is a second gallery card that shows a number of different available carbonated flavored water products (Hint Fizz) as illustrated in FIGS. 7I-7K respectively. Card 318 is an e-commerce card that allows a user to order a monthly subscription of Hint products as illustrated in FIG. 7L. Card 319 is the last card and includes various tools that allow a user to share the wrap and/or comment on the wrap on various social media forums as illustrated in FIG. 7M.

The wrap 10 may be constructed in a variety of different formats. As previously described, a descriptor 40 defining the wrap may be constructed using JavaScript Object Notation—i.e., in the form of a JSON data object. By way of example, a representative JSON descriptor that defines the wrap 310 shown in FIGS. 7A-7M is provided in Appendix I of U.S. Provisional Application No. 62/133,574, filed Mar. 16, 2015, which is incorporated herein by reference.

Defining Card Behavior

Different cards 14 within a wrap 10 can be designed to exhibit a wide variety of different behaviors. To simplify the card authoring process, the card descriptor 46 within a wrap 10 can be arranged to declare the behavior of the card 14 without internally defining that behavior. Rather, in such circumstances, the desired card 14 behaviors are defined within the wrap viewer 50 as part of the behavior definitions 60 or through behavior extensions 62. With this arrangement, a card template designer can define the behavior for cards 14 authored using the template, or can define a set of available behaviors from which a card author can choose. If a set of behaviors are available to the card author, then the authors selects the desired behavior from the available set. In either case, the desired behavior is declared as part of the card. With this arrangement, different cards 14 within a wrap 10 can exhibit different behaviors and such behavior remains with the card even if the card is used in a different wrap. If a new card behavior is desired, the new behavior can be created and added to the behavior definitions 60. In this manner, the newly defined behavior becomes available to other template designers and/or card authors.

Figure 7F:
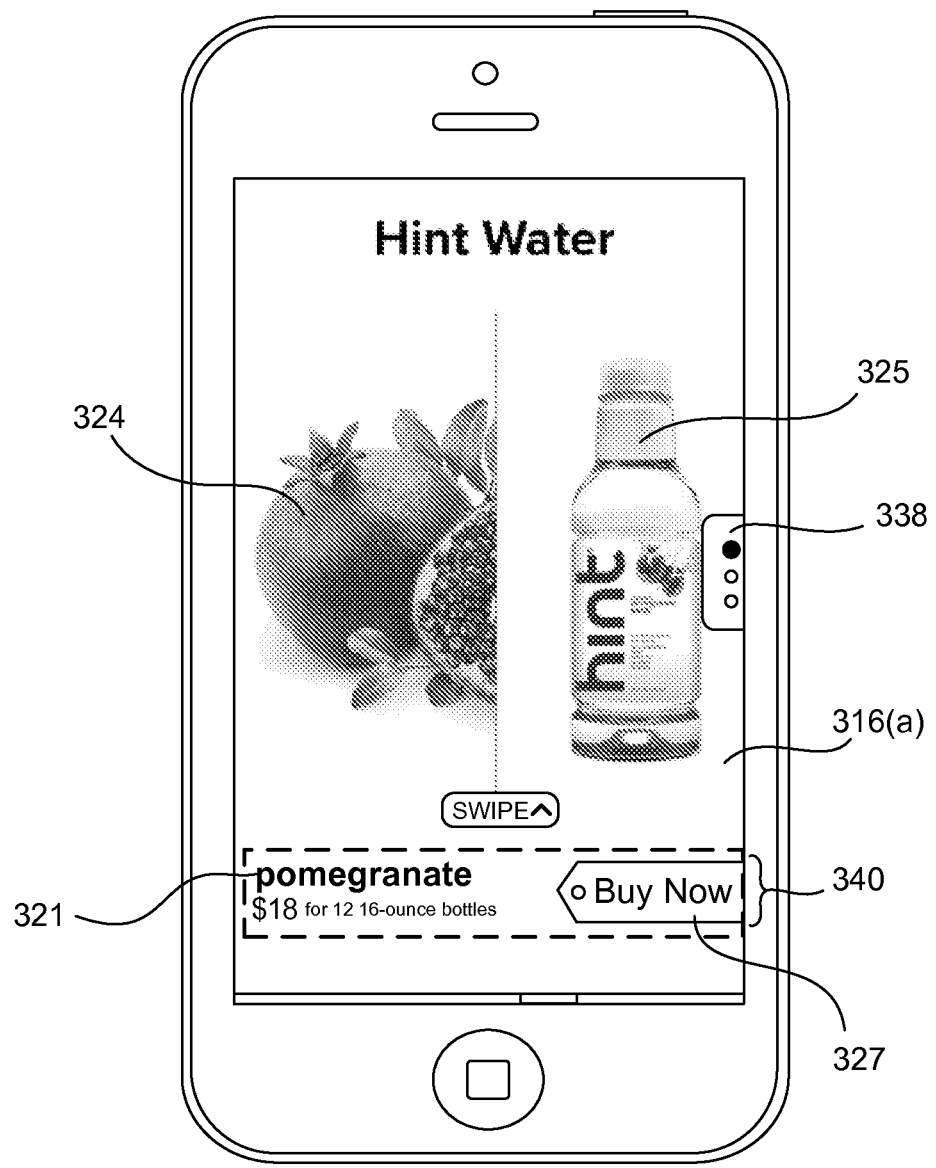
Figure 7G:
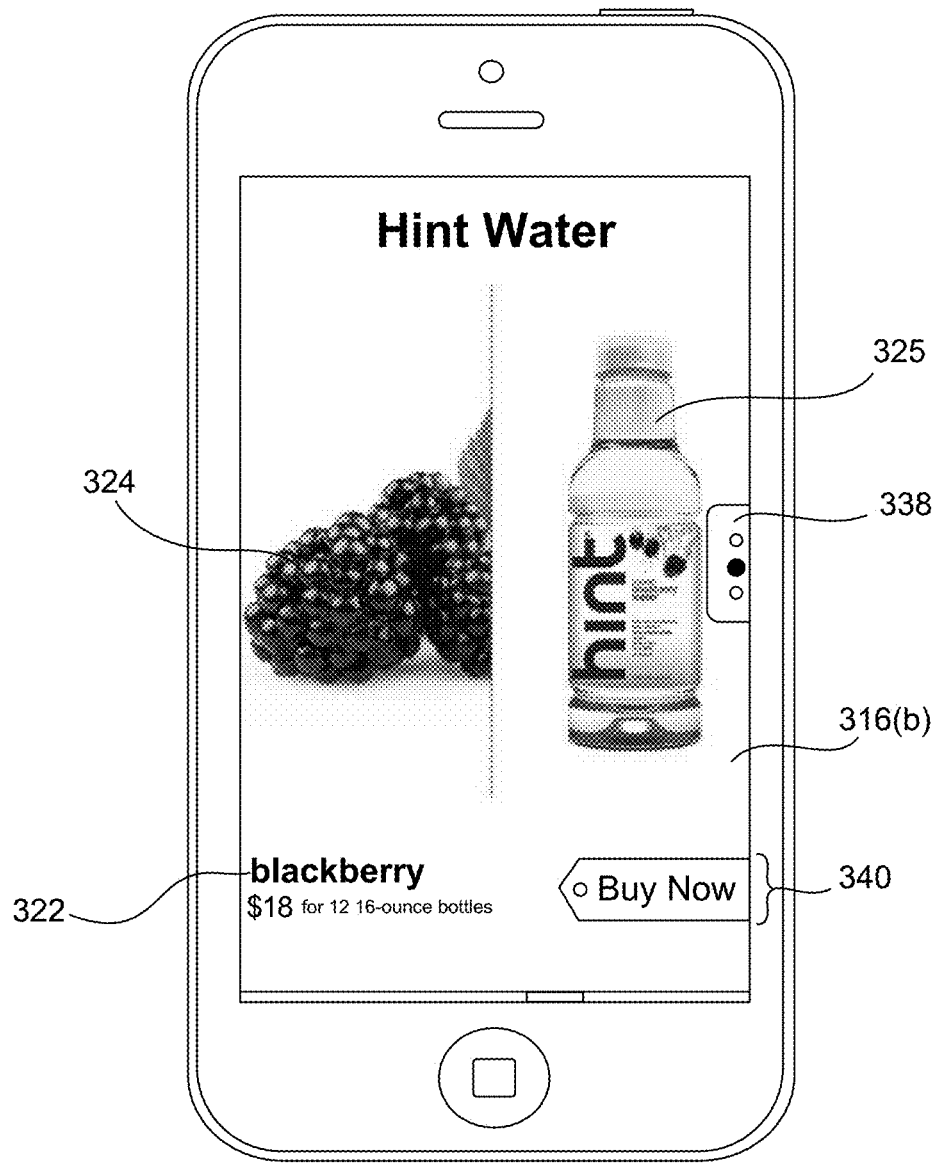
Figure 7H:
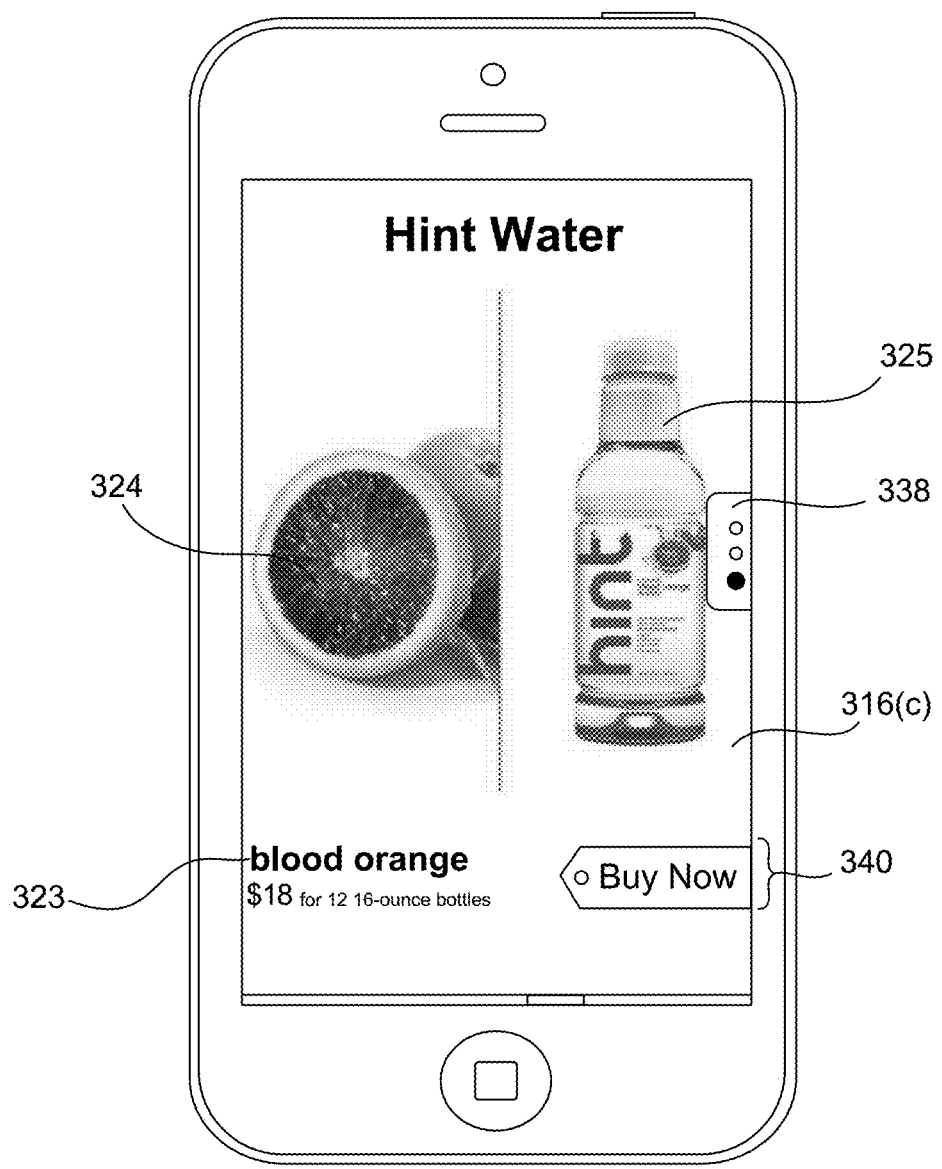
Figure 7I:
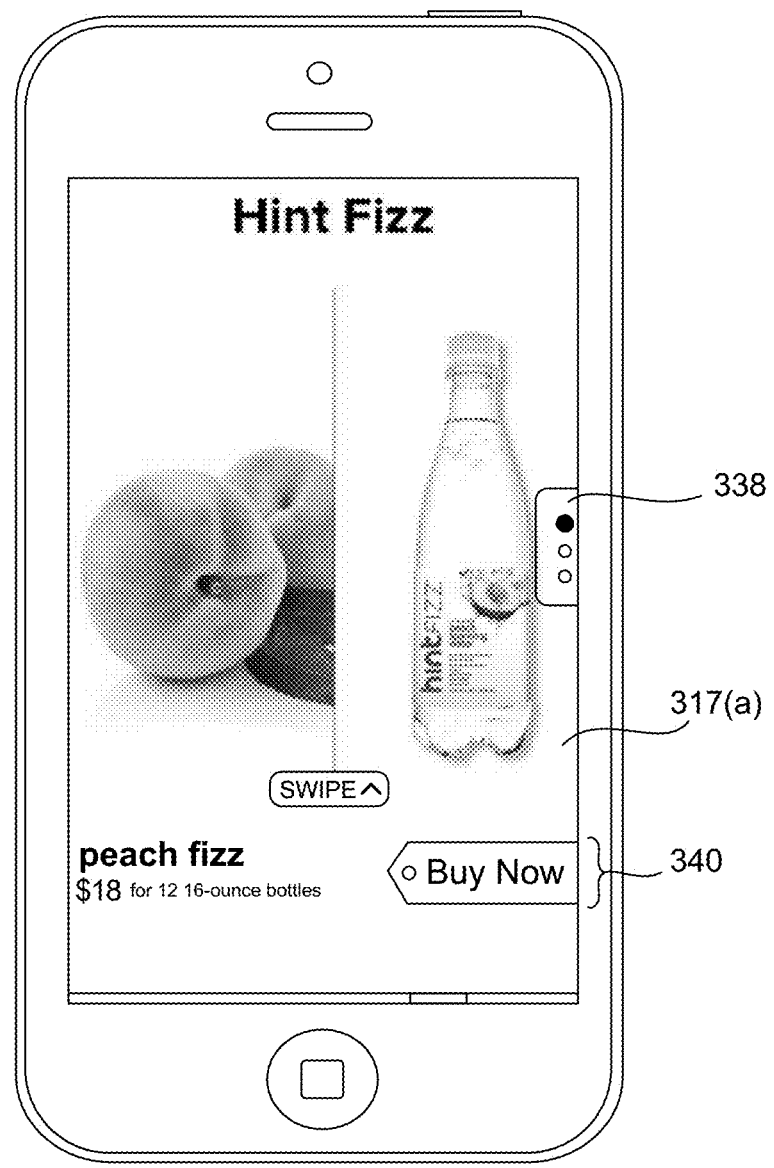
Figure 7J:
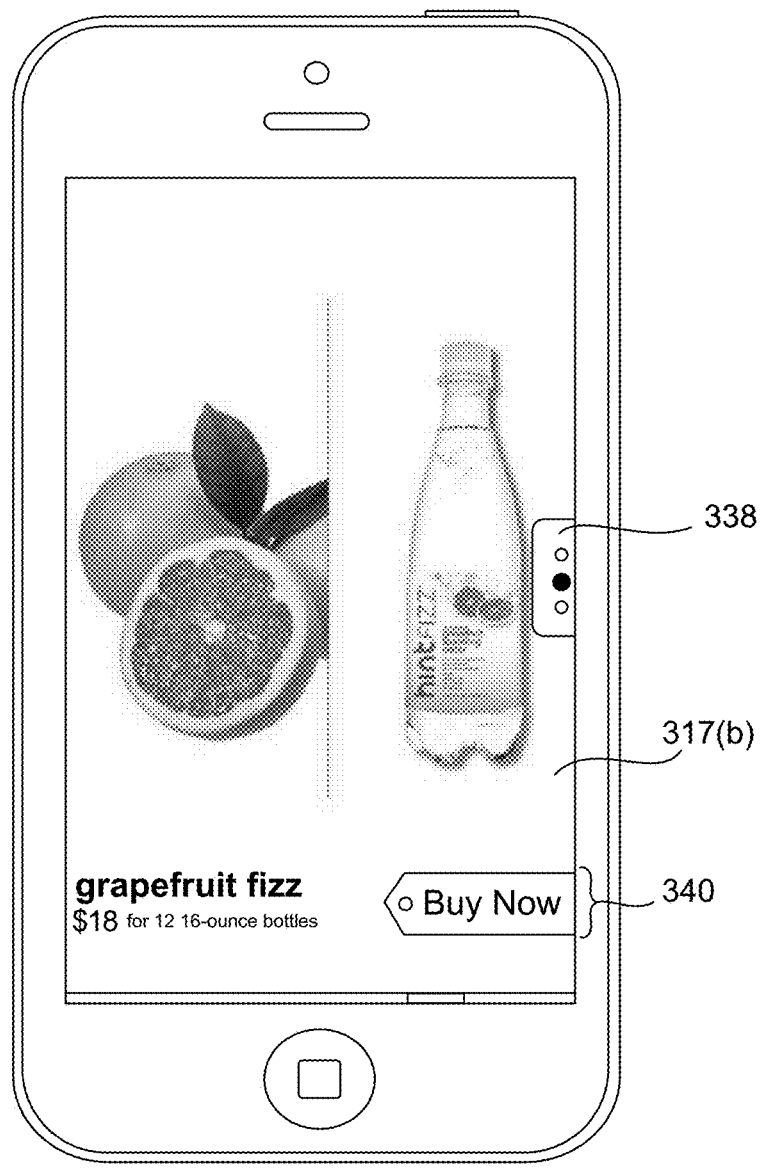
Figure 7K:
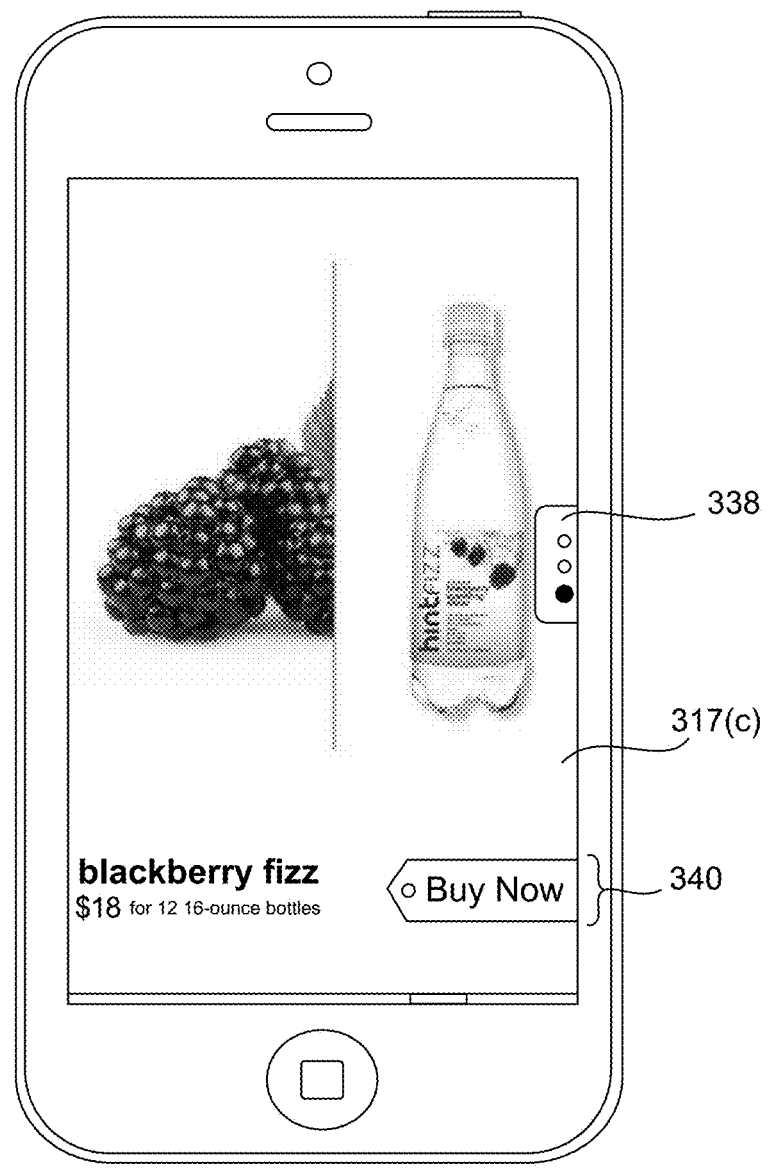
Figure 7L:
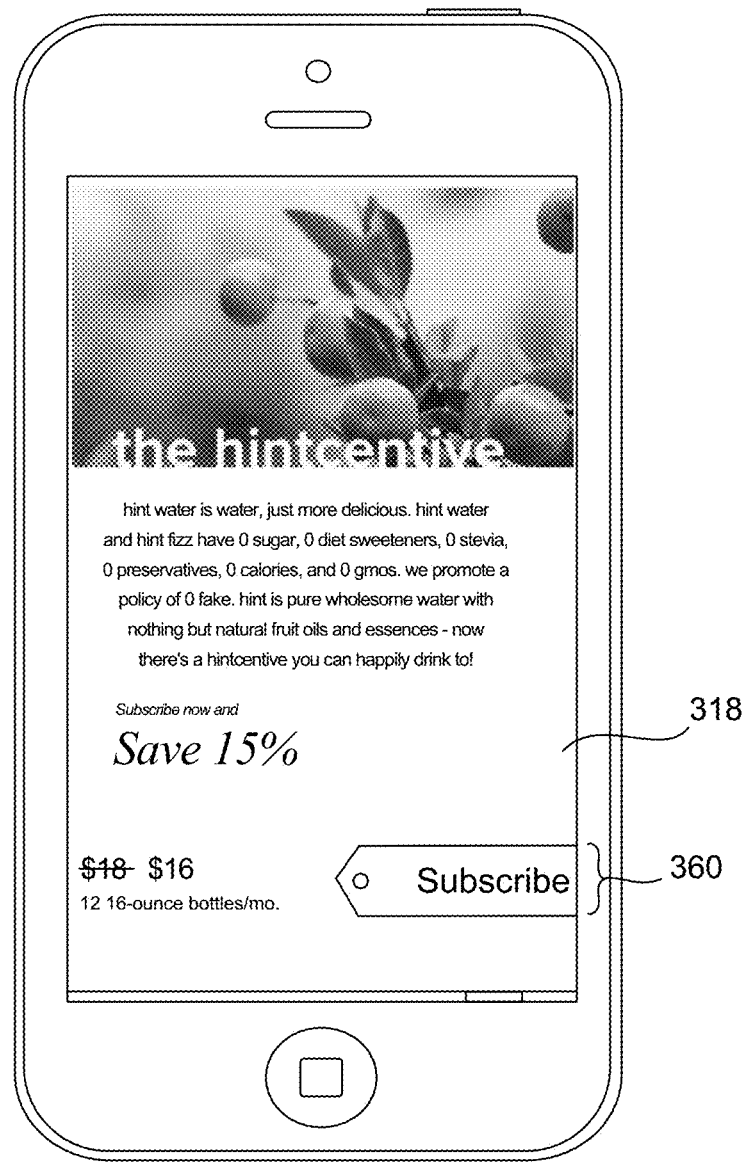
Figure 7M:
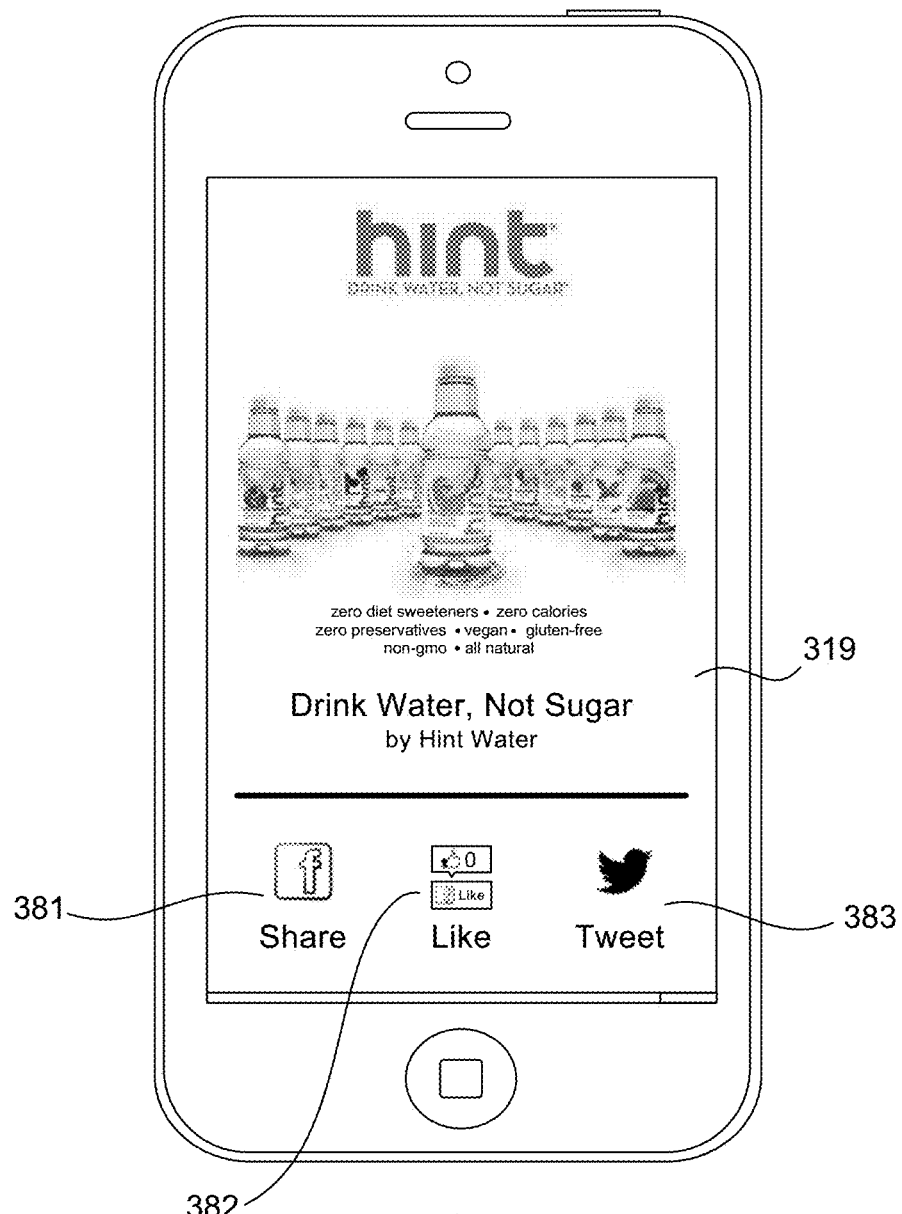

To illustrate the concept of defining card behaviors, consider the gallery cards 316, 317 illustrated in FIGS. 7F-7K. Generally a gallery card is arranged to display a number of items. The items are presented in a vertically extending sequence that extends beyond the display screen of the expected viewing device. Thus, to view the items in the gallery, a user would vertically scroll through the array of items. Typically (although not necessarily), the items in the gallery all have substantially the same structure. By way of example, in the embodiment illustrated in FIG. 7, card 316 is a gallery card as illustrated in FIGS. 7F to 7H—which are screen shots of a set of gallery item panes, with each gallery item describing a different flavor of Hint® water—specifically, pomegranate 321, blackberry 322 and blood orange 323 respectively. As can be seen, each item has a similar layout with an image 324 on the left being an image of the fruit that flavors the water, and image 325 on the right being an image of the relevant water bottle and a trigger 340 which identifies the product, indicates it cost, has a "Buy Now" graphic 327 and provides a mechanism that can be used to purchase the displayed item as will be discussed in more detail below.

It can be imagined that the designer of a gallery card may wish the card to be scrolled in a variety of different ways. By way of example, one approach may be to conceptually divide the gallery card 316 into a number of frames or "pages" 316(a), 316(b), 316(c) that have the visual appearance of being separate cards as seen in FIGS. 7F-7H. In such an arrangement, it may be desirable to have the displayed image snap to the next adjacent page when a scroll command (e.g., a vertical swipe gesture) is received. In another example, the items in the gallery may be relatively smaller such that the displayed item does not take up the entire card display area. In such a circumstance it may be desirable to have the displayed image snap to the next adjacent item when a scroll command is received. In still other circumstances, the card designer may prefer to provide free (continuous) scrolling. Of course, other types of scrolling behavior could be provided a well. In a non-exclusive embodiment, a key 338 may be included for providing a visual indicator of the relative up/down position that is being displayed relative to the overall number of views of the gallery card.

The card descriptor 46 for the gallery card includes a behavior declaration that identifies the desired behavior for the card which can then be bound to the card at run-time by the wrap viewer (e.g., browser based viewer, native viewer, etc.). For example, this could take the form of a statement such as:

"Behaviors": ["vertical-snap-to-card"]

Further examples are shown in Appendix I of U.S. Provisional Application No. 62/133,574.

The developer of the wrap viewer 50 can define any number of card behaviors that are supported by the viewer, such as but not limited to the different scrolling techniques in the example above. Third parties can provide extensions that define still other behaviors (e.g., a scrolling behavior in which a two finger swipe reacts differently than a one finger swipe, etc.). The developer of a card template can define which of the available behaviors are available for use with the template (e.g., a subset, or all of the defined scrolling behaviors). Wrap and card authors using the template can then select which of the behaviors available to the template they would like to associate with the card, and the chosen behavior is declared as part of the card descriptor 46.

Although the specific example of scrolling behavior in a gallery card has been given, it should be appreciated that virtually any desired type of card behavior can be defined and declared in a similar manner. It should be appreciated that differences in card behavior may take a wide variety of different forms. For example, different types of cards may have different accompanying behaviors; the behavior of a particular type of card may be different based on its position within the wrap 10; and/or the animations associated with transitions may vary with respect to card position.

Returning to the wrap 310 of FIGS. 7A-7M, several different card behavior(s) can be implemented. For instance, the first card in a sequence (e.g., card 311) may be arranged to facilitate a transition to the second card (e.g., card 312) by swiping to the left—but a swipe to the right may have no effect. The transition may be animated, as for example, by an animation that resembles flipping the first card in a manner that resembles turning the page of a physical book. The final card in the deck (e.g., card 319) may be arranged to facilitate a transition back to the second to the last card (e.g. card 318) by swiping to the right, whereas a swipe to the left may cause an animation that starts looking like a page turn but snaps back to indicate that the end of the wrap has been reached. Intermediate cards may be arranged to facilitate transitioning to the next page in response to a left swipe and transitioning to the right in response to the preceding page in response to a right swipe.

As previously suggested, the gallery cards 316, 317 may also be responsive to vertical swipes to facilitate scrolling through the gallery, whereas various other cards which do not have associated galleries may not be responsive to vertical swipes. In some embodiments, a left swipe from any of the gallery card items or "pages" (e.g., 316(a), 316(b), 316(c)) transitions to the same next card 317. However, in other embodiments, the gallery card behavior can be set such that the next page that the sequence transitions to varies based on the currently displayed gallery item or page. Of course, a wide variety of other card behaviors can be defined and implemented using the same behavior definition approach.

The actual structure of the descriptor used to define a gallery card may vary significantly. By way of a representative card descriptor structure suitable for implementing a gallery card is described in more detail below and is illustrated in FIG. 6C.

Triggers

A card can have one or more triggers embedded therein. Triggers are hooks associated with displayed items that can cause an action or behavior in response to an event (e.g. a user input). That is, a predetermined user action or other event (such as the selection of the displayed item) triggers a defined action. In general, a trigger is a component 16 of a card. The trigger has associated behaviors and one or more associated handlers. When a triggering event is detected, the associated handler causes execution of the desired behavior.

Virtually any type of computer detectable event can be used to activate a trigger. In many circumstances, the triggering event may be a user input such as the selection of a displayed trigger component (e.g., by tapping or performing another appropriate gesture relative to a displayed item configured as a trigger component). However, in other circumstance, the activating event may be system generated. System generated events can include sensor input based events, time or timer based events, the receipt of a particular message, the determination that a particular navigational sequence has occurred within a wrap, geo-location or proximity based events (e.g., the viewing device is located within a particular store or geographic area, or near to other users viewing the same wrap) or any of a wide variety of other computer detectable events.

Once activated, a trigger may exhibit any desired behavior which can be associated with the trigger through appropriate behavior declarations 95. Virtually any type of computer implementable behavior can be associated with a trigger. By way of example, a linking trigger may be used to link the user to another card within the current wrap, to send the user to another wrap, webpage or other destination. The linking trigger may also be arranged to define a desired linking behavior (e.g., open in same tab, open in new tab, etc.). Other triggers may initiate a wide variety of other action.

The ability to generally define triggering events and the resulting behaviors is an extremely versatile construct that provides wraps with tremendous flexibility and power. Thus, triggers can be used to enable a wide variety of actions, including invoking of a number of different application-like functionalities or e-commerce related services. For example, a trigger may be used to initiate an action (e.g., order a product, conduct an online chat, sharing the wrap with others, book or reserve a table at a restaurant, a hotel room, a rental car, etc.). Almost any type of wrap component/asset can be associated with a trigger, which gives authors tremendous flexibility in guiding the user experience.

The wrap 310 illustrated in FIG. 7 has a number of triggers. These include purchasing trigger 340 (FIGS. 7F-7K), subscription trigger 360 (FIG. 7L) and social media triggers 381, 382, 383 (FIG. 7M). The purchasing trigger 340 is arranged to facilitate a user purchase of the displayed product. As an illustrative example, the trigger 340 of FIG. 7F, is associated with a generally rectangular region that bounds the text and graphic located at the bottom of the card, including the text "pomegranate $18 for 12 16-ounce bottles" and the adjacent "Buy Now" button. The region that involves the trigger is generally shown by a dashed box in FIG. 7F. Selection of the trigger 340 links the user to a mechanism that facilitates the purchase of the identified item. The other above-identified triggers in the wrap 310 are characterized by and operate in a manner similar to the Buy Now trigger 340 of FIG. 7F.

The implementation of a purchase mechanism within a wrap package 10 may be widely varied. For example, in some implementations, the user may be linked to the vendor's website, where the purchase may be made in a conventional manner through the website. If this approach is taken, it is often desirable to access the target website through a "Cul-de-sac" so that the user is returned to the wrap when finished with any transactions they wish to make (a Cul-de-sac has the property of returning to the initiating wrap card/page when the user closes the target website). In another approach, the selection of the trigger causes the wrap to transition to a purchasing card (or sequence of cards) within the same wrap where the desired transaction can occur. One such approach is described below with respect to FIGS. 8A-8C. Alternatively, the transition could be to a separate purchasing wrap. Regardless of the mechanism, it is often desirable (although not necessary) to use a cul-de-sac approach so that the user is returned to the card from which the transaction was initiated after the transaction is completed. In still other implementations, the transaction can be completed without leaving the current card—particularly when the user is using a secure viewer that knows the user's identity and relevant purchase related information. In such an embodiment, the transaction can be completed using a "one-click" purchasing option, where previously stored customer billing, shipping and other account information is used to process the purchase.

In a non-exclusive embodiment, the specific behavior associated with the link may be declared in the same manner described above. For example, consider a situation where the trigger activates a link to an external website. There are several ways that such a link could be implemented. One approach might be to link to the target web page in the currently active browser tab, which has the effect of navigating away from the wrap. A second approach might be to open a new browser tab and open the target webpage in that new browser tab. A third approach might be to initiate a Cul-de-sac in the current browser tab and open the target webpage in the Cul-de-sac (a Cul-de-sac has the property of returning to the initiating wrap card/page when the user closes the target website). In such an arrangement, the card template developer can make these three link behaviors available to the trigger and the card author can select the desired behavior. The card developer can also define a default link behavior selection in the event that the card author does not affirmatively make a selection. As can be seen in Appendix I of U.S. Provisional Application No. 62/133,574, trigger 340 in card 316 has these three possible linking behaviors in response to activation of a trigger.

The ability to direct a user to a target website to complete a transaction can be helpful in many scenarios. However, a drawback is that it can be more difficult to track or guide user behavior after the user has navigated away from the wrap. Therefore, it is often preferable to design the wrap in a manner that facilitates handling user side interactions involved with a transaction from within the wrap itself.

The actual structure of the descriptor used to define a trigger may vary significantly. By way of example, a representative trigger component descriptor structure is described in more detail below and is illustrated in FIG. 6D.

Wrap Descriptors

Figure 6:
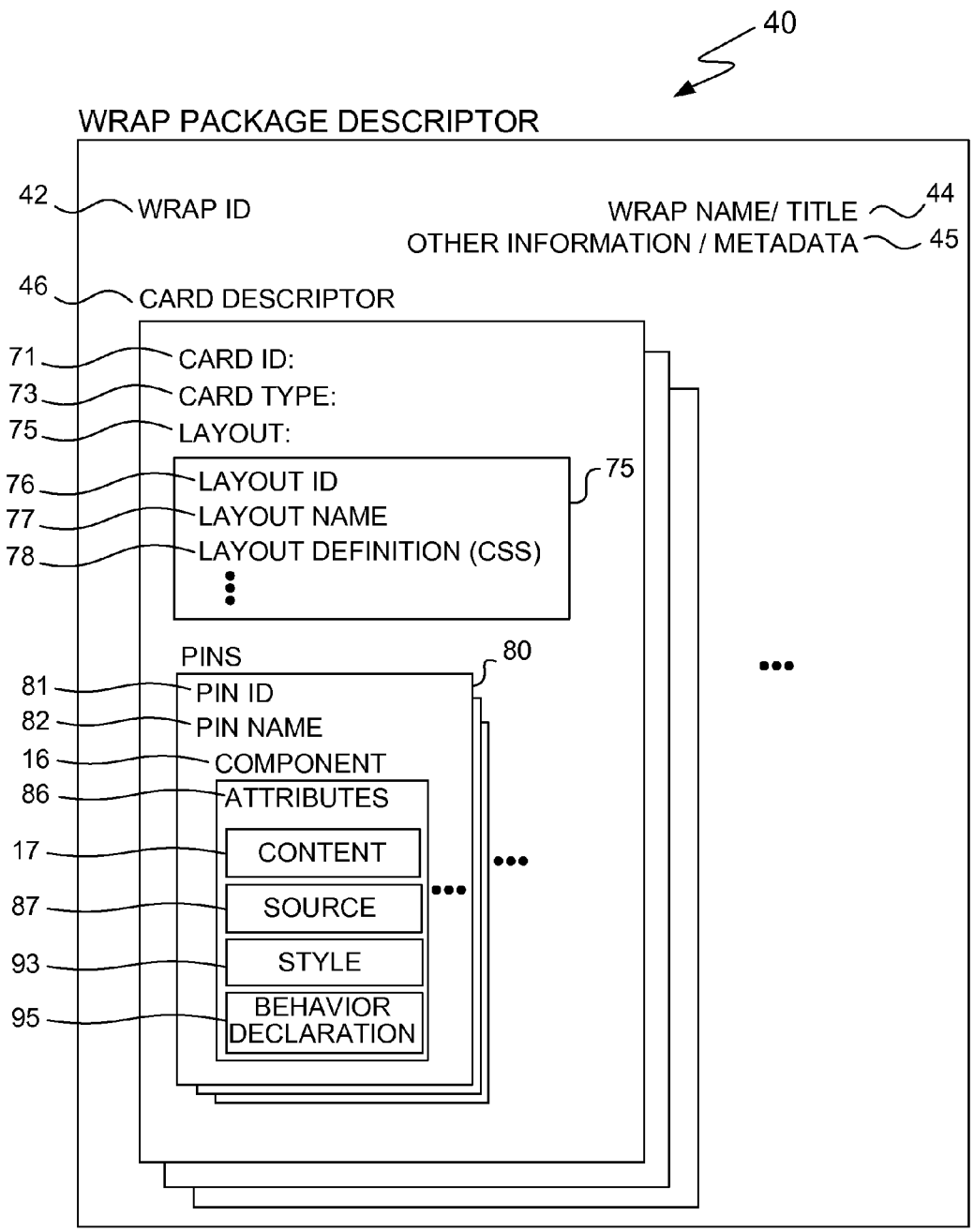
FIG. 6 is a diagram illustrating the hierarchy of a wrap descriptor in accordance with the principles of the present invention.
Figure 6A:
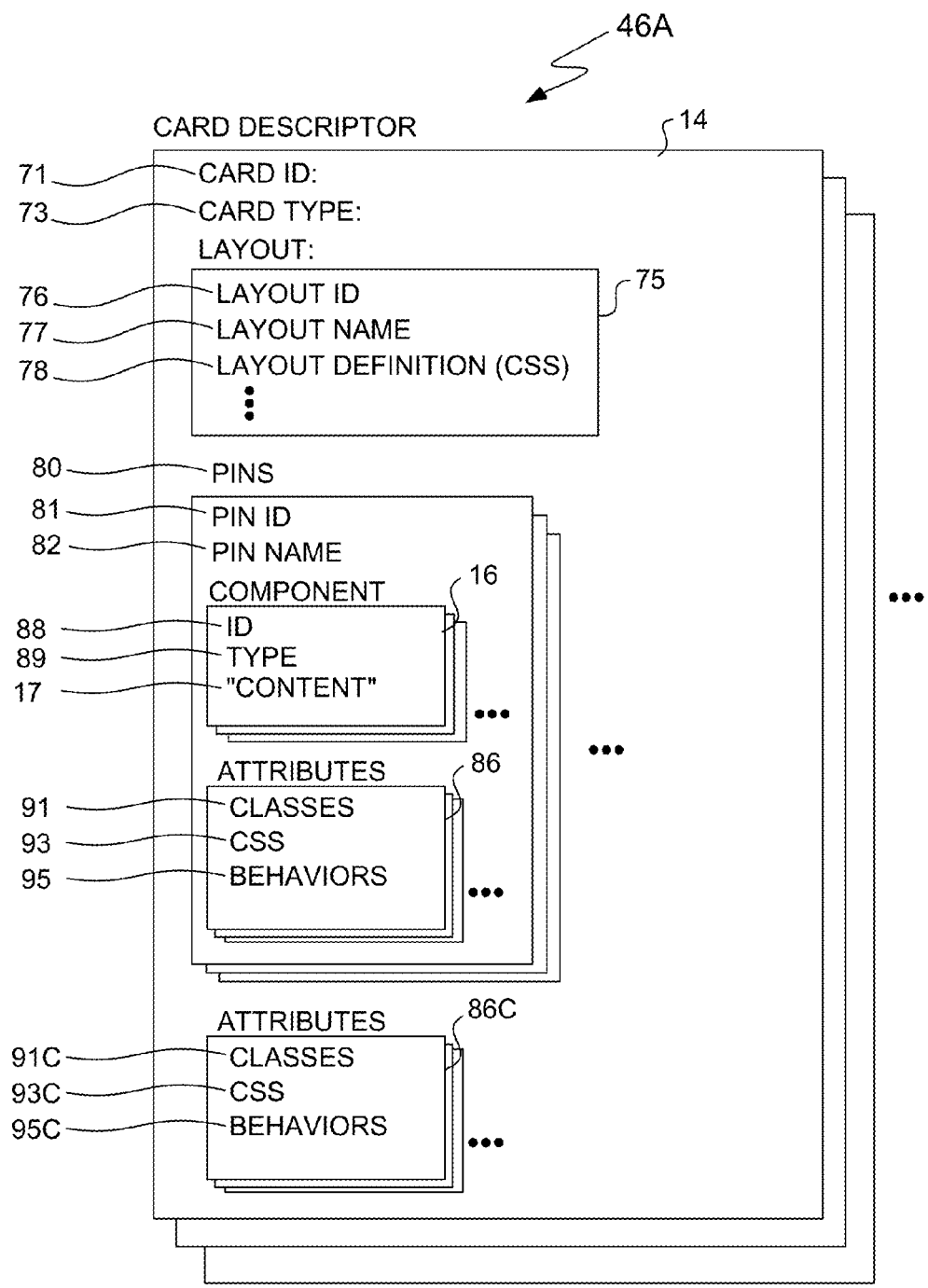
FIG. 6A is a diagram illustrating the hierarchy of a particular card descriptor in accordance with the principles of the present invention.
Figure 6B:
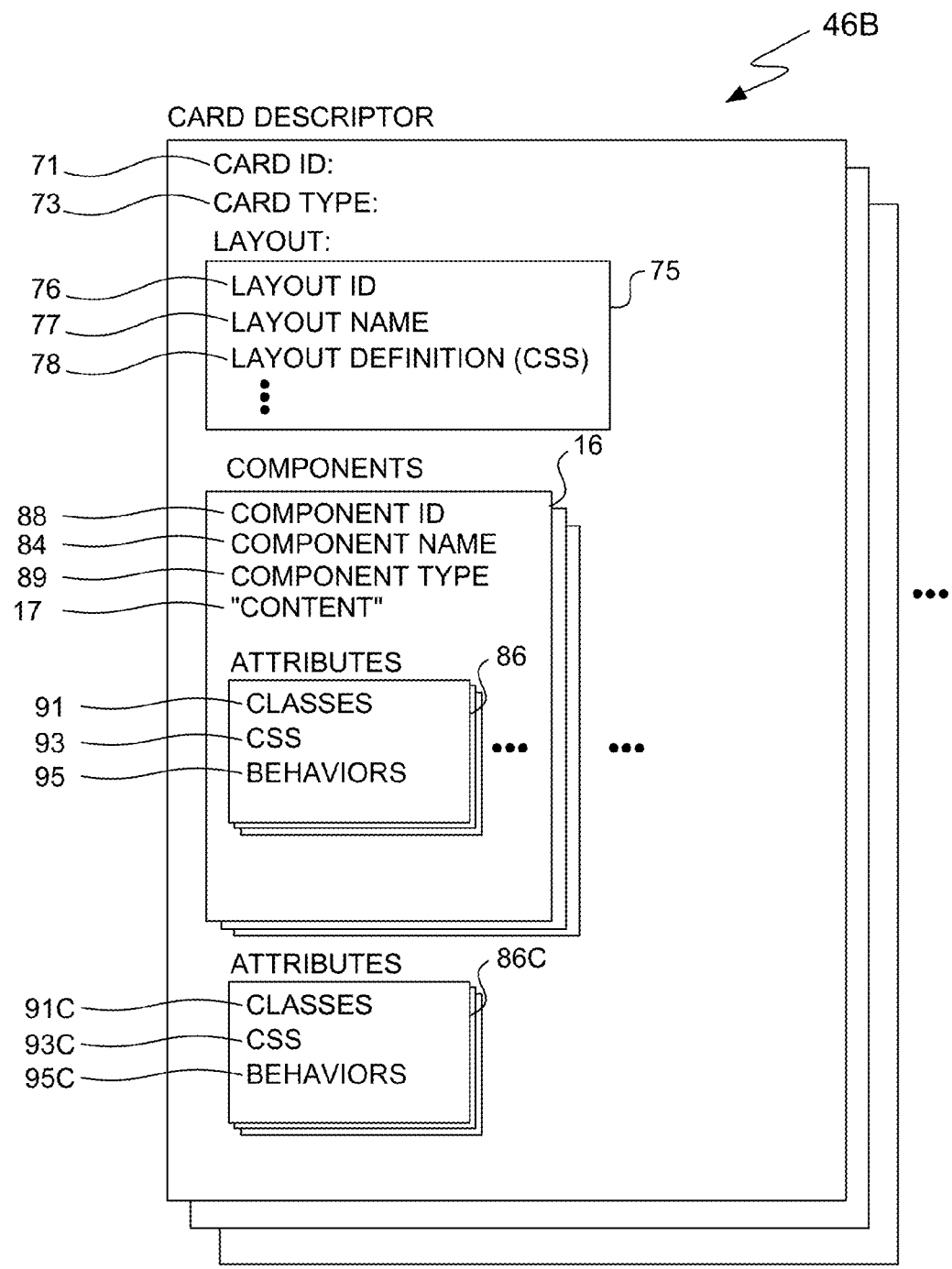
FIG. 6B is a diagram illustrating the hierarchy of a second card descriptor embodiment.
Figure 6C:
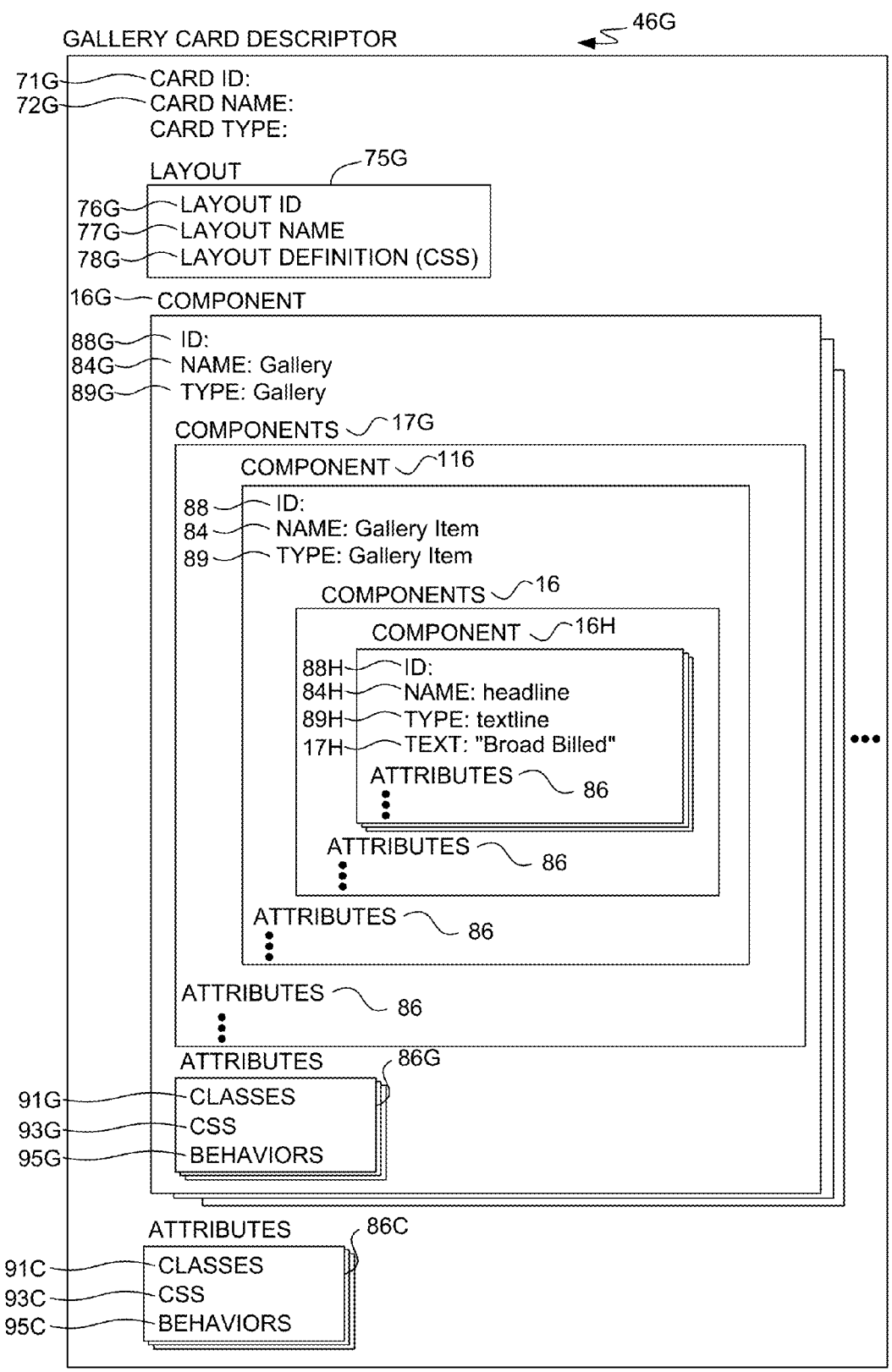
FIG. 6C is a diagram illustrating the hierarchy of a gallery card wrap descriptor embodiment.
Figure 6D:
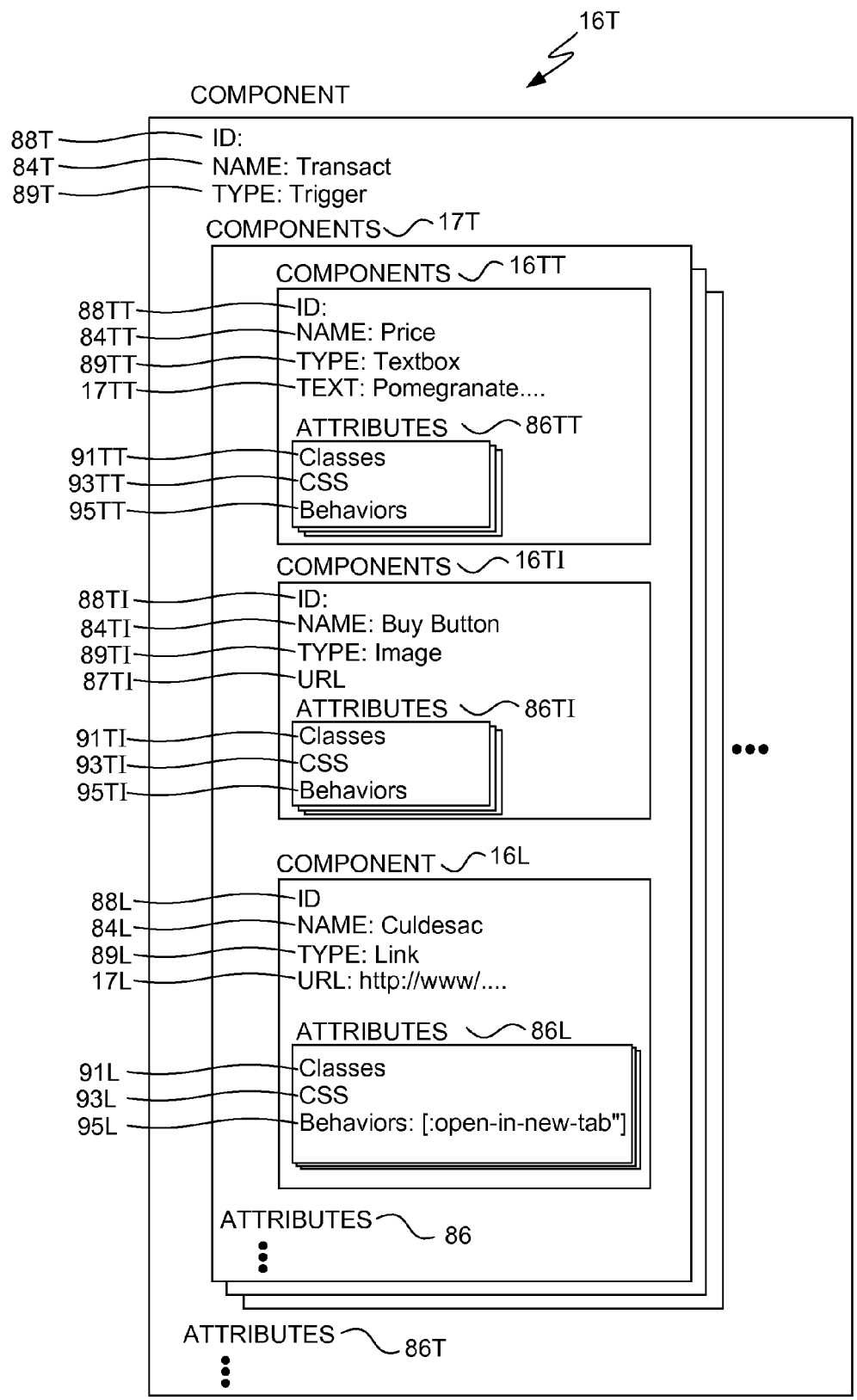
FIG. 6D is a diagram illustrating the hierarchy of a trigger component descriptor embodiment.

Referring next to FIGS. 6-6D, a variety of specific descriptor structures suitable for use in defining various wraps, cards and/or components will be described. Although specific descriptor structures are illustrated, it should be appreciated that the structure of the various descriptors can be widely varied. In general, the descriptors are arranged to define the structure, layout, content and behaviors of the wrap without details of its presentation on a particular device. That is, the descriptors capture the functional and behavioral intent of the author, in a platform independent way, such that the runtime may implement the described structures and behaviors in a way optimal for the platform in question.

A wrap generally will include multiple cards and the corresponding wrap descriptor will typically have discrete descriptors for each of the cards. The card descriptors each include a unique card identifier and define the structure, behavior, layout and content of the corresponding card. Behaviors associated with any particular card can be applied at the card level (i.e., associated with the card as a whole), at a component level (i.e., associated to a particular component alone—which may or may not include subcomponents) or at any subcomponent level. Since the card descriptors are discrete, self-contained, units with a unique identifier, it is very easy to mix wraps (i.e., use cards created for one wrap in a second wrap). When cards are mixed, their components and associated behaviors remain the same—although it is possible to define behaviors that are context or state aware and therefore exhibit different states/properties/responses/etc. in different circumstances.

The components are encapsulated units that may have defined content (although such content may be dynamic) and, when desired, specific defined behaviors, styles and/or other attributes. In some preferred embodiments, each component has a unique identifier and may optionally also have an associated type and/or name. The use of encapsulated components with unique component identifiers makes the components highly modular such that an authoring tool can readily use and reuse the same components in different cards and/or wraps. Behaviors can be associated with the component and any component can be composed of one or more subcomponents which themselves are fully defined components.

Regardless of the level to which they are applied (i.e., wrap level, card level, component level, subcomponent level, etc.), the behaviors are preferably declared in the descriptor rather than being explicitly defined within the descriptor. In that way, the behavior declaration acts as a hook which can be used to associate virtually any programmable logic with a card/component/etc. The behaviors are preferably defined (or at least obtainable) by the runtime viewer.

FIG. 6, diagrammatically illustrates the structure of a first representative wrap descriptor 40. In the illustrated embodiment, the wrap descriptor 40 includes the wrap ID 42, the wrap title 44, and a card descriptor 46 for each of the cards 14. Each card descriptor 46 describes of the structure, layout and content of the associated card. The wrap descriptor 40 may also optionally include cover identifier(s) 43 and/or any other desired information or metadata 45 relevant to the wrap. The cover identifier(s) 43 identify any cover(s) 15 associated with the wrap. Other information and metadata 45 may include any other information that is deemed relevant to the wrap, as for example, an indication of the creation date and/or version number of the wrap, attributions to the author(s) or publisher(s) of the wrap, etc.

The card descriptors 46 may be arranged in an array, deck, or in any other suitable format. In the diagrammatically illustrated embodiment, each card descriptor 46 includes: a unique card identifier (card ID 71); a card layout 75; and optionally, an associated card type 73. The card layout 75 preferably includes at least one of a layout identifier (layout ID 76) and a layout definition 78 and optionally, a layout name 77. When the layout definition is not explicitly provided in the card descriptor 46, it may be obtained by reference through the layout ID 76. The layout definition 78 may be provided in a variety of different format. By way of example, Cascading Style Sheets (CSS) works well. As will be appreciated by those familiar with the art, CSS is a style sheet language used for describing the look and formatting of a document. Of course, in alternative embodiments, other style sheets and/or other now existing or future developed constructs may be used to define the layout of the cards.

The card ID 71 is preferably a unique identifier that uniquely identifies the associated card 14. An advantage of using unique identifiers as card IDs 71 is that the cards 14 are not wed to a particular wrap package 10, but rather, can to be used in or shared among a plurality of wrap packages. That is, once a card is created it can be used in any number of different wraps by simply placing that card's descriptor 46 at the appropriate locations in the card decks of the desired wrap package. Thus, the unique card IDs 71 can be used to help streamline the process of using one or more cards 14 from one wrap package 10 in a second wrap (sometimes referred to as the "mixing" of cards 14 and/or wrap packages 10), which can help simplify the process of creating the second wrap package. In some implementations, the card IDs 71 may also take the form of URLs, although this is not a requirement. A potential advantage of using URLs as the card IDs 71 is that the URLs can potentially be used to allow a card in the middle of the wrap to be more directly accessed from outside of the wrap.

The card layout 75 defines the layout of the components 16 of the associated card 14. Preferably the card layout 75 includes a card layout ID 76 which uniquely identifies the associated layout. In some embodiments, the descriptor itself defines the layout using a conventional web presentation definition mechanism such as Cascading Style Sheets (CSS). In other embodiments, the layout definition may be accessed from a server using the layout ID 76. As will be familiar to those skilled in the art, CSS is a style sheet language used for describing the look and formatting of a document written in a markup language. CSS enables separation of document content from the document presentation, including elements such as the layout, colors and fonts. Thus, CSS is very well adapted for inclusion within the wrap descriptor 40 itself.

It should be noted that the layout ID 76 is also useful in the context of the aforementioned authoring tool used to create and author wrap packages 10. Specifically, in some embodiments, the authoring tool is provided with a number of pre-defined templates (card layouts) from which an author of a new card can choose. Each template has one or more containers/components 16, which are arranged on the card in a pre-determined manner for holding card content 17. The template itself can have any particular layout, or can be used to create a particular layout. In either case, the particular layout can be assigned a unique layout ID 76, and thereafter, be used and reused in conjunction with different cards thereby simplifying the card creation process.

The card type 73 (which is optional in the descriptor) relates primarily to such an authoring tool. For convenience, the templates may be categorized into different groups or classes. By way of example, the classes/groups may relate to their intended uses, the entity for which the templates are to be used, to the creator of the templates or any other logical grouping of templates. For example, card type 73, can be assigned to one or more predefined card templates, depending on their intended function. For instance, an authoring tool may include one or more card templates, each centric for the display of text, visual media such as photos or images, the playing of video, live or streaming media, application functionality (e.g., scheduling appointments, GPS, etc.), or supporting e-commerce (e.g., displaying products and/or services for purchases, chatting with online sales representative, etc.) respectively. Thus for each template type and class/grouping, card type ID 73 may be assigned.

With the template-based approach, the author(s) of a wrap package 10 can easily select a desired template/card layout that meets their need from a set of available templates and create a new card by readily inserting the desired content, functionality and/or services into the predefined containers. Such a template based approach can greatly simplify the authoring of cards 14 and wrap packages 10, since the author(s) need not be an expert in HTML, scripting or other typical web page language constructs required in order to create the card(s) 14 as typically required with creating conventional web pages. Rather, those details are embodied in the selected template itself, which translates to a specific layout 75, which in turn is identified by the layout ID 76. When a run-time instance of the wrap package 10 is created, layout 75 is used to format the associated card 14.

The associations between components 16 and their contained content objects 17, whether explicit in the card descriptors, or implicit and anonymous, are sometimes referred to herein as "pins" 80. When explicit, pins 80 are identified in the card descriptors 46 by a universally unique Pin ID 81, and by a symbolic pin name 82. When implicit, pins are anonymous at runtime, but may at design time be instantiated in order to provide operable constructs to the authoring tools, in which case they will share the name and ID of the component they bind and associate.

Whether implicit or explicit, these conditions are equivalent, and one representation may be trivially transformed into the other and vice versa, with no loss of meaning. The runtime, authoring environment and other tools are free to transform the object graph as they see fit, and whether the association is treated as intrinsic or extrinsic is irrelevant for the purposes of the determination of the structure of the wrap and its contents, this transformation being a matter of convenience.

The symbolic name of a pin (pin name 82) or component is both Human and Machine-Readable, for example, "Headline", "Glyph", "Body", "Image", "Video", "Cul-de-sac", or any other heading that the template designer deems appropriate. The symbolic name is used to identify its function; can be used and bound to by constraints and layouts to further constrain their display, behavior and function; and is used by the authoring tools to identify the role of the thus-associated component and map fields from one layout to another when changing the layout associated with a card. Multiple pins or components can share the same symbolic name. When they do, it implies that they serve the same role in the system, and that the same rules will apply to them.

Components 16 contain there associated content 17 and may also contain or reference zero or more attributes or constraint objects, specifying metadata to manage or modify the display of, or behavior of, that component. Constraint objects may specify abstract symbolic data used by the runtime to determine how to display or manage the object containing it, (the Constrained Object,) or the behavior of that object. Examples of such abstract symbolic data are CSS class names, behavior names, or other symbolic names acted on by other objects in the system. Constraints may also contain concrete specifications to modify the display or behavior of the object, or its container or any contained objects. An example of the former is containing CSS rules applied to the content. An example of the latter is inclusion inline or by reference of JavaScript code that acts on the constrained object.

The various constraint objects may be thought of as attributes that define the style, format, behaviors, source/feed, and/or constraints associated the corresponding content 17. In the illustrated embodiment, these attributes include style attributes 86, source attributes 87 and other constraint objects such as behaviors 60, 62. Of course, other attributes of a component can be defined and declared as appropriate for the associated content.

The style attributes associate various styles with the content 17 and may take the form of style sheets (e.g. CSS) or other conventional style definition mechanisms. By way of example, if the content 17 is a text string, the style attributes 86 may include features such as the font, size, case, color, justification, etc. of the text. If the content is a glyph, the style attributes may include the color of the glyph, the size, etc.

The source attributes 87 indicate the source of the associated content 17. In some circumstances, the source attribute may simply be a reference or pointer (e.g. a URL) that identifies the location of a static content object (e.g., an image, a photo, a video, etc.). However, it should be appreciated that the content can also be dynamic. For example, the content object associated with a component of a wrap could be the current price of a particular stock. In such a case, the source attribute identifies the feed from which the current price will be retrieved when the card is rendered.

The ability to incorporate feeds into a wrap is a powerful construct that facilitates a wide variety of different functionalities including the dynamic updating of information presented in a wrap after the wrap has been rendered. In general, a feed is a structured source having content that can be dynamically updated after the wrap has been rendered. As will be appreciated by those familiar with the art, there are a wide variety of different types of feeds and different feed structures. For example, a live streaming feed may present a live stream that is progressively rendered as the stream is received. Examples of live streams include live video streams, audio streams, biometric streams, stock ticker streams, etc. Other feeds are server side event driven as is commonly used to facilitate live updates—as for example, sports score updates, stock price updates, etc. Still other feeds are polling feeds in which the wrap periodically polls a source.

The source attribute 87 may take the form a feed descriptor that defines the nature and structure of the feed as well as its feed characteristics including source location, data format(s), update semantics, etc. For example, some feeds (e.g. live feeds and live update feeds) require that a socket be opened and kept open as long as the feed is active. Polling feeds require the identification of the desired polling frequency. In other embodiments, the source attribute may include a reference to a feed object (note shown) that defines the feed.

It should be appreciated that there are a very wide variety of different types of information/content that a wrap author may desire have updated dynamically while a wrap is being displayed. These might include items that may be expected to update frequently and others that may update very slowly. By way of example, a few examples of items that may be desirable to update dynamically include sports scores, stock prices, the number of tickets still available for purchase for an event, number of units of a product that are available or simply an indication of whether a product is in our out of stock, breaking news headlines, etc. A number of services can also benefit from the ability to dynamically update content based on information that can change while a wrap is displayed such as, the user's geographic location, social networking group information (e.g. friends or peers that are nearby, online, etc.), featured information, etc. For example, a card in a wrap for a sports stadium could show the nearest concession stands, restrooms, etc. which can vary as the user roams around the stadium. Another card could show the stats of a baseball player currently at bat. A social networking card may inform a user when their friends or others sharing similar interests are nearby. A retailer may wish to run special offers that update periodically. Of course, these are just a few examples, and the types of content that a wrap author may wish to be able to update dynamically is only limited by the creativity of the author. Other constraint objects may include declarations of specific behaviors that are intended to be associated with the component 16 and/or content 17. Such behaviors may include behaviors 60, 62 known to or accessible by the runtime viewer 50 as discussed above.

FIG. 6A diagrammatically illustrates an alternative pin based card descriptor structure 46A. Appendix II of U.S. Provisional Application No. 62/133,574 illustrates a representative wrap descriptor 40A that takes the form of a JSON object that utilizes the pin based card descriptor structure 46A illustrated in FIG. 6A. FIGS. 14A-14E illustrate the wrap defined by the wrap descriptor of Appendix II of the referenced provisional. To facilitate correlation between the Appendix and FIG. 6A, various descriptor elements are labeled with corresponding reference numbers in Appendix II of the referenced provisional.

In the embodiment of FIG. 6A, the card descriptor 46 includes a unique card ID, 71, a card name 72, card type 73 and a card layout 75. The layout 75 includes a layout ID 76, optionally a layout name 77 and an explicit layout definition 78. In the illustrated embodiment, the layout definition takes the form of style sheets (e.g., cascading style sheets (CSS)). Although the illustrated embodiment includes both the layout ID 76 and an explicit layout definition 78, it should be appreciated that either could be eliminated from the descriptor if desired. For example, if the explicit layout definition is not part of the descriptor structure, it could be accessed through the use of the layout ID. Alternatively, when the layout definition 78 is explicitly provided, the explicit use of the layout ID 76 may be eliminated. However, it is generally preferable to explicitly provide the layout ID.

The descriptor 46A also includes an array of zero or more pins 80, with each pin 80 corresponding to a first level component 16. Each pin 80 includes a pin ID 81, a pin name 82 and an associated component 16. The component 16 includes a component ID 88, a component type 89, and the component content 17. As indicated above, the content may be provided in-line or by reference. Any desired attributes and behaviors may then be associated with the component through a set of zero or more component attributes 86 which potentially include any desired component style class declarations 91, component style sheets (CSS) 93 and component behavior declarations 95. In the illustrated embodiment, the style class declarations 91 refer and bind to CSS classes defined in the layout definition 78 that are used to define the format of the associated component 16. Numerous examples of this binding can be seen in the Appendix II of the referenced provisional. By way of example, the first pin 80(1) in Appendix II has an associated component style class declaration 91(1) that refers to and binds the font size style "font size-x1" 96 defined in layout 78 to the associated text content 17(1).

Component style sheets 93 provide an alternative component level mechanism for associating specific styles and formatting with a component 16. In general, it is expected that the card layout definition 78 will define the styles and formats associated with each component in a robust manner that is satisfactory to the card author. In such implementations, there is no need to include any component level style sheets 93, and it is expected that in many (indeed most) such card implementations, no component style sheets would be provided. Rather, the associated styles may be bound through the use of class declarations 91. However, the component style sheets 93 provide a mechanism by which the style assigned to the component by the layout definition 78 may be overwritten, which gives card authors great flexibility in defining the stylistic presentation of their content without altering the card layout definition. In other implantations, it may be desirable to define some of the style attributes at the component level rather than the card level. In such implementations more aggressive use of component level style sheet 93 would be expected. In still other embodiments, the availability of component level style sheets can be eliminated altogether. In the illustrated embodiment, style sheet are used to assign styles to the components since they are currently a popular format for associating different styles with HTML content. However, it should be appreciated that other now existing or later developed constructs can readily be used to associate styles with the content as appropriate.

Behaviors 60, 62 can be associated with a component on the component level in the same manner as the style sheets. This can be accomplished, for example, through the use of behavior declarations 95 which declare specific behaviors 60, 62 with their associated component. It should be appreciated that the ability to associate specific behaviors with specific components in a general manner provides tremendous flexibility in the card creation process that facilitates the creation of cards having an incredibly wide range of functionality and behaviors while maintaining a simple, compact, and highly portable wrap structure. Even though there is an ability to associate behaviors with specific components, it is expected that the behavior set may be null for many components because they would have no need to have any specific behaviors associated therewith.

The card descriptor 46A also associates any desired card level attributes and/or behaviors with the card through a set of zero or more attributes 86C that are associated with the card at the card level. Like the component attributes 86, the card attributes 86C potentially include any desired card level style class declarations 91C, card level style sheets 93C and/or card level behavior declarations 95C which work in substantially the same way as the component attributes, except that they operate at the card level. When desired, the wrap descriptor 40 can also have similar wrap level attributes 86W. Similarly, when the content of a component includes one or more sub-component(s), the various subcomponent(s) may have their own associated component attributes 86 regardless of the tier of the component/subcomponent. Still further, when desired, attributes can be associated with groups of components.

FIG. 6B diagrammatically illustrates an alternative card descriptor structure 46B that does not utilize pins 80. The structure of card descriptor 46B is generally similar to the structure of card descriptor 46A described above with respect to FIG. 6A except for the use of pins. Therefore, the attributes (e.g., styles and behaviors) are associated with their corresponding components 16 rather than with pins 80. Like in the embodiment of FIG. 6A, the card descriptor 46B includes a card ID 71, a card name 72 and a layout 75. The layout 75 includes a layout ID 76, layout name 77 and layout definition 78. The descriptor then includes an array of zero to many components 16.

Each component 16 includes a component ID 88, a component name 84, a component type 89, the associated content 17 and the associated attributes 86. Like in the previously described embodiment, the associated attributes may include associated classes 91, component style sheets or definitions 93, behavior declarations 95 and/or their associated behaviors 60, 62. Thus it can be seen that card descriptors 46B are functionally substantially equivalent to the card descriptors 46A described above.

Appendix III of U.S. Provisional Application No. 62/133, 574 illustrates a representative wrap descriptor 40B that takes the form of a JSON object that utilizes the component based card descriptor structure 46B illustrated in FIG. 6B. This descriptor defines the same wrap illustrated in FIGS. 14A-14E and is generally equivalent to the wrap descriptor of Appendix II of the referenced provisional. To facilitate correlation between Appendix III and FIG. 6B, various descriptor elements are labeled with corresponding reference numbers in the Appendix. It is noted that the attributes container 86 is labeled "Styles" in the JSON code of Appendix III.

Although only a few particular card descriptor structures have been described, it should be appreciated that equivalent functionality can be obtained using a wide variety of different descriptor arrangements.

Gallery Card Descriptors

FIG. 6C illustrates a representative gallery card descriptor 46G. The illustrated embodiment uses the component based descriptor approach of FIG. 6B although it should be appreciated that other card descriptor hierarchies (such as those illustrated in FIGS. 6 and 6A can be used as well. Gallery card descriptor 46G includes card ID 71G, card name 72G (in this case "Gallery Card"), and card layout 75G with layout ID 76G, layout name 77G and CSS layout definitions 78G, which together define a layout suitable for a gallery card. The initial component is gallery component 16G, which has a component ID 88G, a component name 84G, a component type 89G, gallery component content 17G, and any associated attributes 86G (including class declarations 91G, style sheets 93G and behavior declarations 95G).

In the illustrated embodiment, both the component name 84G and the component type 89G are "Gallery." The "content" of the gallery component 16G is a set of one or more gallery item components 116. Each of the gallery item components 116 typically, although not necessarily, has the same component structure previously described and can be thought of as subcomponents. This introduces a powerful feature of the described architecture. That is, the "content" of any particular component may be one or more "subcomponents". Similarly, the content of any of these "subcomponents" may also include one or more next tier components and so on, with the components at each tier having the same generic structure.

Thus, each gallery item component 116 includes: a component ID 88, which may be thought of as a gallery item ID; a component name 84, a component type 89, content and any associate attributes 86 (potentially including class declarations 91, style sheets 93 and behavior declarations 95).

In the illustrated embodiment, the component name 84 and component type 89 for the gallery item 116 is "Gallery Item". The content of the gallery item 116 is a set of components (subcomponents) that make up the gallery item (that is, gallery items 116, which are subcomponents of the gallery component 16G, themselves have subcomponents which might be thought of as third tier components). Each of these gallery item components has the same structure as any other component. By way of example, the gallery item components may include a headline component 16H, and an image component 16I (shown in Appendix III of U.S. Provisional Application No. 62/133,574). Only the headline component 16H is shown illustrated in FIG. 6C, but the content of a representative headline component 16H and image component 16I may be seen in gallery items 116(1)-116(3) shown in FIGS. 14B-14D and the corresponding JSON descriptor is shown and labeled in Appendix III.

With the described structure, specific behaviors or styles can be associated with components at any level. Thus, for example, a behavior can be associated at the card level, the gallery item level, the component of a gallery item level or at any other level at which components are used. An example of a card level behavior might be the aforementioned gallery card "snap to item" behavior 60C, which can be seen in the aforementioned Appendices I, II and III. An example of a gallery item subcomponent level behavior might be a trigger as described below.

Although a particular gallery card descriptor structure has been described, it should be appreciated that equivalent functionality can be obtained using a wide variety of different descriptor arrangements.

Trigger Descriptors

Referring next to FIG. 6D a descriptor structure for a representative trigger component will be described. Like other components, the trigger component 16T includes an optional trigger component ID 88T, a component type 89T, a component name 84T, content 17T and any associated attributes 86T (including any class declarations 91T, style sheets 93T and behavior declarations 95T). In the illustrated embodiment, the component type 89T is labeled "trigger" and the component name 84T is labeled "transact" indicating that the trigger is a transaction trigger.

The content 17T of the trigger component 16T in this illustrative example includes three subcomponents. The subcomponents include a text box 16T, an image 16TI that takes the form of a "buy button" and a link 16L. An example of such a trigger 340 can be seen in FIG. 7F wherein the content of the text box 321 is "pomegranate $18 for 12 16-ounce bottles", the content of the image is the buy button 327 and the link is a link to an external e-commerce site where a purchase transaction may occur. The link 16L has an associated behavior "open-in-new-tab", which causes the browser to open the target URL in a new tab when the trigger is activated by tapping on a touch sensitive display anywhere within the region defined by the trigger or by otherwise activating the trigger. The described link trigger behavior is a good example of a component level behavior.

In the illustrated embodiment, the link component 16L is a first level component of the trigger and therefore the link is activated by tapping on (or otherwise selecting) any component within the trigger—as for example either the text box 321 or the buy button 327. If the card creator preferred to have the link activated only by selection of the buy button 327, that can readily be accomplished by making the link a component of the buy button 327 rather than a first level component of the trigger—or, by moving the text box component definition out of the trigger—as for example to the same component level as the trigger itself. Any tap or click in the bounding rectangle of the trigger, as defined by the components contained by the trigger, results in the trigger being activated.

It should be apparent that the trigger component may be included as a first tier component in the card descriptor or as a subcomponent at any level within the card descriptor hierarchy. Although a particular trigger descriptor structure is illustrated, it should be appreciated that equivalent functionality can be obtained using a variety of different descriptor arrangements. It should further that FIG. 6D is illustrative for providing an example for the purchase of an item for sale. It should be understood, however, that the cards can be authored with triggers for a wide variety of actions besides purchasing an item, such as the reservation or booking of goods and/or services, online chats, GPS related services and functionality, etc.

Maintaining State Information

In many circumstances it may be desirable to transitorily or persistently maintain state information associated with a user and/or state information associated with a wrap 10. Some information, such as general information about the user, may be shared state information that is relevant to a number of different wraps. Other state information may be specific to a particular wrap (e.g., a particular user selection or input within a wrap, etc.). Still other relevant state information can be more global state information that is relevant to all instances of a particular wrap independent of the specific user.

State information can be stored in a number of ways and the appropriate storage techniques will vary in part based on the nature of the state information. By way of example, general information about a user and other user specific shared state data can be maintained in a cookie, or when the user has a persistent viewer application, the user state information can be persistently stored locally in association with the viewer application. If desired, any or all of the shared state information can also be stored on the server side. The shared state information may be useful to support a wide variety of different services including: user login and/or authentication; e-commerce applications where the identity, contact info, mailing address, credit card information etc. of the user may be necessary; integration with other applications (e.g. a calendar application, a chat application, etc.); and many other services. User specific shared state information can also be used to affect the navigation within a wrap. For example, user demographic information can be used to determine which card to display next in a set of cards.

There are also a variety of circumstances where it will be desirable to persistently maintain state information about the state of a particular wrap. For example, if a card includes a dialog box that receives a user selection or a textual input, it may be desirable to persistently store such selections/inputs in association with the wrap itself so that such information is available the next time the wrap is opened by the same user (or same device).

In a nonexclusive embodiment, a state descriptor 68 is created and used to maintain state information associated with a particular wrap as illustrated in FIG. 5B. The state descriptor 68 is associated with both a specific wrap and a specific user and thus can be used to store state information relevant to that specific user's interaction with the wrap. When persistent state descriptors are used, the state descriptor 68 may be stored with the wrap on the publication server 22. When the user has a persistent viewer application, the state information can additionally or alternatively be stored locally in association with the viewer application either in the state descriptor form or in other suitable forms. Generally, a state descriptor 68 will include a wrap ID 42 and a user ID that identify the wrap and user that the descriptor is associated with respectively. The state descriptor 68 also stores the relevant state information in association with the card and component IDs for which the state information applies.

In certain embodiments, it may also be desirable to synchronize different instantiations of state information, depending on the where the state information is stored. For example if a user updates their credit card or shipping address information at a publication server 22, then the corresponding state information residing within any particular wraps associated with the user, or within a persistently stored wrap viewer residing on a communication device belonging to the user, would preferably automatically be updated. Conversely, any state information locally updated within a wrap and/or a persistently stored viewer would also selectively be updated in any other instantiations of the state information, such as but not limited to, other wraps, publication servers 22, on a network, or any other remote data processing location for example.

Transaction Handling

Referring next to FIG. 8A-8H, a card based approach for in-wrap transaction handling will be described. The illustrated example is a shopping purchase transaction. Although particular card layouts and functionalities are shown and described, it should be appreciated that these features are merely illustrative of a very specific example and that virtually any desired card based functionality and presentation could be provided in their place.

Figure 8A:
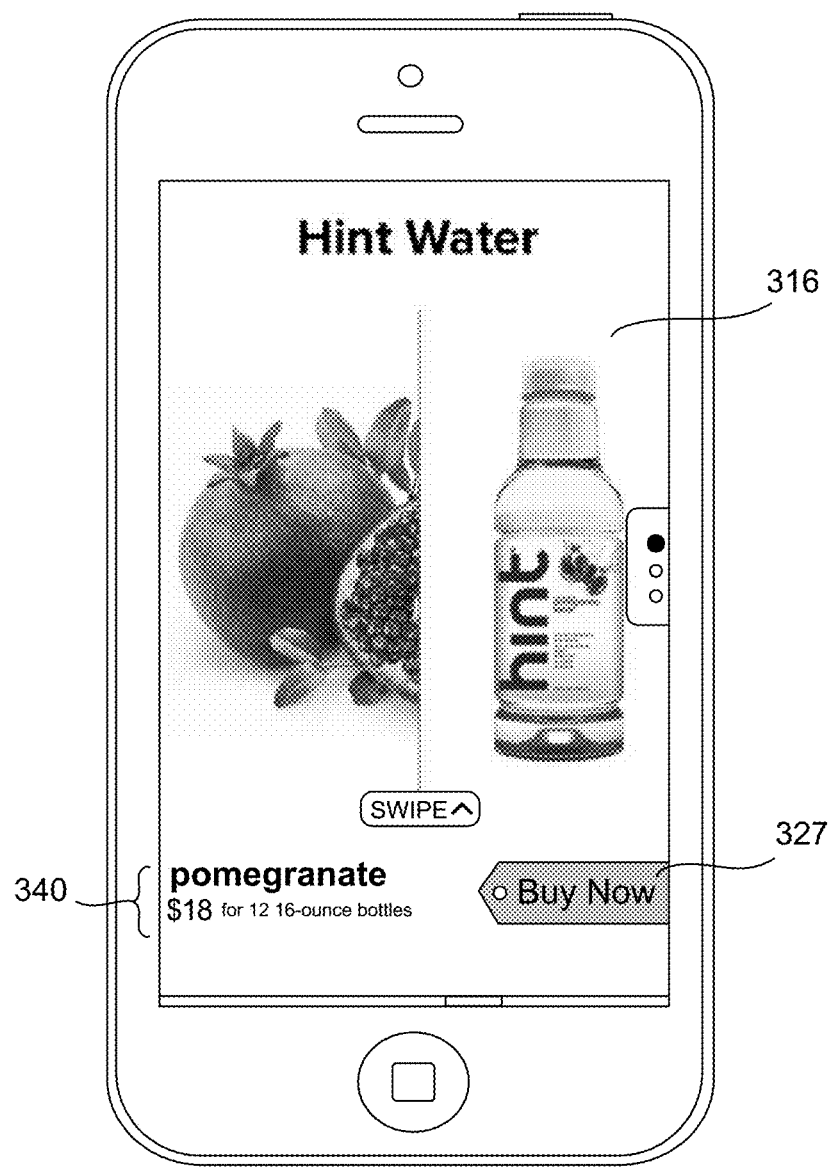
FIGS. 8A-8H are a series of cards for implementing an exemplary purchase of products through a wrap package in accordance with the principles of the present invention.

FIG. 8A reproduces the first page of gallery card 316 as shown in FIG. 7F. In this embodiment, trigger 340 is arranged to link the user to another card 321 within the wrap (e.g., wrap 310) rather than to an external web page. Therefore, when the user presses the "Buy Now" button 327 on card 316 (or any other portion associated with trigger 340), the wrap transitions to an associated shopping card 321 as illustrated in FIG. 8B, which facilitates the beginning of the purchase process.

Figure 8B:
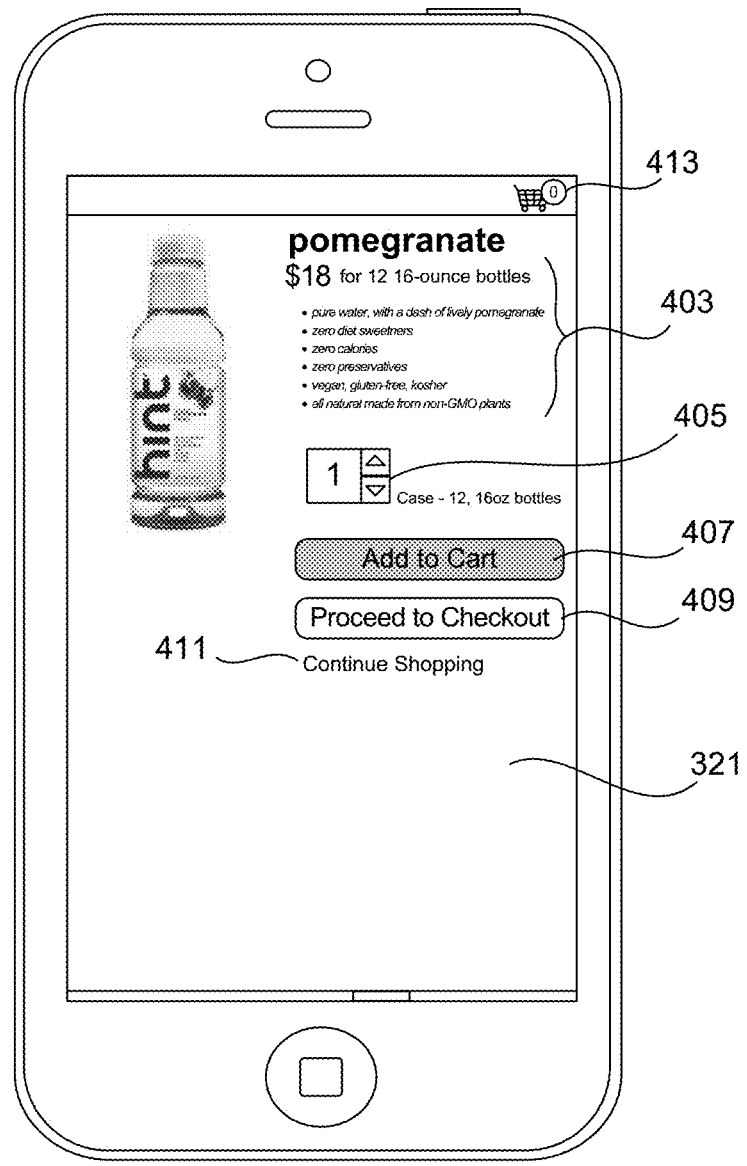
Figure 8C:
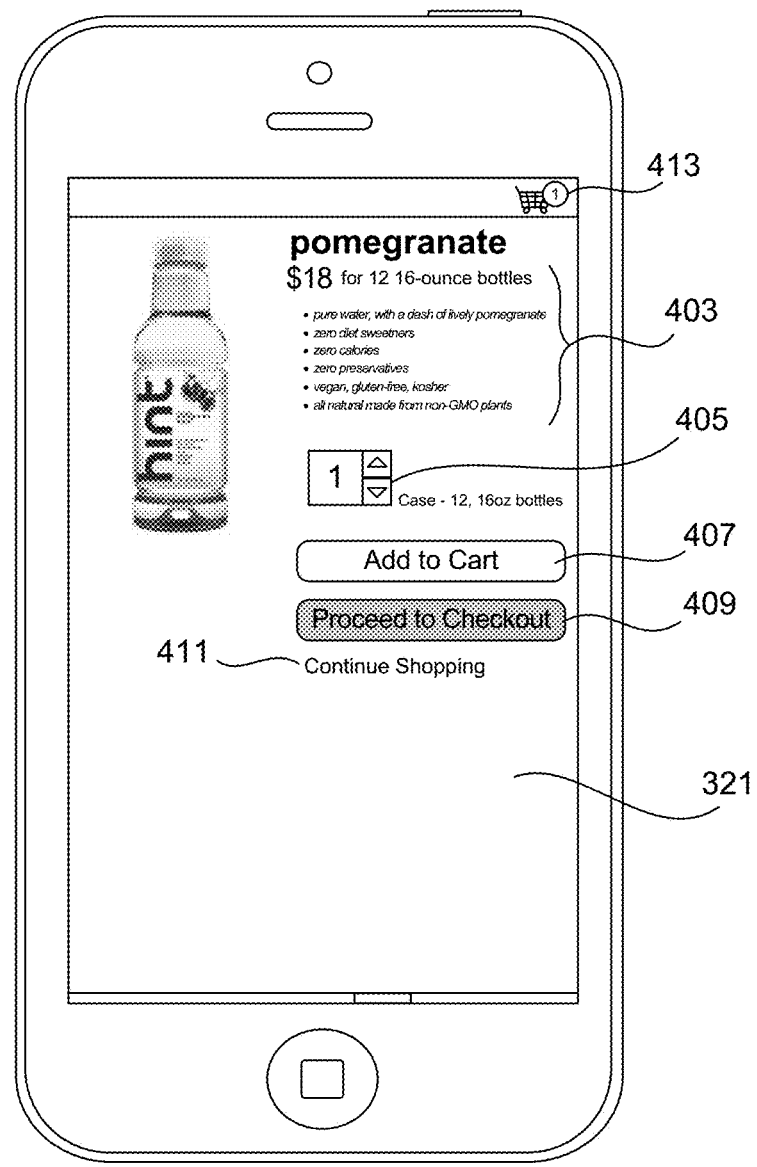

In the embodiment illustrated in FIG. 8B, the shopping card 321 contains product information 403, a quantity selector 405, and Add to Cart button 407, a Proceed to Checkout 409 button, a navigational link 411 for continued shopping and a cart icon 413. The product information 403 provides some information about the selected product and may take any suitable form. In the illustrated embodiment, an image and textual description is provided. The quantity selector 405 allows the user to select the number of units of the displayed product that the user would like to purchase. User selection of the Add to Cart 407 button adds the selected item (including the quantity purchased) to a list of purchased items which is graphically indicated to the user by incrementing the number shown in the cart icon 413. This change in cart icon state can be seen by comparing FIG. 8B, which shows the cart icon prior to adding an item to the card and FIG. 8C, which shows the cart after adding an item. The changes in the card's state would typically be stored locally in association with the wrap until the purchase process is completed, although in other embodiments, such changes can be immediately communicated to a vendor's shopping platform using appropriate APIs. Navigational link 411 is a trigger that includes the text "Continue Shopping". When selected, the navigational link 411 returns the user to the card 316 from which they began or some other card within the wrap.

Figure 8D:
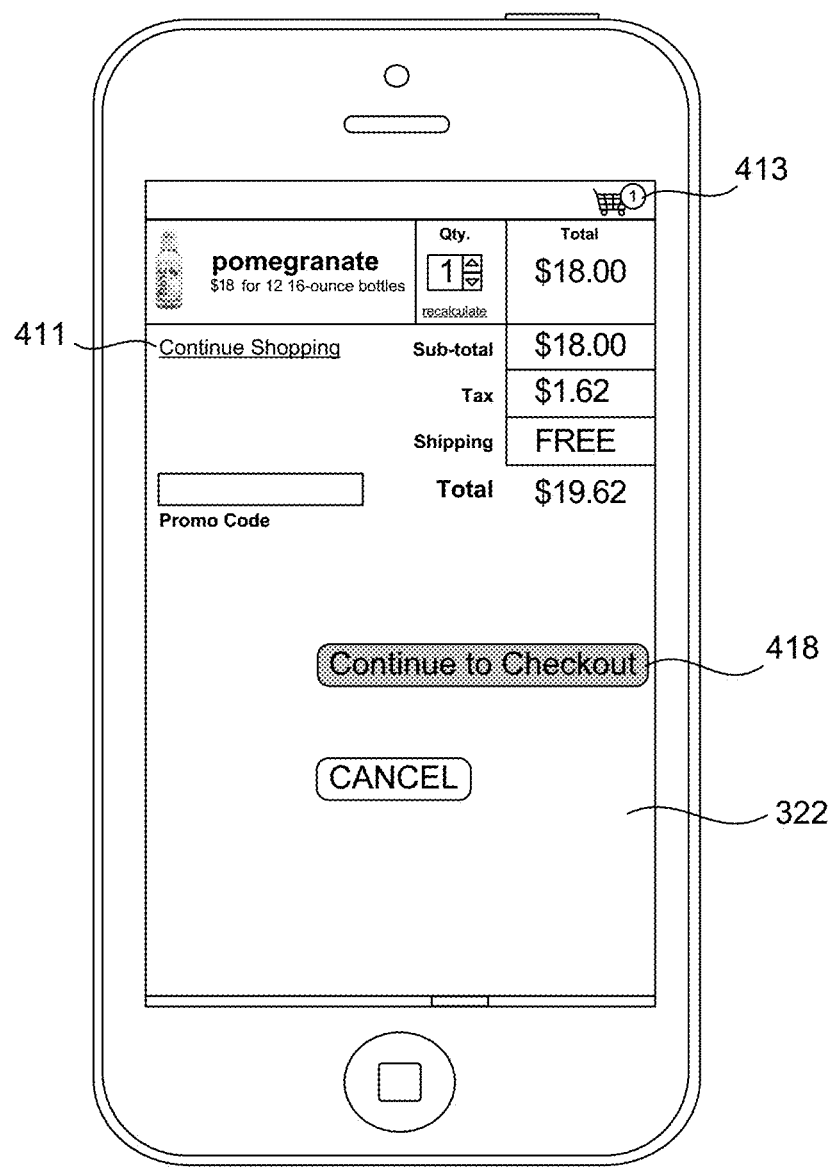

Selection of "Proceed to Checkout" button 409 causes the wrap to transition to Order Summary Card 322 as shown in FIG. 8D. Alternatively, a left swipe gesture from Shopping Card 321 will also cause the wrap to transition to Order Summary Card 322. In the illustrated embodiment, the Order Summary Card 322 summarizes the items in the shopping cart and provides mechanisms by which the user can enter additional information relevant to the purchase (e.g. a Promo Code), cancel the transaction, or return to shopping by selecting button 411.

Figure 8E:
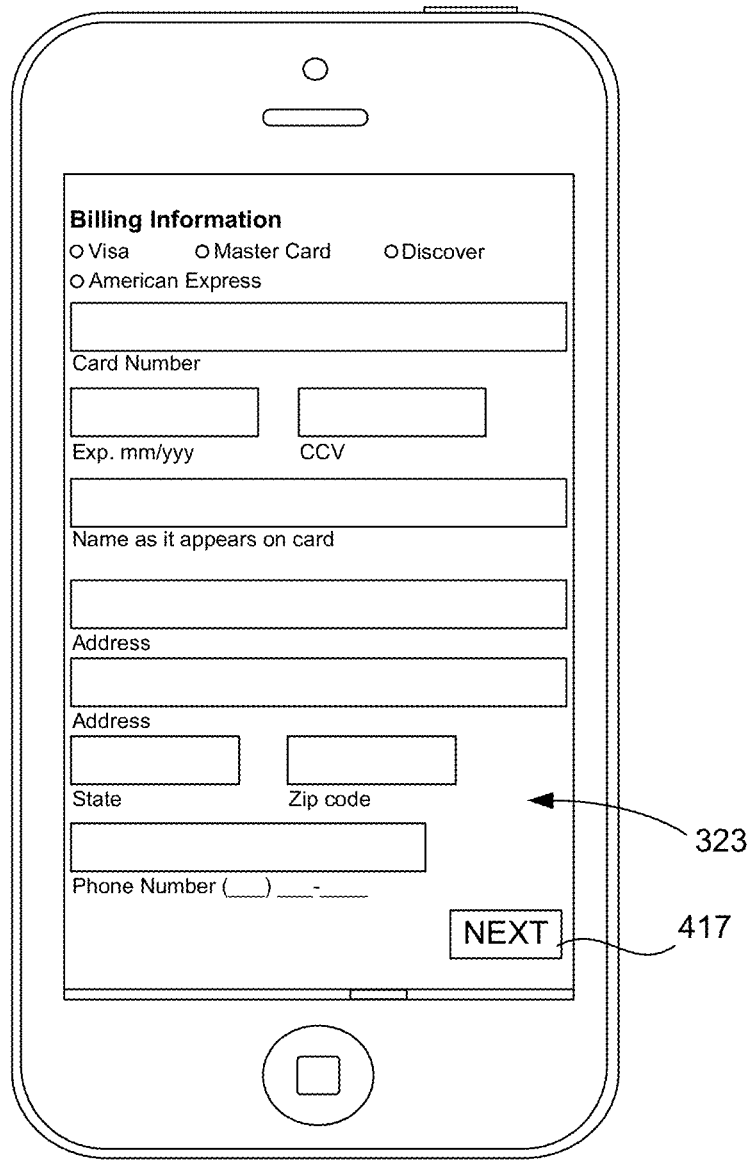

Swiping to the left on the Order Summary Card 322, or selection of the "Continue to Checkout" button 418, causes the wrap to transition to the Billing Information Card 323 as shown in FIG. 8E. The Billing Information card 323 provides text entry boxes for inputting the buyer's billing information. In various embodiments, the information can be entered manually or automatically using a auto-fill function as is well known in the art.

Figure 8F:
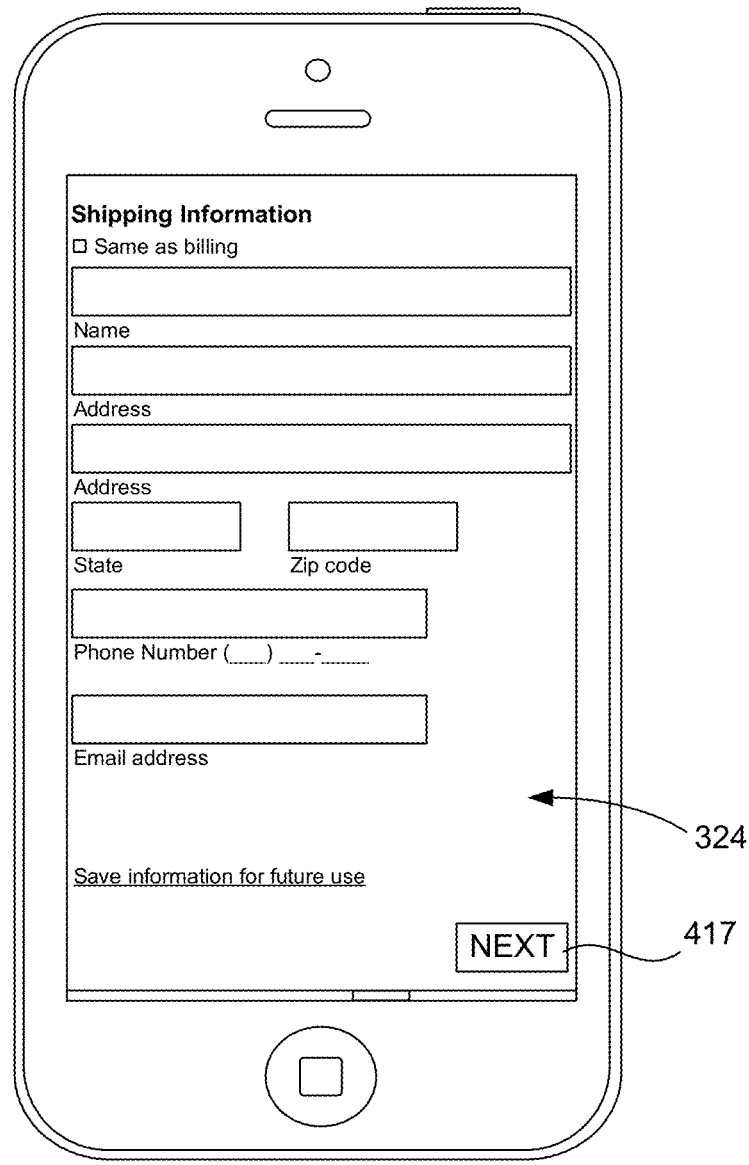

Once the user billing information is entered, the user may transition to the next card—Shipping Information Card 324 seen in FIG. 8F by either swiping left or selecting the "next" icon 417.

Figure 8G:
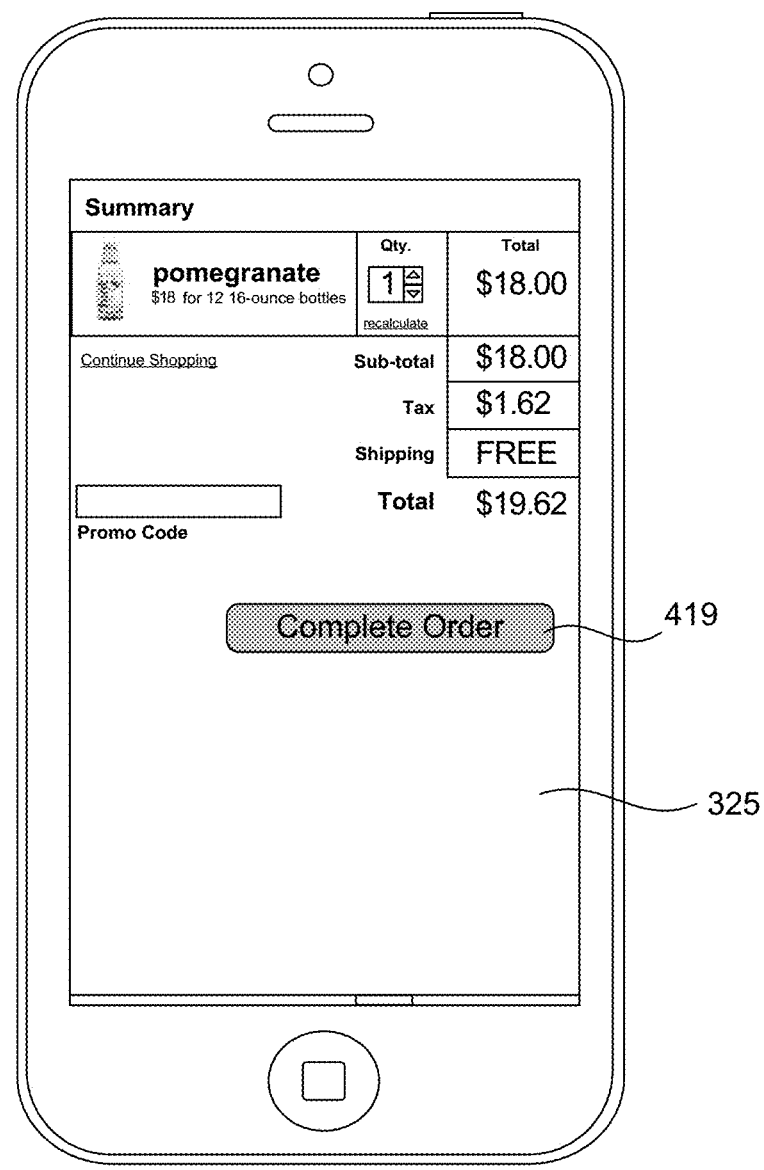
Figure 8H:
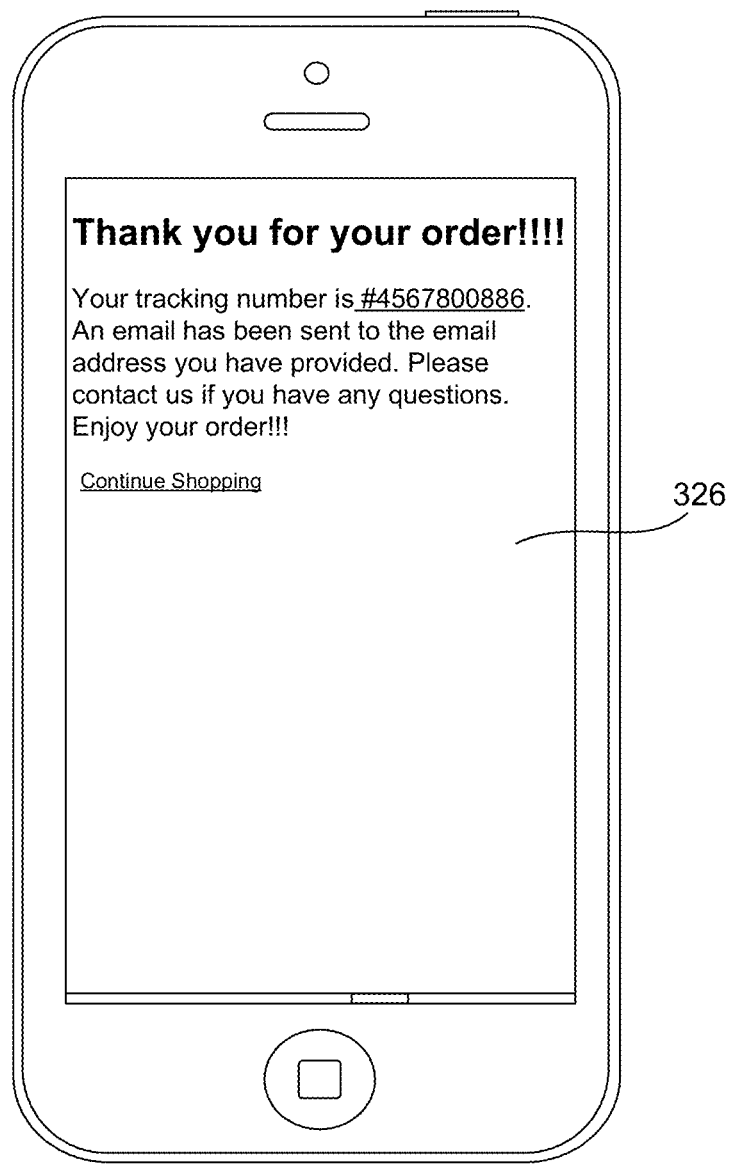

Similarly, once the required shipping information is entered into the text entry boxes on the Shipping Information Card 324, then the user may transition to the Purchase Summary Card 325 seen in FIG. 8G. Selecting the "Complete Order" button 419 on Purchase Summary Card 325 commits the purchase, causing the order to be transmitted to the vendor shopping platform where it is processed and a receipt is returned to the user and displayed in Receipt Confirmation Card 326 as seen in FIG. 8H.

Each of the user buttons 327, 407, 409, 417, 418, 419 as well as links 411 may be implemented as triggers. In circumstances where the object of the trigger is to link to another card, then the link associated with the triggers is simply the target card. Where other functionality is required, the trigger can initiate the desired action(s) and also link to a target card if appropriate.

It should be appreciated that it may be desirable to define somewhat different card transition behaviors for different cards in the shopping purchase sequence. For example, a left swipe on Receipt Confirmation Card 326 (FIG. 8H) may be arranged to return the user to the card from which the purchase sequence began—i.e., Gallery Card 316 (FIG. 8A) or some other location within the receipt deemed appropriate by the wrap author. It may be desirable for a right swipe on Receipt Confirmation Card 326 to cause a transition back to the Purchase Summary Card 325 but to have the state of the Purchase Summary Card 325 changed to provide an "Order Submitted" message in place of Complete Order button 419.

The desired behavior of Purchase Summary Card 325 may be more complex. For example, when the Purchase Summary Card 325 is in the state shown in FIG. 8G (i.e., the purchase order has not yet been committed), it may be desirable to have a right swipe transition the wrap back to Shipping Information Card 324 and to disable a left swipe since the author may not want to commit a purchase transaction without an affirmative selection of the "Complete Order" button by the user. Conversely, when the Purchase Summary Card 325 is in the "Order Submitted" state (not shown), it may be desirable to allow the user to left swipe back to the Receipt Confirmation Card 326, whereas a right swipe might transition the wrap back to the Gallery Card 316 (FIG. 8A), where the purchase sequence began, or some other predetermined landing card. In still other implementations, the right swipe could be disabled if desired. Regardless of the desired card transitioning behavior, the desired behavior can readily be defined using the behavior definitions described above. Importantly, the behavior definitions can also take the current state of the cards into the account in determining the card transition logic. It should be apparent that any of the described cards can be arranged to interact with vendor e-commerce websites (e.g., Shopify APIs), back-end e-commerce systems, platforms and the like.

In the embodiment illustrated in FIGS. 8A-8H, the purchase of a product is accomplished through a series of sequential cards designed to illicit from the viewer the information necessary to complete the electronic transaction. In an alternative embodiment, the content of these cards, including the various data entry fields, can also be implemented in one or more gallery cards. In such embodiments, the viewer would be required to scroll up and down the gallery card(s) and enter the appropriate information in the displayed data entry fields.

In the illustrated card deck, Order Summary Card 322 and Purchase Summary Card 325 are described as separate cards. It should be appreciated that the functionality of these two cards could be implemented as a single card shown in two different states, with the Order Summary state (e.g., the state shown in FIG. 8D) being shown when purchaser information is still missing and the Purchase Summary state (e.g., the state shown in FIG. 8G) being shown when all needed purchaser information is present.

A potential advantage of using an installed or native wrap package application based viewer is that user information can be securely stored within the viewer and, if desired, automatically associated with the order as appropriate, thereby potentially eliminating the need to render the Billing and Shipping Information Card 323, 324.

In still other implementations, the stored user information can be auto-filled into the various cards. It can be imagined that the desired card sequences may vary significantly based on both the current state of a particular card and what persistently stored user information is available to the wrap. The ability to simply select/declare a desired behavior from a palette of predefined card behaviors give card authors (and template designers) a powerful tool for providing complex card behaviors without requiring the authors to learn or understand the intricacies of card navigation programming. Rather, system designers can define a number of card behaviors that are believed to be useful, and any of those predefined behaviors can be used by the template designers and card authors. If new card behaviors are desired, they can readily be written and added to the card behavior definitions 60.

One-Click Buying

Wrap packages are also conducive to facilitating "one-click" buying. For example if a viewer has previously set up an account and registered for one-click purchases, a purchase transaction could be initiated by simply selecting the "Buy Now" trigger 327 appearing in FIG. 8A for example. In an alternative one-click embodiment, the viewer can add one or multiple items into a shopping cart. Then by selecting a "Buy Now" trigger, the item(s) in the shopping cart will automatically be purchased.

Serving a Wrap Package

There are a number of items associated with defining and rendering a wrap package. These include the wrap descriptor 40, the wrap runtime viewer 50, the referenced assets 65, and when appropriate, the behavior extensions 62 and/or state descriptor 68. On the wrap server side, these items may be stored in any arrangement that is deemed appropriate for securely delivering the various items in an efficient manner.

Figure 9A:
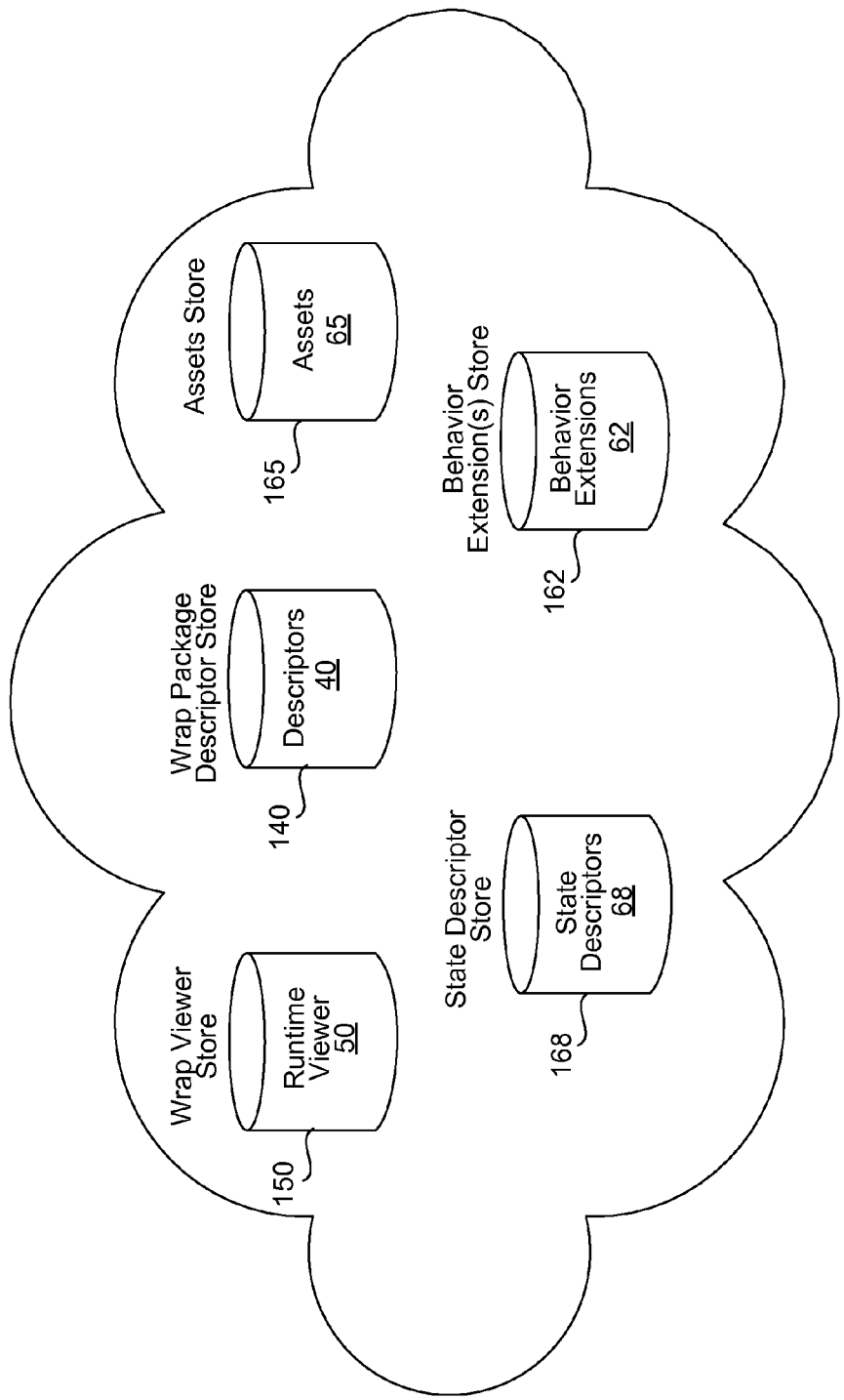
FIG. 9A is a diagrammatic representation of a wrap distribution environment highlighting item stores useful in delivering wrap packages.

Conceptually, the various wrap items may be thought of as being stored separately from one another as illustrated in FIG. 9A. By way of example, these may include one or more of each of: a wrap package descriptor store 140 that stores wrap descriptors 40; a wrap viewer store 150 that stores the runtime viewer(s) 50; a state descriptor store 168 that stores the state descriptors 68, an extensions store 162 that stores extensions 62; and an assets store 165 that stores assets 65. In various embodiments, it is understood that the assets 65 used to populate wrap packages 10 may be obtained from any available source and there is no requirement that all of the assets be contained or included in a single store.

Although the various stores are shown separately for emphasis, it should be appreciated that their respective functionalities can be combined into one or more physical store(s) in the same or different locations in any desired manner. Furthermore, each of these store items is discretely cacheable both on the network side and on individual devices.

In non-exclusive implementations, the wrap distribution environment as depicted in FIG. 9A may be configured as a Content Delivery Network (CDN), meaning that servers and stores are deployed at different data centers across the Internet. As a CDN, the wrap distribution environment is preferably optimized to serve various wrap packages to a large numbers of users with minimal delays.

In the wrap descriptor framework described above, much of the actual content of the cards (e.g., assets 65) is maintained outside of the wrap descriptor 40. That is, many, most or all of the wrap package's assets are referenced within the wrap descriptor 40 rather than being stored within the descriptor 40. Thus, the wrap descriptor 40 can be quite small even for large wraps that are rich in media content. As a result, the wrap package (i.e., the wrap descriptor 40) can be quickly downloaded while still providing the viewer with a full description of the entire wrap structure. This separation of assets from the descriptor helps make wrap packages highly portable.

An asset 65 referenced by a card 14 of a wrap 10 assets can be downloaded to the consuming device 12 using any desired scheme. By way of example, in some scenarios, the assets 65 associated with any particular card 14 can be downloaded on an "as needed" basis, only when the card is to be displayed or is expected to soon be displayed. In other scenarios various caching schemes can be use, whereby the assets associated with nearby cards are downloaded while a given card is displayed. In still other scenarios the downloading of some, or all, of the wrap package assets is begun shortly after the wrap descriptor is received and, when necessary, other assets are downloaded on an as needed or other appropriate basis.

Figure 9B:
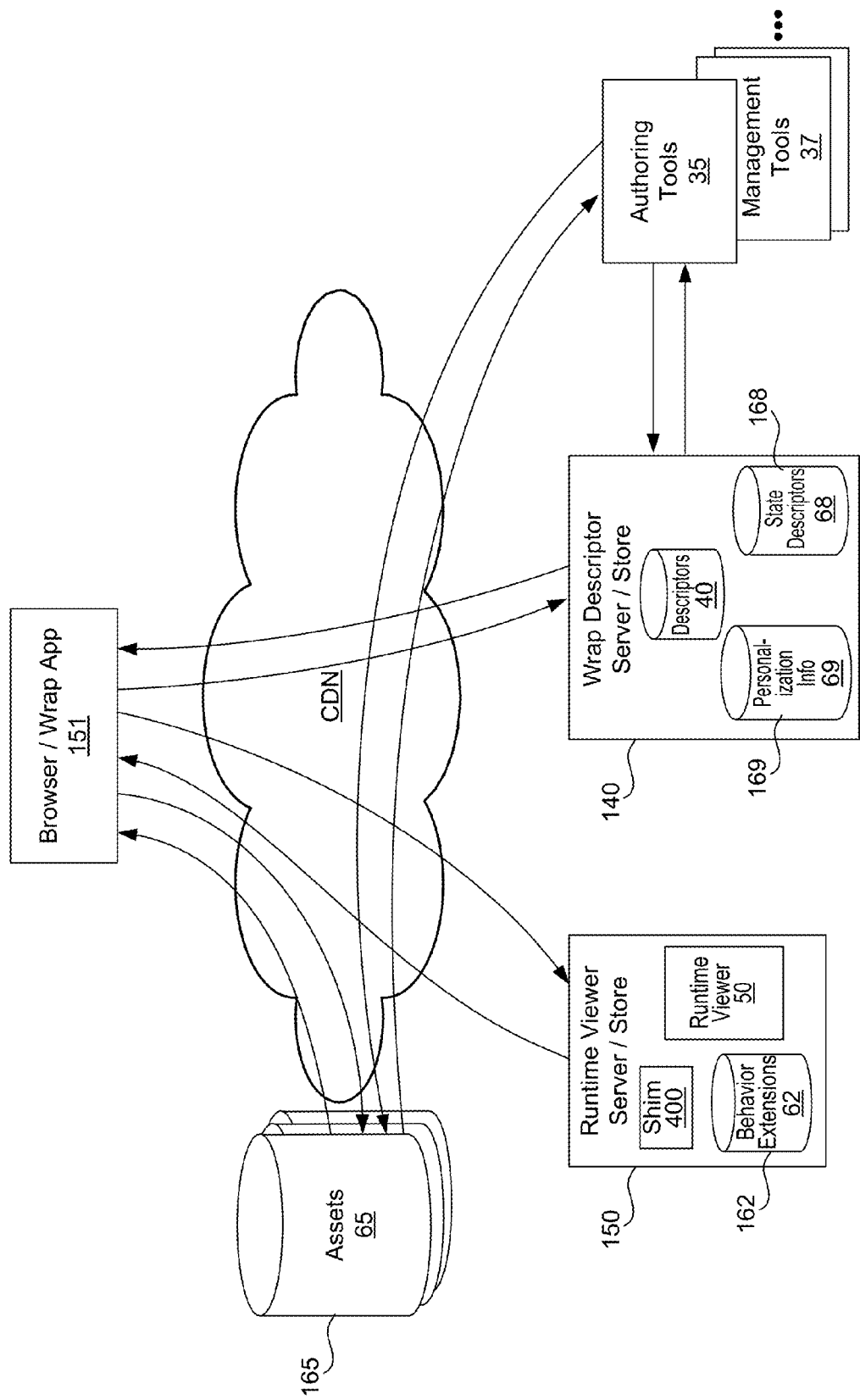
FIG. 9B is a diagrammatic representation of an alternative server/store architecture suitable for delivering wraps.

Referring next to FIG. 9B, another embodiment of an environment for the creation and distribution of wrap packages will be described. The environment includes one or more of each of wrap descriptor server/store 140, runtime viewer server/store 150 and asset stores 165. A browser 151 or runtime viewer app running on a communication device 12 communicates with the server/stores through an appropriate network (e.g., the Internet), which is preferably configured as a content delivery network CDN. The runtime viewer server/store 150 is arranged to store and deliver the runtime viewer 50, extensions 62 and/or a shim 400 (described later) upon request. That is, requests for the runtime viewer 50, extensions 62 and shim 400 are directed towards and fulfilled by the runtime viewer server/store in the illustrated embodiment.

The wrap descriptor server/store 140 is arranged to store and deliver upon request the wrap descriptors 40, state descriptors 68 and any other personalization information 69 relevant to a particular user. Thus, requests for specific wrap descriptors 40, state descriptors 68 and any other personalization information 69 are directed towards and fulfilled by the wrap descriptor server/store 140. The state descriptor store(s) 168 and personalization store(s) 169 may be contained within the wrap descriptor server/store 140. When desired, multiple different wrap descriptors server/stores 140 may be used and/or the state descriptors 68 and/or personalization information 69 can be stored and delivered from other locations.

As previously mentioned, the assets 65 may be stored at a wide variety of different locations as diagrammatically represented by asset stores 165. Wrap authoring tools 35, management tools 37 etc. can also communicate with wrap descriptor server/store 140 and asset stores 165 as appropriate. The authoring tools may access existing wrap descriptors 40 to facilitate new wrap creation, wrap mixing and/or wrap editing (when permitted). The authoring tools would also access the wrap descriptor server/store 140 to upload new wrap descriptors, etc. Similarly, assets stores 65 may be accessed and/or added to as part of the wrap creation process. Similarly various management tools 37 may be arranged to communicate with the various stores to facilitate any desired management, tracking and other functionality.

Figure 10:
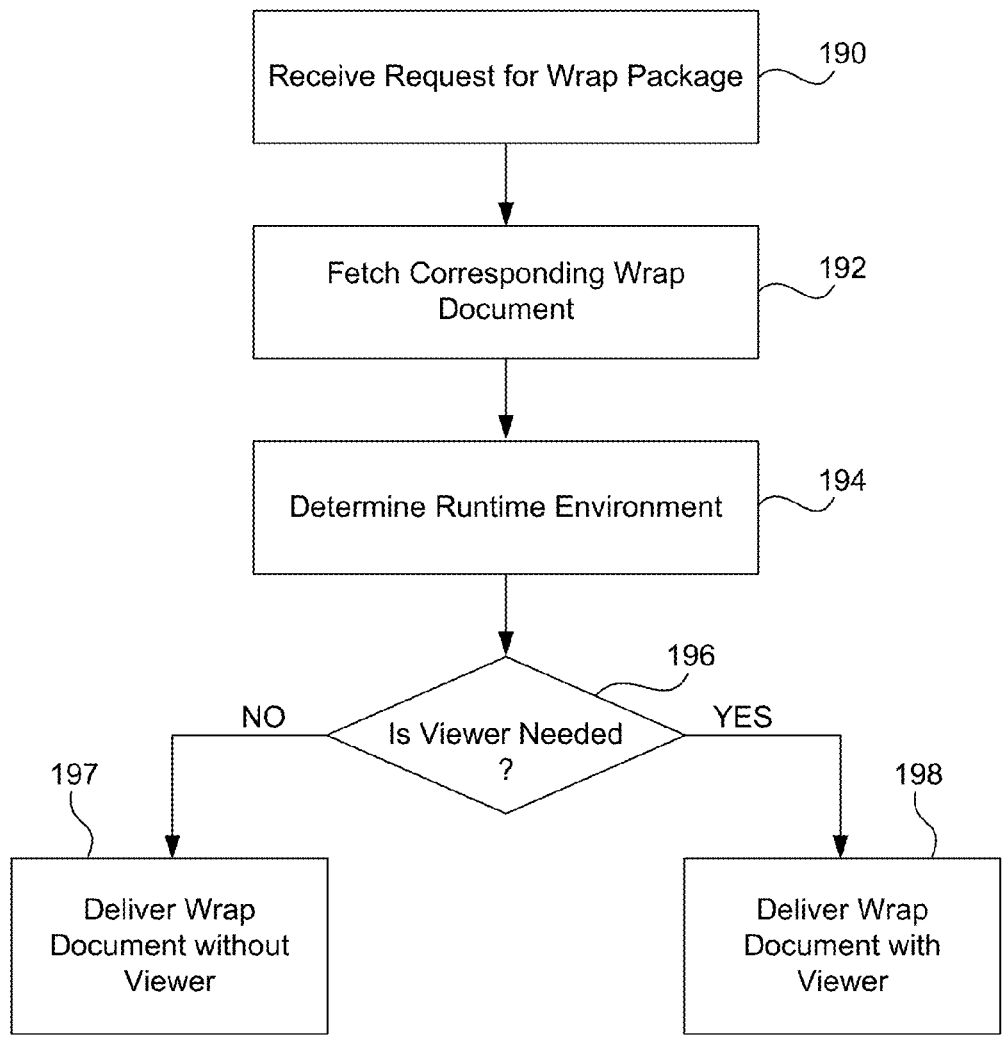
FIG. 10 is a flow chart illustrating a method of delivering a wrap package to a consuming device.

Referring to FIG. 10, a representative process suitable for delivering wrap packages is described. In the illustrated embodiment, a server (e.g., publication server node 22 or runtime viewer server/store 150) initially receives a request for a particular wrap package 10 (step 190). In embodiments in which the wrap ID 42 is a URL, the request can be invoked at a requesting device 12 simply by activating (e.g., clicking on or otherwise selecting) a link that contains or otherwise defines the URL. Thus, the wrap 10 can be accessed from virtually any platform capable of accessing a web link. As previously discussed, a cover that represents the wrap may include the wrap ID URL and thus the request can be invoked by simply clicking on a cover which may be embedded in a web page or an ad served in conjunction with a web page, embedded in a messages, such as an email, a text or SMS message, embedded in a Twitter tweet, or may be included with any other delivery mechanism that supports the embedding of a link.

When the server receives the request it identifies and fetches the desired wrap package 10 based on the wrap ID 42, contained in the target URL (step 192). The server also determines the run-time environment on the requesting device (step 194). This can be accomplished using standard bootstrap queries to the requesting device 12. The determination of the run-time environment will typically include an identification of the type or class of the requesting device 12 and viewing software, such as the operating system of the device 12 and/or a particular browser that the device 12 may be using. For example, the determination would typically ascertain the particular model of the requesting device (e.g., an Apple iPhone 6 Plus, a Samsung Galaxy S4, or other particular smart phone, tablet, laptop computer, desktop computer, smart watch, etc.) and the version of the software (e.g., browser or app) that is making the request, etc., and whether or not the requesting device has an installed wrap viewer or not. Of course, the server can also ask the requesting device for any additional information considered useful.

A determination is also made regarding whether a runtime viewer is already present on the requesting device (step 196). If a suitable viewer is present on the requesting device (e.g., the device has a wrap viewer app installed thereon or a browser based viewer is already present on the device), the requested wrap is delivered without a viewer in step 197. Alternatively, if a viewer is not present on the device, an appropriate run-time viewer 50 is delivered together with the requested wrap in step 198.

The delivered wrap package 10 is opened and consumed by the user on the device 12 via either a browser operating in cooperation with a wrap viewer 50 or the wrap package app. In either case, the layout of the cards 14 is customized for display on the screen of the requesting device 12. Once opened, the user can view, experience and interact with the wrap package 10 as intended by the author.

Regardless of whether the wrap viewer 50 is already present on the requesting device or is supplied together with the wrap 10, the presentation tools 55 are responsible for rendering the wrap 10 in a format suitable for the requesting device. Thus, when the wrap 10 is rendered, all of the content of the card(s) 14 is preferably arranged to fit on the display screen without the user needing to manually size the screen or scroll through the card, unless the card is specifically designed for scrolling such as may be the case with a gallery type card. This can be done because the presentation tool 50 knows the screen dimensions for the rendering device 12 and selects the presentation that is optimized for the particular display on the requesting device 12.

In a nonexclusive embodiment, the browser based versions of the run-time wrap viewer 50 may be written in a widely accepted format that can be executed by general purpose browsers operating on most any device. By way of example, JavaScript currently works well for this purpose, although other frameworks may be used as well. In some embodiments, the viewer 50 is a general purpose viewer that includes many, most, or all of the viewer tools and behavior definitions 60 that are available in the wrap ecosystem so that virtually any wrap can be viewed and all of its featured implemented using the accompanying viewer. In other embodiments, it may be desirable to provide a more compact viewer that includes a basic set of viewer tools and behavior definitions that is suitable for rendering and interacting with most wraps, or a basic set accompanied by any additional tools/behavior definitions that deemed necessary to render and/or interact with the specific wrap delivered.

It is anticipated that as the popularity of wrap packages increases, more users will install wrap viewers on their devices in the form of mobile apps, applications, browser plug-ins, etc., which is expected to reduce the proportion of wrap requests that require run-time delivery of a browser based viewer.

Figure 11:
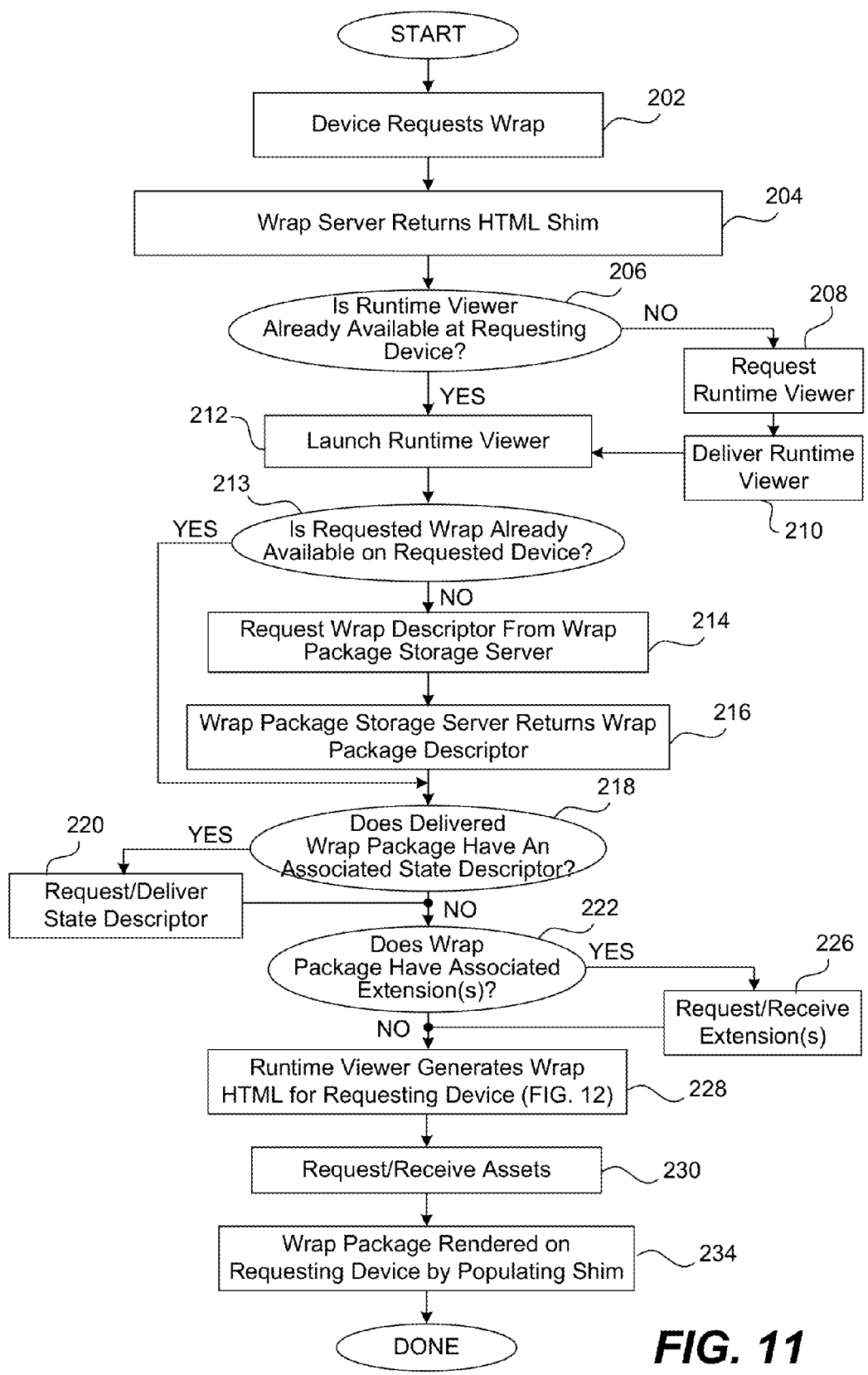
FIG. 11 is a flow chart illustrating a shim based method of delivering a wrap package to a consuming device.

Referring next to FIG. 11, an alternative, browser based process for requesting, delivering and rendering wrap packages will be described. This embodiment is well suited for use with the multi-tier wrap engine architecture of FIG. 9B. In this embodiment, the runtime instance of the wrap package is constructed locally at the requesting device based on the wrap descriptor at runtime. Such an approach may have several potential efficiency related advantages over the process described with respect to FIG. 10 including supporting simpler wrap caching strategies.

Initially, in step 202, a browser 151 on a requesting device 12 requests a particular wrap package 10 using the wrap ID 42. As previously described, in embodiments where the wrap ID 42 is a URL, the request can be invoked at a requesting device 12 simply by activating (e.g., clicking on or otherwise selecting) a link that contains or otherwise defines the URL. Thus, the wrap 10 can be accessed from virtually any platform capable of accessing a link. In the embodiment of FIG. 9B, this request is directed to the runtime viewer server/store 150, although in other embodiments, the same function can be performed by wrap server node 22.

When the runtime viewer server/store 150 (wrap server node) receives the request, it returns a generic HTML shim 400 to the requesting device 12 (step 204) rather than directly returning the requested wrap at this stage. The shim opens into a page (e.g., a blank browser webpage) that will be populated with the wrap and includes scripts suitable for initiating the process of accessing and rendering the requested wrap package 10.

By way of example, FIG. 13 illustrates a nonexclusive embodiment of a shim 400 suitable for use for this purpose. The primary function of the illustrated shim 400 is to provide a mechanism for calling the runtime viewer 50. This is accomplished by script tag 1402 in the illustrated embodiment. Thus, the shim 400 ensures that the requesting device has, or obtains a runtime viewer suitable for handling the wrap before the wrap is actually delivered.

In a non-exclusive embodiment, the shim is implemented in HTML code that is delivered to a browser in step 204 in response to a wrap request 202. As can be seen in FIG. 13, the shim 400 is a highly compact. It includes a script tag 1402, a default page title 1403, a style sheet 1405 that defines the initial layout of the page that will hold the wrap, an icon image 1407, and a div 1409. The script tag 1402 is primarily responsible for requesting the runtime viewer 50. The default page title 1403 is the label that is typically displayed in the browser tab associated with the blank window page that the wrap is opened into (the page title 1403 is simply "wrap" in the illustrated embodiment). The style sheet 1405 defines the layout of the page that is initially displayed, which is essentially blank at the initial stage. In the illustrated embodiment, CSS is used to define the page layout, although any other layout definition that can be interpreted by the browser can be used. The icon image 1407 is an image that some browsers display in the browser tab adjacent the title. The div 1409 causes the browser to allow the runtime viewer to rewrite the DOM for the page starting from that defined div node.

Returning to FIG. 11, the browser that receives the shim 400 will typically handle the runtime viewer request by first checking to see whether an appropriate runtime viewer 50 is already present on the device (step 206). If so, the runtime viewer 50 is launched in step 212. If a suitable runtime viewer is not already present on the requesting device, a suitable viewer is requested and delivered to the requesting device (steps 208/210) and launched by the browser (step 212). In the embodiment of FIG. 9B, the runtime viewer request is also directed to runtime viewer server/store 150.

The downloaded runtime viewer may be written in a format that can be executed by most browsers so that the same generic runtime viewer may be used to view any wrap on virtually any computing device that contains a general purpose browser. By way of example, JavaScript is a dynamic programming language that is currently well supported by most browsers, and is therefore, well suited for use in the runtime viewer. Of course, other now existing of later developed programming languages and frameworks may be used in other embodiments.

Once the runtime viewer 50 launches, it requests the wrap based on the wrap ID 42 used in the initial request. In a non-exclusive embodiment, the request may take the form of WRAPI.WRAP.CO/WRAP/<WrapID>, where <WrapID> is the wrap ID 42. In response, the browser or viewer will typically check to see whether the wrap descriptor 40 corresponding to the wrap ID 42 is available locally (step 213). If not, the wrap descriptor 40 is requested from and returned by the wrap descriptor store 140, as represented by steps 214, 216.

In embodiments where the initial wrap request comes from an executing runtime viewer (as for example from a native viewer app), then there would be no need for steps 204-212 and the initial wrap request 202 would initially check for the requested wrap descriptor locally (step 213) and proceed from there.

Once the wrap descriptor 40 is received, it is processed by the runtime viewer 50 resulting in the construction and rendering of the wrap in the browser page associated with shim 400. Some of the steps performed or caused by the runtime viewer 50 as it processes the wrap descriptor 40 are schematically represented as elements 218-234 in the flow chart of FIG. 11. Although a particular flow is illustrated, it should be appreciated that the described steps are functional in nature and are not necessarily performed in the illustrated order.

While processing the wrap descriptor 42, the runtime viewer 50 determines whether the wrap package 10 has an associated state descriptor 68 (step 218). As discussed above, it is contemplated that many wrap packages will not have an associated state descriptor while others will. A number of mechanisms can be used to indicate the intended/expected presence of a state descriptor 68. By way of example, in some embodiments, the wrap descriptor 42 includes a state descriptor flag (not shown) that indicates whether a state descriptor 68 is intended to be associated with the wrap. In such embodiments, the runtime viewer 50 determines whether to request the state descriptor 68 based on the status of the state descriptor flag. In another example, wraps 10 that require state descriptors 68 may be arranged to simple declare the existence of an associated state descriptor and the runtime viewer may be arranged to request the appropriate state descriptor. If a state descriptor 68 is intended, it is requested and received as diagrammatically represented by step 220. In the embodiment of FIG. 9B, any state descriptor requests are directed to wrap descriptor server/store 140, although they may be directed to wrap server 22 or other suitable stores in other embodiments. Typically, the browser or runtime viewer would first check to see if the state descriptor is cached or stored locally before sending a request to the server.

Another step performed by the runtime viewer 50 is determining if the wrap 10 has any associated behavior extensions 68. As discussed above, the wrap 10 may have a number of associated behaviors. The runtime viewer 50 may internally support many, most or all such behaviors. However, to help keep the runtime viewer 50 relatively compact while supporting a wide variety of functionality, the runtime viewer 50 is configured to support additional extensions 62 that may be utilized to define additional behaviors. Thus in step 222, the runtime viewer 50 determines whether any extensions 62 are needed to properly render the current wrap (step 228). If yes, the needed extensions are requested and retrieved (step 226). There are a number of mechanisms that can be used to trigger the extension request(s). For example, the wrap descriptor 40 may be arranged to identify the needed extensions 62 such that they can be retrieved as a group early in the wrap rendering process. In other embodiments, the extensions 62 may be retrieved on an as needed basis as the descriptor 42 is processed or in any other suitable manner. In still other embodiments, the required extensions 62 (which may be written in JavaScript or other suitable form) may be included as part of the descriptor 42 itself—as for example, in a block after the card descriptors or at the end of the descriptor. In such circumstances there would be no need to separately request the extensions. Regardless of the embodiment used to retrieve the extensions 62, or if no extensions 62 are needed, the runtime viewer 50 generates the HTML for the requesting device 12 in step 228. In the embodiment of FIG. 9B, any extension requests are directed to the runtime viewer server/store 150.

The runtime viewer is arranged to process the wrap descriptor 40 in a manner that generates the HTML appropriate for rendering the wrap on the requesting device (Step 228). This processing is described in more detail below with respect to FIG. 12.

As part of the processing and rendering, the assets 65 associated with the various cards 14 associated with the wrap 10 are retrieved in step 230. In many cases, the assets 65 associated with a particular card will be retrieved as their associated card descriptors are processed during the wrap descriptor processing. However, it should be appreciated that the actual timing of the asset requests may be widely varied. For example, in some circumstances it may be desirable to only download certain assets 65 when the associated card is displayed or just prior to the card being displayed, in accordance within some predetermined caching strategy. In some embodiments, the runtime viewer 50 determines the timing of the asset requests, while in other embodiments, such decisions may be delegated to the browser. As previously discussed, the assets may be stored at a variety of different locations as diagrammatically illustrated as asset stores 165 in the embodiment of FIG. 9B.

As the wrap descriptor is processed, the wrap is rendered on the requesting device by populating the tab or page opened by shim (step 234).

In some circumstances the initial wrap request may come from a runtime viewer that is already open and executing. In such circumstances it may be desirable for the runtime viewer to directly request any needed wrap descriptors from the wrap descriptor storage server (e.g. wrap descriptor store 1040). Such a process would effectively skip described steps 202-212.

Rendering Wrap Packages

Wrap packages are each an abstract, platform-independent data structure containing all the information needed for a wrap runtime engine 50 to render the wrap and facilitate its interaction and behaviors. Although a non-exclusive implementation of the wrap runtime is in the Javascript programming language for execution within a conventional web browser using HTML and CSS, the wrap runtime could also be implemented using other languages and technologies specific to different operating systems and devices. Since the runtime engine 50 renders the wrap at the time of consumption, it can optimize the rendering and interface for the device it is running on as well as dynamically generate content based on context.

Figure 12:
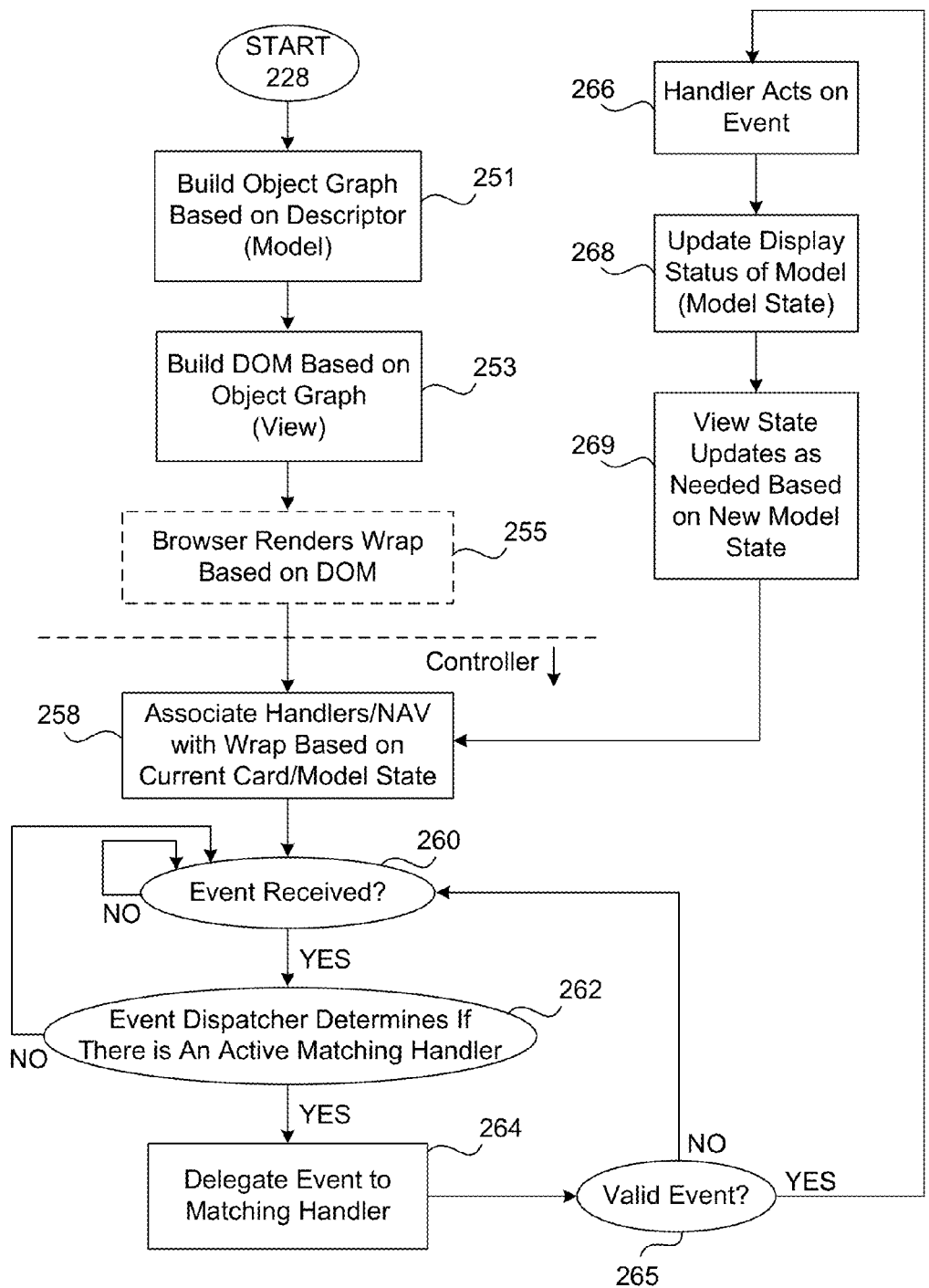
FIG. 12 is a flow chart illustrating a method of generating a view based on a wrap descriptor and updating the view based on user inputs in accordance with an embodiment of the present invention.
Figure 14A:
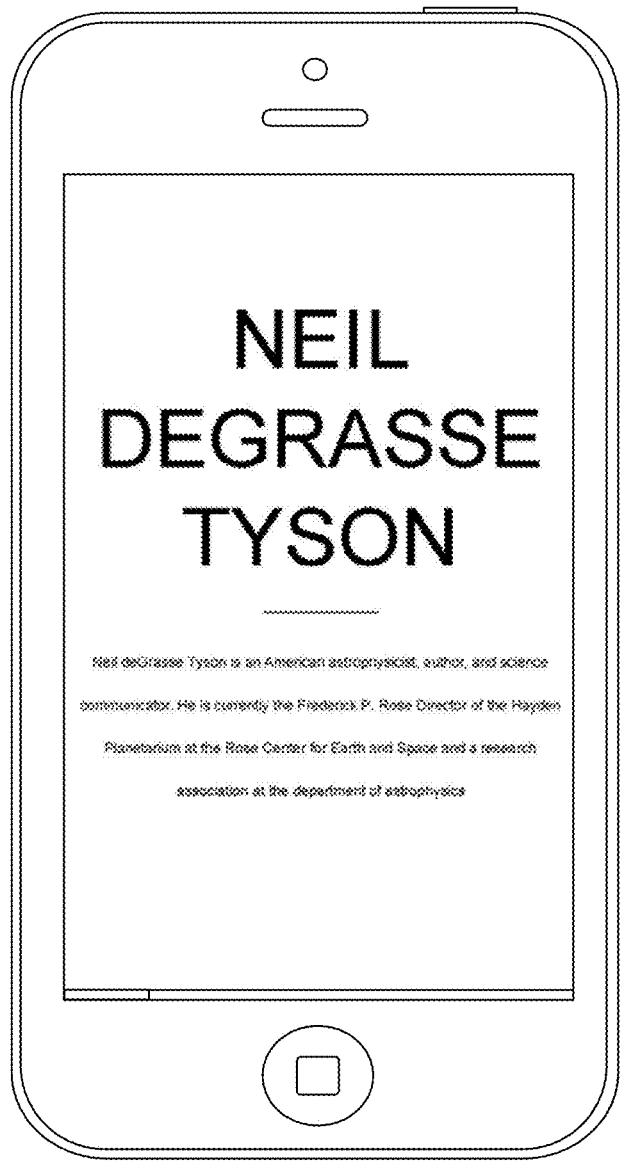
FIGS. 14A-14E illustrate a series of cards of another exemplary wrap package.
Figure 14B:
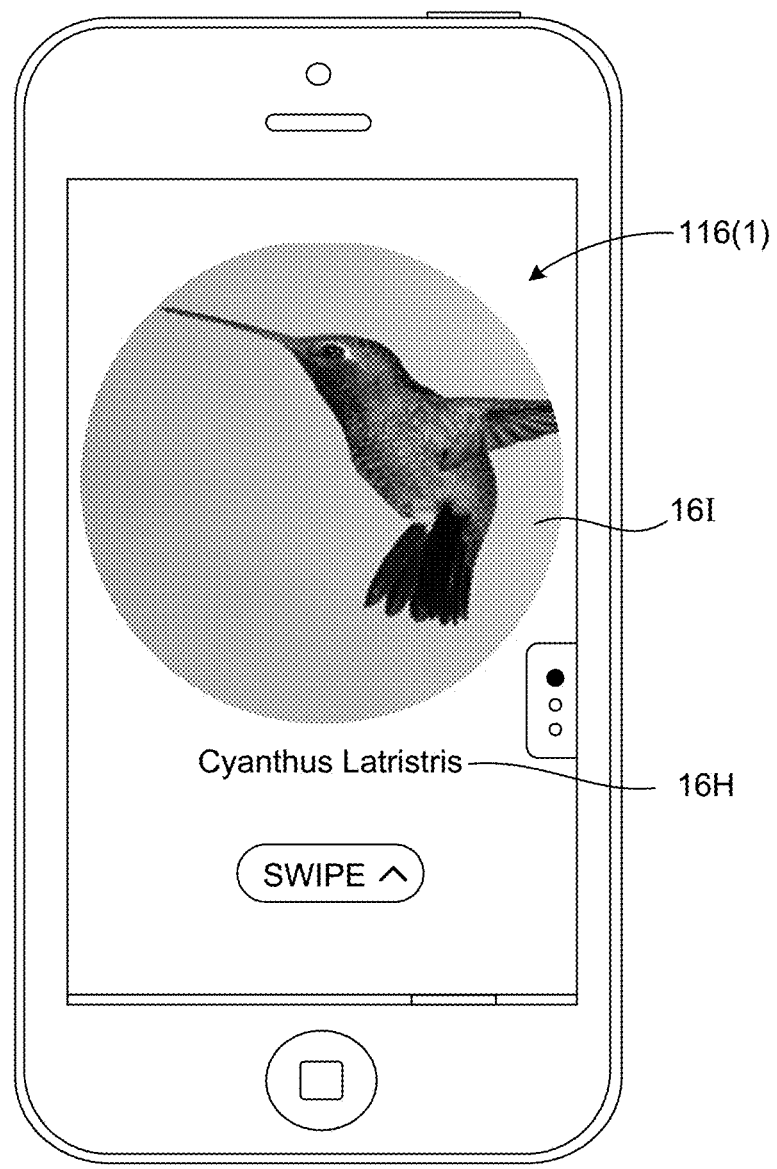
Figure 14C:
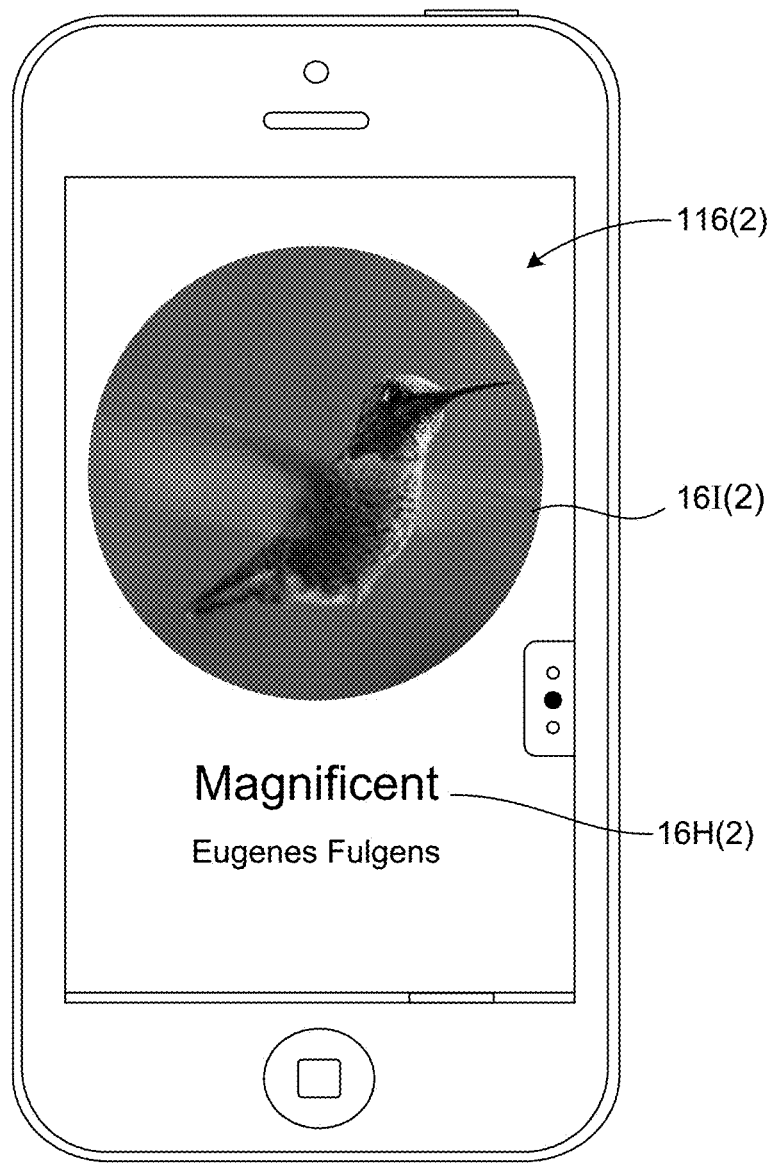
Figure 14D:
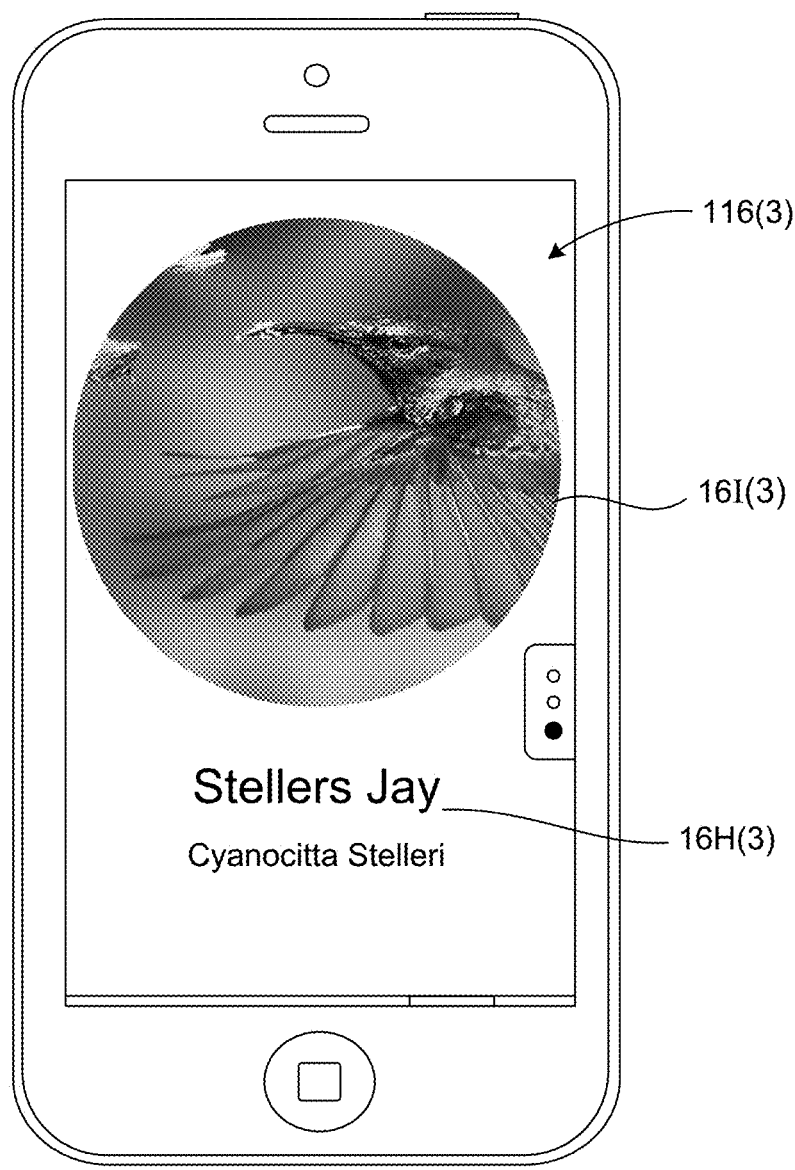
Figure 14E:

Referring next to FIG. 12, a process of generating and updating the view of the wrap 10 during rendering is described. Initially, in step 251, the runtime viewer 50 generates an object graph based on the descriptor 40. The object graph serves as the state model for the wrap. In the illustrated embodiment, the wrap descriptor 40 uses the JSON data format. In general, the object graph is arranged to represent the structure of the wrap document in a manner that: (1) is simpler to transform for presentation; and (2) that makes the behaviors and styling information readily available for the runtime to apply as needed. The object graph can be created using a variety of techniques. As will be appreciated by those familiar with the art, using JSON objects as the wrap descriptors makes runtime generation of the object graph a relatively simple and straightforward task. The JSON object is transformed into JavaScript objects automatically by the runtime. Then straight-forward transformations take place to transform the on-disk representation into a runtime object graph from which it is easier to render the desired views and attach the desired behaviors.

After the object graph has been built, the runtime viewer creates a document object model (DOM) based on the object graph (step 253). The DOM corresponds to the view, and as will be appreciated by those familiar with the art, the DOM is a standard representation that may be used directly by the browser to render the wrap in a conventional manner (step 255). That is, the DOM is an internal representation that can be directly used by the browser to render the wrap.

Once the DOM has been built, the runtime viewer associates the appropriate handlers and navigation tools based on the current model state (step 258). That is, if the first card is displayed, the viewer will associate the event handlers and navigation tools with the wrap that are appropriate for the first card. These include the handlers associated with triggers as previously discussed.

Thereafter, when a user input event is received from a user interacting with the wrap, the appropriate handler processes the received event. This process is diagrammatically represented by the event loop that begins at step 260.

When an event is received at 260, an event dispatcher determines whether there is an active handler that matches the event (step 262). If so, the event is delegated to the matching handler (step 264), which determines whether the event is valid (step 265). If valid, the handler acts on the event (step 266) and updates the display status of the model (i.e., the handler updates the state of the object graph model). In step 268, the view state is then updated as needed based on the new model state. Any time the view state changes, the active handlers are updated as necessary based on the new (i.e., then current) model state (step 269). Thereafter, control is returned back to step 258 and the above process is repeated if a new event is received in step 260.

To give a specific example, consider the navigation behaviors that might be associated with the first card 311 of wrap 310 illustrated in FIG. 7A. In a simple example, the only permitted navigational behavior for card 311 may be a left swipe gesture, which is arranged to flip the displayed to the second card 312 shown in FIG. 7B. In such a case, when the first card 311 is rendered and displayed, the only valid navigational handler associated with the wrap in step 258 would be a left swipe handler arranged to cause the display status of the model to change to the next card 312 of FIG. 7B in response to a left swipe. In this state, the only time the event dispatcher will find an active matching handler is when a left swipe event is detected. Thus when a left swipe is detected, the event dispatcher would delegate the event to the left swipe handler (step 264), which is validated in step 265 and acted upon in step 266 by updating the display status in of the model (i.e., making the next card active—in this case second card 312)—which in turn will cause the view state to update to the second card (step 268) and a new state model in step 269.

As previously discussed, the navigation behaviors for the second card 312 are somewhat different than the navigation behaviors for the first card. The left swipe handler remains the same (i.e., causing a transition to the next card)—however a right swipe is now relevant and will cause a transition to the previous card (i.e., back to the first card 311). Thus, in step 258 and 269, a right swipe handler would be activated when the model state transitions to the second card.

Of course, there may be a wide variety of different handlers that are appropriate for specific cards and/or model states. In some circumstances the same gesture may invoke different behaviors based on the active card or model state. For example, a left swipe gesture made on the last card may invoke an animation that gives the appearance of the card beginning to flip, but then springing back, to graphically suggest that the displayed card is the last card. To facilitate this, a final card left swipe animation handler may be activated when the last card is displayed, whereas the left swipe page transition handler would be deactivated.

The handlers associated with triggers are also particularly important to the wrap environment. For example, selection of a trigger component (e.g., by tapping at any location on a screen within the bounds of a displayed trigger component) may activate the trigger. Of course a wide variety of different events can be used to activate a trigger. In many instances, the events will be user initiated events such as selection or tapping of a trigger through the performance of a selection gesture or based on some other user input. In other circumstance, the activating step may system generated (e.g. an elapsed time, a sensor input that exceeds a threshold, the receipt of a particular message or a very wide range of other potential events).

Once activated, a trigger may exhibit any desired behavior which can be associated with the trigger through appropriate behavior declarations 95. By way of example, if the trigger is a linking trigger, the trigger may initiate a navigational link to another card or wrap, or link to an external webpage once activated using a defined linking behavior (e.g., open in same tab, open in new tab, etc.) Other triggers can have a wide variety of different associated behaviors to support almost any type of application functionality.

As discussed above, the runtime viewer may be arranged to execute in a browser 151. In a nonexclusive embodiment, the runtime viewer may include a runtime engine having an object graph building module, a DOM building module, an event handler, and a behavior engine. The object graph building module is arranged to process a wrap descriptor 40 to create an object graph that serves as the runtime instance of the wrap. The DOM building module uses the object graph, to create a document object model (DOM) that serves as a browser readable instance of the wrap. The event handler is arranged to handle events that are received once a wrap has been rendered. The behavior engine includes a library of behavior definitions 60. In embodiments that support behavior extensions 62, the behavior engine is also arranged to obtain behaviors extensions 62 from external stores as necessary. Such behavior extensions 62 may be arranged as a bundle or package of behaviors or as individual behavior definitions.

In a nonexclusive embodiment, the object graph 510 may include an ordered card list, a set of cards definitions and an asset load state tree. The card list represents the order of the cards and provides a simple mechanism for supporting linear navigation through the card set. The card list may use a wide variety of different formats. By way of example, a doubly linked list works well in many applications.

The card definition includes a card definition for each card in the wrap. The card definition includes each of the component objects of the card and associates all of the relevant assets and attributes (including styles, behaviors, etc.) with the respective components.

The asset load state tree is a data structure that identifies each asset that is referenced in the wrap descriptor and indicates whether the referenced asset has been loaded into the runtime. In some embodiments, the asset load state tree takes the form of a tree of semaphores. Each time an asset is loaded, the corresponding entry (e.g. semaphore) in the asset load state tree is changed from a "not loaded" to a "loaded" state. In this way, the runtime can quickly determine whether any given asset is already present when rendering a card.

Wraps as Messages

The described wrap packages 10 are essentially cloud based portable data objects that can readily be distributed using a wide variety of electronic techniques including messaging, posting and inclusion as links in documents, articles or other electronic communications. The wrap package 10 thus allows authors to take applet and website functionality and make them consumable as a message, delivered in a narrative storytelling format. This allows the transformation of an app or website functionality into a portable, sharable, and savable wrap package 10, that can be distributed like electronic messages (e.g. email, SMS, text) are disseminated today. For example as illustrated in FIG. 7M, the media triggers 381 and 383 can be used to share the wrap package 310 with others via Facebook Twitter. Although in this embodiment actual triggers for sharing are provided within or embedded in the wrap itself, this is not always necessary for sharing the wrap. Alternatively for example, the cover 15 that includes a URL associated with the wrap (e.g., the wrap ID 42) can be posted on a social media site or feed, email to others, or otherwise distributed using an electronic communication protocol or platform.

Not only are the wrap packages 10 easy for publishers and others to distribute, but viewers and other recipients of a wrap may also readily share a wrap with their friends, family, coworkers, colleagues, etc. This is a powerful construct that can greatly extend or enhance the market (or other target segment) reach and penetration of a well designed wrap since a "message" from a friend or acquaintance is often more favorably received than a message from an unknown party. Neither applets nor websites are well suited for such viral distribution.

Since the set of cards 14 that make up a wrap package 10 are encapsulated as a data object and can be sent as a unit, the wrap package 10 can also readily be stored on a viewer's device if the viewer so desires. Contrast this with a conventional multi-page website which is not designed to be persistently stored on a viewer's device as a unit, even if individual pages may sometimes be cached. It also eliminates third party aggregator (e.g., the Apple App Store; Google Play, etc.) control over the delivery of a company's services/messages to its customers as occurs in the distribution of conventional apps.

Benefits and Advantages of Wrap Packages

Wrap packages 10 offer a number of benefits and attributes currently not available with conventional methods of distributing content, such as with PDFs, web sites, or stand-alone apps. Since cards 14 can be sequenced and authored to include media content, application functionality, and e-commerce related services, wrap packages 10 have the unique ability to narrate a story, in a book-like format, that captures and holds the attention of the viewer, while also offering an "app" like user experience. As such, wrap packages 10 offer a new web-based platform for story telling, communicating ideas, and delivering highly visual and functional user experiences. Wrap packages 10 thus enable a new business paradigm for selling, advertising, publishing, increasing brand loyalty, offering services, and contacting and engaging new and old customers alike, all ideally delivered to consumers on their mobile devices, where they spend their time and consciousness. Where businesses used to have to build destinations (e.g., websites) or monolithic systems (e.g., "apps"), they can now, instead, provide consumers with wrap packages 10, that are delivered like messages, and that provide the user experiences and functionality they really want and need. As a result, wraps 10 create opportunities for business to innovate and improve products and services, leveraging the mobile web in ways not before possible, because a convenient, enabling interface and platform did not previously exist.

Wrap packages 10 are also like interactive messages that can be easily shared, delivered over the mobile web, and locally stored. With the ability to share, distribute over the mobile web and locally store, popular wrap packages can readily go viral.

Wrap packages 10 are also preferably delivered using a SaaS (Software as a Service) model, meaning wrap packages are delivered only on an as-needed basis.

Wrap packages can be authored by anyone, from an individual with little technical or design skills, to large and sophisticated enterprises.

Wrap packages 10 can be distributed narrowly to a specific or targeted person or persons or widely distributed to many, many persons.

Wrap packages 10 can be written once and can run on just about any browser enabled device. As a result, wraps are not platform, operating system, or device dependent.

Since wrap packages 10 can be easily generated and optionally dynamically updated with new content, wrap packages can be used as a digital "corollary" or "companion", accompanying the sale or rental of goods and/or services. For example, wrap packages can be created and distributed as an "Active Receipt" accompanying the sale or rental of a good or service. The merchant can thus provide through the wrap package 10 ongoing contact and support to on-board, up-sell and/or cross-sell the customer with ancillary goods and/or services, potentially for the entire life cycle of the product or service, all delivered in a digital format that never gets lost or misplaced. Accordingly, wrap packages can be used as an essential component of any product or service, delivering better customer service and creating new selling opportunities.

In summary, wrap packages 10 introduce the "narrative web", which is a storytelling mobile user interface, delivered over a cloud-based platform, ushering in a digital evolution of mobile marketing and customer relationship management. As a marketing tool, wrap packages 10 have the unique ability to increase mobile engagement, lead generation, and conversion, enabling businesses to increase sales, improve loyalty, and enhance customer relationships and loyalty. Wrap packages 10 thus offer a compelling business proposition by solving one of the biggest problems in the mobile space of today; namely the lack of connectivity between apps. With wrap packages 10, however, consumers and other users can enjoy a multi-function app-like experience, without having to be in an app, download an app, or open any apps.

Finally, while many of the benefits and attributes of wrap packages 10 are realized on mobile devices operating on the mobile web, it should be made clear that there is nothing inherent with wrap packages 10 that limit their usefulness or functionality in non-mobile environments. On the contrary, wrap packages 10 can also be used, and all the same benefits and attributes realized, on non-mobile devices, such as desktop computers and/or smart TVs for example.

The present invention is thus intended to be broadly construed to cover any system and method, such as carousel ads for example, that enables publishers and marketers to tell sequenced stories with (i) a combination of images, photos, text, video and other types of media, (ii) a swipe-able format that enables viewers to navigate the media displayed in one screen shot or frame to the next, and (iii) includes embedded app-like functionality and/or links to other locations that provide additional information or such functionality and/or services. Consequently, the present application should not be construed to just those specific embodiments as described herein.

In the primary described embodiments, all of the behaviors are declared rather than being stored in-line within the descriptor. Thus, the descriptor itself does not have any programmable logic. In many embodiments, the declared behavior are all defined within the runtime viewer such that the runtime view can readily associate the desired behavior with the wrap, card or component as appropriate in a runtime instance of the wrap. It should be appreciated that this is a particularly powerful framework for enhancing portability of the wraps. With the descriptor/runtime viewer approach, a single item (the descriptor) can be used to define all of the content and functionality of a set of cards that can be rendered on virtually any platform. The declared functionality is provided (or obtained) by the runtime viewers when the wrap is to be rendered so that the author of the wrap is not required to know or understand any of the idiosyncrasies of any particular platform. The runtime viewer may be a generic runtime viewer (e.g., a viewer executable by a conventional browser) or may be native viewer customized for a particular platform. Regardless of the underlying platform, the runtime viewer handles the tasks of associating the declared behaviors with the wrap/cards/components which frees the wrap author and/or authoring tool from having to ensure that desired behaviors are programmed correctly for all of the different platforms that the wrap may be rendered on.

In most implementations, all of the sizeable assets that serve as content of the wrap are referenced in the wrap by appropriate identifiers rather than being stored directly in the wrap. This again significantly enhances portability by keeping the size of the descriptor small while facilitating the use of rich media content.

From the foregoing it should be apparent that the described wrap packages provide businesses with a powerful tool for engaging their customers, suppliers, employees or other constituents in a format that is particularly well tailored for display on mobile devices.

Although only a few embodiments of the invention have been described in detail, it should be appreciated that the invention may be implemented in many other forms without departing from the spirit or scope of the invention. For example several specific wrap descriptor structures have been described. Although such descriptor structures work well, it should be appreciated that the actual descriptor structure may vary widely. For example, in some embodiments some special behaviors can be defined within a wrap descriptor if desired. Such in-line behavior definition might be particularly useful in association with certain behavior extensions that are not otherwise readily available. For example, JavaScript can be included within a JSON object and various other descriptor structures. Thus, when JSON descriptors are used, selected behaviors or behavior overrides can be defined in-line using JavaScript if desired. Although programmed functionality can be included in some circumstances, it should be appreciated that liberal definition of behaviors within a wrap tends to defeat some of the primary advantages of the described descriptor/runtime viewer framework.

In many implementations much of the actual content of the wrap will be referenced by the descriptor rather than being stored in-line within the descriptor. However, the balance between in-line storage and references to external assets in any particular wrap descriptor may be widely varied anywhere from 100% referenced content to (at least theoretically) 100% in-line content—although the later is less desirable for media rich content and again, begins to defeat some of the advantages of using the descriptor approach. The choice between in-line and referenced content will typically be dictated in large part by the relative size of the content. For example, text, which tends to be very compact, is generally more suitable for inclusion in-line, whereas more graphic media, images, videos and/or audio files are typically more efficiently referenced.

A few different methods of and architectures for serving wrap packages and constructing runtime instances have been described herein. Although only a few approaches have been described in detail, it should be apparent from the foregoing that a wide variety other methods and architectures can be used as well. Therefore, the present embodiments should be considered illustrative and not restrictive and the invention is not to be limited to the details given herein, but may be modified within the scope and equivalents of the appended claims.

What is claimed is:

1. A JSON (JavaScript Object Notation) wrap descriptor data object embedded in a non-transitory tangible computer readable medium, the JSON wrap descriptor arranged to define the structure, layout and content of a set of cards suitable for display on a computer display separately from their presentation, the JSON wrap descriptor comprising:
   a plurality of card descriptors, each card descriptor arranged to define the content, structure and layout of an associated one of the cards, each card descriptor including,
      at least one component, each component having content intended for display when the associated card is rendered,
      one or more style attributes, each style attribute being associated with at least one of the associated card and a selected component of the associated card, wherein the style attributes define a presentation style for the associated card or component, and
      a layout description including at least one selected from the group consisting of (i) a layout definition that defines the presentation of the associated card in-line within the associated card descriptor, and (ii) a layout identifier suitable for use in accessing a layout definition that is not directly contained within the associated card descriptor, and
   wherein at least one of the card descriptors includes a behavior declaration arranged to declare a behavior associated with the corresponding card or an associated one of the components, wherein the declared behavior is not defined within the JSON wrap descriptor; and
   wherein the cards defined by the wrap descriptor are configured to be swipe browsable and rendered in a linear horizontal sequence, and at least one of the cards is configured to be swipe browsable and rendered in a linear vertical sequence.

2. A wrap environment comprising:
   a JSON wrap descriptor as recited in claim 1; and
   a runtime viewer arranged to render a wrap instance based on the JSON wrap descriptor, the wrap instance including the set of cards defined by the card descriptors.

3. A wrap environment as recited in claim 2 wherein the runtime viewer includes a multiplicity of behavior definitions, the runtime viewer being arranged to associate the declared behavior with the associated card or component when the associated card is rendered.

4. A JSON wrap descriptor as recited in claim 1 wherein at least one of the plurality of card descriptors further includes a source attribute associated, the source attribute identifying a source external to the JSON wrap descriptor from which the content associated with the an associated one of the components is to be obtained when the associated card is rendered.

5. A JSON wrap descriptor as recited in claim 1 wherein the content associated with the at least one component of a first card descriptor among the plurality of card descriptors is text included inline within the first card descriptor.

6. A JSON wrap descriptor as recited in claim 1 wherein at least one of the card descriptors includes a trigger arranged to trigger an action in response to an event that occurs while the associated card is displayed.

7. A JSON wrap descriptor as recited in claim 6 wherein the event is selected from the group consisting of:
   a user input that selects a component associated with the trigger while the associated card is displayed;
   a system generated event; and
   a change of state within the wrap when the wrap is displayed.

8. A JSON wrap descriptor as recited in claim 1 wherein:
   at least one of the cards is authored to include application-like functionality.

9. A JSON wrap descriptor as recited in claim 1 wherein at least one of the components contains a plurality of sub-components.

10. A JSON wrap descriptor as recited in claim 9 further comprising associating a behavior declaration and a trigger with the at least one of the plurality of sub-component.

11. A JSON wrap descriptor as recited in claim 1 wherein the JSON wrap descriptor is a BSON (Binary JSON) data object.

12. A JSON wrap descriptor as recited in claim 2 wherein the JSON wrap descriptor includes one or more behavior declarations for one or more behaviors that are not defined within the runtime viewer, wherein the runtime viewer is arranged to access one or more behavior extensions corresponding to the one or more behavior declarations when rendering the wrap instance.

13. A JSON wrap descriptor embedded in a non-transitory tangible computer readable medium, the JSON wrap descriptor arranged to define the structure, layout and content of a set of cards suitable for display on a computer display, the JSON wrap descriptor comprising:
   a unique wrap identifier, wherein the JSON wrap descriptor is accessible through the use of the unique wrap identifier; and
   a plurality of card descriptors, each card descriptor being arranged to define the structure and layout of an associated one of the cards, each card descriptor including (i) an associated card identifier that uniquely identifies the associated card, (ii) at least one component, each component having content intended for display when the associated card is rendered; and (iii) a layout definition that defines the presentation of the associated card content; and
   wherein at least one of the card descriptors includes a behavior declaration arranged to declare a behavior associated with the corresponding card or an associated one of the components, wherein the declared behavior is not defined within the JSON wrap descriptor; and wherein the cards defined by the wrap descriptor are configured to be swipe browsable and rendered in a linear horizontal sequence, and at least one of the cards is configured to be swipe browsable and rendered in a linear vertical sequence.

14. A JSON wrap descriptor as recited in claim 13 wherein at least one of the card descriptors includes a card behavior declaration that declares a behavior associated with the card associated with the one card descriptor, wherein the declared behavior is not defined within the JSON wrap descriptor.

15. A JSON wrap descriptor as recited in claim 13 wherein at least one of the card descriptors includes a component behavior declaration that declares a behavior associated with a selected one of the components, wherein the declared behavior is not defined within the JSON wrap descriptor.

16. A JSON wrap descriptor as recited in claim 13 further comprising one or more style attributes, each of the one or more style attributes defining a presentation style for an associated component and/or card.

17. A JSON wrap descriptor as recited in claim 13 wherein a first one of the card descriptors further includes:
- a source attribute associated with a first selected one of the components, the source attribute identifying a source external to the JSON wrap descriptor from which the content associated with the selected component is to be obtained when the associated card is rendered; and
- wherein the content associated with a second component of the first card descriptor is text included inline within the first card descriptor.

18. A JSON wrap descriptor as recited in claim 13 wherein at least one of the card descriptors includes a trigger arranged to trigger an action in response to a user input event that occurs relative to a component included in the associated card when the associated card is rendered.

19. A JSON wrap descriptor as recited in claim 13 wherein at least one of the card descriptors includes a trigger arranged to trigger an action in response to an event that occurs when the associated card is rendered, wherein the event is selected from the group consisting of:
- a system generated event; and
- a change of state within the wrap when the wrap is displayed.

20. A JSON wrap descriptor as recited in claim 13 wherein at least one of the card descriptors includes a trigger, associated with the at least on component, arranged to trigger an action in response to an event that occurs when the associated card is rendered, wherein the trigger is arranged to activate at least one of:
- a link to another card within the wrap;
- a link to another wrap; and
- a link to a remote website.

21. A JSON wrap descriptor as recited in claim 13 wherein at least one of the card descriptors includes a trigger arranged to activate a service in response to an event that occurs when the associated card is rendered.

22. A JSON wrap descriptor as recited in claim 13 wherein at least one of the components contains a plurality of sub-components, the JSON wrap descriptor further comprising at least one of a behavior declaration and a trigger associated with at least one of the sub-components.

23. A JSON wrap descriptor as recited in claim 13 wherein the JSON wrap descriptor is formatted as a data object.

24. A JSON wrap descriptor as recited in claim 13 wherein the JSON wrap descriptor is a BSON (binary JSON) data object.

25. A JSON wrap descriptor as recited in claim 13 wherein the plurality of cards defined by the plurality of card descriptors all have the same size and aspect ratio when rendered.

26. A wrap environment comprising:
- a JSON wrap descriptor as recited in claim 13; and
- a runtime viewer arranged to render a wrap instance based on the JSON wrap descriptor, the wrap instance including the set of cards defined by the card descriptors.

27. A wrap environment as recited in claim 26 wherein the runtime viewer includes one or more behavior definitions that correspond to one or more behavior declarations that are declared in the plurality of card descriptors, the runtime viewer associating individual behavior definitions with the corresponding behavior declarations declared by the card descriptors associated the cards or the card components as the cards of the wrap instance are rendered.

28. A wrap package as recited in claim 26 further comprising a state descriptor associated with a particular user, wherein the state descriptor is arranged to store state information relative to the wrap instance.

29. A wrap package as recited in claim 26 wherein the JSON wrap descriptor includes one or more behavior declarations for one or more behaviors that are not defined within the runtime viewer, wherein the runtime viewer is arranged to obtain one or more behavior extensions corresponding to the one or more behavior declarations when rendering the wrap instance.

30. A JSON wrap descriptor embedded in a non-transitory tangible computer readable medium, the JSON wrap descriptor being arranged to define the structure, layout and content of a set of cards suitable for display on a computer display separately from their presentation, the JSON wrap descriptor comprising a plurality of card descriptors, each card descriptor being arranged to define the content, structure and layout of an associated one of the cards, wherein:
- each card descriptor includes at least one component descriptor, each component descriptor defining selected content and attributes of an associated component;
- the attributes associated with a first one of the components includes,
    - a behavior declaration that identifies a behavior associated with the component, and
    - at least one style attribute that indicates a style associated with the content of the component; and
- the content of a selected component descriptor includes a multiplicity of subcomponent descriptors, each subcomponent descriptor defining selected content and attributes of an associated subcomponent; and
- wherein the cards defined by the wrap descriptor are configured to be swipe browsable and rendered in a linear horizontal sequence, and at least one of the cards is configured to be swipe browsable and rendered in a linear vertical sequence.

* * * * *

UNITED STATES PATENT AND TRADEMARK OFFICE
CERTIFICATE OF CORRECTION

PATENT NO. : 9,285,977 B1
APPLICATION NO. : 14/678316
DATED : March 15, 2016
INVENTOR(S) : Greenberg et al.

It is certified that error appears in the above-identified patent and that said Letters Patent is hereby corrected as shown below:

IN THE SPECIFICATION

1. Column 1, line 40, change "shamble" to --sharable--.

2. Column 18, line 8, change "FIGS. 7I-7K" to --7I-7K--.

3. Column 29, line 52, change "text box 16T" to --text box 16TT--.

Signed and Sealed this
Seventh Day of June, 2016

Michelle K. Lee
*Director of the United States Patent and Trademark Office*